US006496896B1

(12) United States Patent
Inoue

(10) Patent No.: US 6,496,896 B1
(45) Date of Patent: Dec. 17, 2002

(54) TRANSMISSION APPARATUS, RECORDING APPARATUS, TRANSMISSION AND RECEPTION APPARATUS, TRANSMISSION METHOD, RECORDING METHOD AND TRANSMISSION AND RECEPTION METHOD

(75) Inventor: Hiraku Inoue, Kanagawa (JP)

(73) Assignee: Sony Corporation, Tokyo (JP)

(*) Notice: Subject to any disclaimer, the term of this patent is extended or adjusted under 35 U.S.C. 154(b) by 0 days.

(21) Appl. No.: 09/435,639

(22) Filed: Nov. 8, 1999

(30) Foreign Application Priority Data

Nov. 10, 1998 (JP) .......................................... 10-319385

(51) Int. Cl.[7] .......................... G06F 13/38; G06F 13/40

(52) U.S. Cl. .................. 710/306; 710/317; 369/110.01; 369/124.05; 369/47.25

(58) Field of Search ................................. 710/305–316; 369/110.01, 124.05, 124.11, 124.14, 13.24, 47.21, 47.25

(56) References Cited

U.S. PATENT DOCUMENTS

| | | | | | |
|---|---|---|---|---|---|
| 5,359,586 | A | * | 10/1994 | Izumi et al. | 369/110.01 |
| 5,420,844 | A | * | 5/1995 | Kawakubo et al. | 341/59 |
| 5,745,454 | A | * | 4/1998 | Yokota | 369/47.21 |
| 5,959,942 | A | * | 9/1999 | Taguchi et al. | 369/13.24 |
| 6,061,319 | A | * | 5/2000 | Fujiki | 369/59.21 |
| 6,275,457 | B1 | * | 8/2001 | Maeda | 369/275.3 |

* cited by examiner

*Primary Examiner*—Rupal Dharia
(74) *Attorney, Agent, or Firm*—Frommer Lawrence & Haug LLP; William S. Frommer

(57) ABSTRACT

The invention provides a transmission apparatus, a recording apparatus, a transmission and reception apparatus, a transmission method, a recording method and a transmission and reception method by which data can be communicated between different apparatus over a single data bus in accordance with a first communication method wherein data can be transmitted and/or received periodically and a second communication method wherein data can be transmitted and/or received asynchronously.

22 Claims, 60 Drawing Sheets

TIME DIVISION MULTIPLEXING ON TRANSMISSION SIDE

| CLUSTER | SECTOR | SOUND GROUP |
|---|---|---|
| 0032h | 00h | 0h |
| 0 0 0 0 0 0 0 0 0 0 1 1 0 0 1 0 | 0 0 0 0 0 0 0 0 | 0 0 0 0 |

| COMPACTED | 0 0 0 0 0 0 0 0 1 1 0 0 1 0 | 0 0 0 0 0 | 0 0 0 0 |
|---|---|---|---|
| | 00h | C8h | 00h |

| | 0032h | 04h | 0h |
|---|---|---|---|
| | 0 0 0 0 0 0 0 0 0 0 1 1 0 0 1 0 | 0 0 0 0 0 1 0 0 | 0 0 0 0 |

| COMPACTED ABSOLUTE ADDRESS | 0 0 0 0 0 0 0 0 1 1 0 0 1 0 | 0 0 0 1 0 0 | 0 0 0 0 |
|---|---|---|---|
| | 00h | C8h | 40h |
| COMPACTED OFFSET ADDRESS | 0 0 0 0 0 0 0 0 0 0 0 0 0 0 | 0 0 0 1 0 0 | 0 0 0 0 |
| | 00h | 00h | 40h |

| | 0032h | 13h | 9h |
|---|---|---|---|
| 0 0 | 0 0 0 0 0 0 0 0 1 1 0 0 1 0 | 0 0 0 1 0 0 1 1 | 1 0 0 1 |

| COMPACTED ABSOLUTE ADDRESS | 0 0 0 0 0 0 0 0 1 1 0 0 1 0 | 0 1 0 0 1 1 | 1 0 0 1 |
|---|---|---|---|
| | 00h | C9h | 39h |
| COMPACTED OFFSET ADDRESS | 0 0 0 0 0 0 0 0 0 0 0 0 0 0 | 0 1 0 0 1 1 | 1 0 0 1 |
| | 00h | 01h | 39h |

FIG. 17

| Section | | 16bits: MSB … LSB | MSB … LSB | 16bits: MSB … LSB | MSB … LSB | |
|---|---|---|---|---|---|---|
| HEADER | | 00000000 | 11111111 | 11111111 | 11111111 | 0 |
| HEADER | | 11111111 | 11111111 | 11111111 | 11111111 | 1 |
| HEADER | | 11111111 | 11111111 | 11111111 | 00000000 | 2 |
| HEADER | | Cluster H | Cluster L | Sector (00h) | MODE (02h) | 3 |
| | | 00000000 | 00000000 | 00000000 | 00000000 | 4 |
| | | 00000000 | 00000000 | 00000000 | 00000000 | 5 |
| | | 00000000 | 00000000 | 00000000 | 00000000 | 6 |
| | | Maker code | Model code | First TNO | Last TNO | 7 |
| | | 00000000 | 00000000 | 00000000 | Used Sectors | 8 |
| | | 00000000 | 00000000 | 00000000 | 00000000 | 9 |
| | | 00000000 | 00000000 | 00000000 | Disc Serial No | 10 |
| POINTER SECTION | | Disc | ID | P-DFA | P-EMPTY | 11 |
| POINTER SECTION | | P-FRA | P-TN01 | P-TN02 | P-TN03 | 12 |
| POINTER SECTION | | P-TN04 | P-TN05 | P-TN06 | P-TN07 | 13 |
| | | … | … | … | … | |
| POINTER SECTION | | P-TN0248 | P-TN0249 | P-TN0250 | P-TN0251 | 74 |
| POINTER SECTION | | P-TN0252 | P-TN0253 | P-TN0254 | P-TN0255 | 75 |
| | | 00000000 | 00000000 | 00000000 | 00000000 | 76 |
| | | 00000000 | 00000000 | 00000000 | 00000000 | 77 |
| TABLE SECTION (255 PART TABLES) | (01h) | Start address | (TRACK ADDRESS) | | TRACK MODE | 78 |
| | | End address | | | LINK INFORMATION | 79 |
| | (02h) | Start address | (TRACK ADDRESS) | | TRACK MODE | 80 |
| | | End address | | | LINK INFORMATION | 81 |
| | (03h) | Start address | (TRACK ADDRESS) | | TRACK MODE | 82 |
| | | End address | | | LINK INFORMATION | 83 |
| | | … | … | … | … | |
| | (FCh) | Start address | (TRACK ADDRESS) | | TRACK MODE | 580 |
| | | End address | | | LINK INFORMATION | 581 |
| | (FDh) | Start address | (TRACK ADDRESS) | | TRACK MODE | 582 |
| | | End address | | | LINK INFORMATION | 583 |
| | (FEh) | Start address | (TRACK ADDRESS) | | TRACK MODE | 584 |
| | | End address | | | LINK INFORMATION | 585 |
| | (FFh) | Start address | (TRACK ADDRESS) | | TRACK MODE | 586 |
| | | End address | | | LINK INFORMATION | 587 |

U-TOC SECTOR 0

FIG. 19

| Section | Slot | 16bits: MSB … LSB | MSB … LSB | 16bits: MSB … LSB | MSB … LSB | |
|---|---|---|---|---|---|---|
| HEADER | | 00000000 | 11111111 | 11111111 | 11111111 | 0 |
| HEADER | | 11111111 | 11111111 | 11111111 | 11111111 | 1 |
| HEADER | | 11111111 | 11111111 | 11111111 | 00000000 | 2 |
| HEADER | | ClusterH | ClusterL | Sector (01h) | MODE | 3 |
| | | 00000000 | 00000000 | 00000000 | 00000000 | 4 |
| | | 00000000 | 00000000 | 00000000 | 00000000 | 5 |
| | | 00000000 | 00000000 | 00000000 | 00000000 | 6 |
| | | 00000000 | 00000000 | 00000000 | 00000000 | 7 |
| | | 00000000 | 00000000 | 00000000 | 00000000 | 8 |
| | | 00000000 | 00000000 | 00000000 | 00000000 | 9 |
| | | 00000000 | 00000000 | 00000000 | 00000000 | 10 |
| POINTER SECTION | | 00000000 | 00000000 | 00000000 | P-EMPTY | 11 |
| POINTER SECTION | | 00000000 | P-TNA1 | P-TNA2 | P-TNA3 | 12 |
| POINTER SECTION | | P-TNA4 | P-TNA5 | P-TNA6 | P-TNA7 | 13 |
| POINTER SECTION | | … | … | … | … | |
| POINTER SECTION | | P-TNA248 | P-TNA249 | P-TNA250 | P-TNA251 | 74 |
| POINTER SECTION | | P-TNA252 | P-TNA253 | P-TNA254 | P-TNA255 | 75 |
| SLOT SECTION (255+1 SLOTS) | (00h) | DISC NAME | | | | 76 |
| SLOT SECTION (255+1 SLOTS) | | DISC NAME | | | LINK INFORMATION | 77 |
| SLOT SECTION (255+1 SLOTS) | (01h) | DISC NAME/TRACK NAME | | | | 78 |
| SLOT SECTION (255+1 SLOTS) | | DISC NAME/TRACK NAME | | | LINK INFORMATION | 79 |
| SLOT SECTION (255+1 SLOTS) | (02h) | DISC NAME/TRACK NAME | | | | 80 |
| SLOT SECTION (255+1 SLOTS) | | DISC NAME/TRACK NAME | | | LINK INFORMATION | 81 |
| SLOT SECTION (255+1 SLOTS) | (03h) | DISC NAME/TRACK NAME | | | | 82 |
| SLOT SECTION (255+1 SLOTS) | | DISC NAME/TRACK NAME | | | LINK INFORMATION | 83 |
| SLOT SECTION (255+1 SLOTS) | | … | | | | |
| SLOT SECTION (255+1 SLOTS) | (FEh) | DISC NAME/TRACK NAME | | | | 584 |
| SLOT SECTION (255+1 SLOTS) | | DISC NAME/TRACK NAME | | | LINK INFORMATION | 585 |
| SLOT SECTION (255+1 SLOTS) | (FFh) | DISC NAME/TRACK NAME | | | | 586 |
| SLOT SECTION (255+1 SLOTS) | | DISC NAME/TRACK NAME | | | LINK INFORMATION | 587 |

U-TOC SECTOR 1

FIG. 20

| | | 16bits (MSB … LSB) | (MSB … LSB) | 16bits (MSB … LSB) | (MSB … LSB) | |
|---|---|---|---|---|---|---|
| HEADER | | 00000000 | 11111111 | 11111111 | 11111111 | 0 |
| | | 11111111 | 11111111 | 11111111 | 11111111 | 1 |
| | | 11111111 | 11111111 | 11111111 | 00000000 | 2 |
| | | ClusterH | ClusterL | Sector (02h) | MODE | 3 |
| | | 00000000 | 00000000 | 00000000 | 00000000 | 4 |
| | | 00000000 | 00000000 | 00000000 | 00000000 | 5 |
| | | 00000000 | 00000000 | 00000000 | 00000000 | 6 |
| | | 00000000 | 00000000 | 00000000 | 00000000 | 7 |
| | | 00000000 | 00000000 | 00000000 | 00000000 | 8 |
| | | 00000000 | 00000000 | 00000000 | 00000000 | 9 |
| | | 00000000 | 00000000 | 00000000 | 00000000 | 10 |
| POINTER SECTION | | 00000000 | 00000000 | 00000000 | P-EMPTY | 11 |
| | | 00000000 | P-TRD1 | P-TRD2 | P-TRD3 | 12 |
| | | P-TRD4 | P-TRD5 | P-TRD6 | P-TRD7 | 13 |
| | | P-TRD248 | P-TRD249 | P-TRD250 | P-TRD251 | 74 |
| | | P-TRD252 | P-TRD253 | P-TRD254 | P-TRD255 | 75 |
| SLOT SECTION (255+1 SLOTS) | (00h) | TRACK RECORDING DATE/TIME | | | | 76 |
| | | | | MAKER CODE | MODEL CODE | 77 |
| | (01h) | TRACK RECORDING DATE/TIME | | | | 78 |
| | | | | MAKER CODE | MODEL CODE | 79 |
| | (02h) | TRACK RECORDING DATE/TIME | | | | 80 |
| | | | | MAKER CODE | MODEL CODE | 81 |
| | (03h) | TRACK RECORDING DATE/TIME | | | | 82 |
| | | | | MAKER CODE | MODEL CODE | 83 |
| | (FEh) | TRACK RECORDING DATE/TIME | | | | 584 |
| | | | | MAKER CODE | (LINK INFORMATION) | 585 |
| | (FFh) | TRACK RECORDING DATE/TIME | | | | 586 |
| | | | | MAKER CODE | (LINK INFORMATION) | 587 |

U-TOC SECTOR 2

FIG. 21

| Section | Slot | 16 bits (MSB–LSB) | (MSB–LSB) | 16 bits (MSB–LSB) | (MSB–LSB) | |
|---|---|---|---|---|---|---|
| HEADER | | 00000000 | 11111111 | 11111111 | 11111111 | 0 |
| HEADER | | 11111111 | 11111111 | 11111111 | 11111111 | 1 |
| HEADER | | 11111111 | 11111111 | 11111111 | 00000000 | 2 |
| HEADER | | ClusterH | ClusterL | Sector (04h) | MODE | 3 |
| | | 00000000 | 00000000 | 00000000 | 00000000 | 4 |
| | | 00000000 | 00000000 | 00000000 | 00000000 | 5 |
| | | 00000000 | 00000000 | 00000000 | 00000000 | 6 |
| | | 00000000 | 00000000 | 00000000 | 00000000 | 7 |
| | | 00000000 | 00000000 | 00000000 | 00000000 | 8 |
| | | 00000000 | 00000000 | 00000000 | 00000000 | 9 |
| | | 00000000 | 00000000 | 00000000 | char.code | 10 |
| POINTER SECTION | | 00000000 | 00000000 | 00000000 | P-EMPTY | 11 |
| POINTER SECTION | | 00000000 | P-TNA1 | P-TNA2 | P-TNA3 | 12 |
| POINTER SECTION | | P-TNA4 | P-TNA5 | P-TNA6 | P-TNA7 | 13 |
| POINTER SECTION | | P-TNA248 | P-TNA249 | P-TNA250 | P-TNA251 | 74 |
| POINTER SECTION | | P-TNA252 | P-TNA253 | P-TNA254 | P-TNA255 | 75 |
| SLOT SECTION (255+1 SLOTS) | (00h) | DISC NAME | | | | 76 |
| | | DISC NAME | | | LINK INFORMATION | 77 |
| | (01h) | DISC NAME/TRACK NAME | | | | 78 |
| | | DISC NAME/TRACK NAME | | | LINK INFORMATION | 79 |
| | (02h) | DISC NAME/TRACK NAME | | | | 80 |
| | | DISC NAME/TRACK NAME | | | LINK INFORMATION | 81 |
| | (03h) | DISC NAME/TRACK NAME | | | | 82 |
| | | DISC NAME/TRACK NAME | | | LINK INFORMATION | 83 |
| | (FEh) | DISC NAME/TRACK NAME | | | | 584 |
| | | DISC NAME/TRACK NAME | | | LINK INFORMATION | 585 |
| | (FEh) | DISC NAME/TRACK NAME | | | | 586 |
| | | DISC NAME/TRACK NAME | | | LINK INFORMATION | 587 |

U-TOC SECTOR 4

FIG. 22

| Section | Part table | 16bits even m: Wm B (MSB d1 – LSB d8) | 16bits even m: Wm A (MSB d1 – LSB d8) | 16bits odd m: Wm B (MSB d1 – LSB d8) | 16bits odd m: Wm A (MSB d1 – LSB d8) | Row |
|---|---|---|---|---|---|---|
| HEADER | | 00000000 | 11111111 | 11111111 | 11111111 | 0 |
| HEADER | | 11111111 | 11111111 | 11111111 | 11111111 | 1 |
| HEADER | | 11111111 | 11111111 | 11111111 | 00000000 | 2 |
| HEADER | | ClusterH | ClusterL | Sector (00h) | MODE (02h) | 3 |
| | | (00h) | (00h) | (00h) | (00h) | 4 |
| | | (00h) | (00h) | (00h) | (00h) | 5 |
| | | "M" | "D" | "A" | "D" | 6 |
| | | (Maker code) | (Model code) | (00h) | (00h) | 7 |
| | | Used Sector3 | Used Sector2 | Used Sector1 | Used Sector0 | 8 |
| | | (00h) | (00h) | (00h) | (00h) | 9 |
| | | (00h) | (00h) | (00h) | (00h) | 10 |
| POINTER SECTION | | (00h) | (00h) | (00h) | (P-EMPTY) | 11 |
| POINTER SECTION | | (P-BLANK) | (00h) | (00h) | (00h) | 12 |
| | | (00h) | (00h) | (00h) | (00h) | 13 |
| | | (00h) | (00h) | (00h) | (00h) | 14 |
| | | (00h) | (00h) | (00h) | (00h) | 15 |
| | | (00h) | (00h) | (00h) | (00h) | 16 |
| | | | | | | |
| | | (00h) | (00h) | (00h) | (00h) | 74 |
| | | (00h) | (00h) | (00h) | (00h) | 75 |
| | | (00h) | (00h) | (00h) | (00h) | 76 |
| | | (00h) | (00h) | (00h) | (00h) | 77 |
| TABLE SECTION (99 PART TABLES) | (01h) | Start address | | | (00h) | 78 |
| | | End address | | | (LINK INFORMATION) | 79 |
| | (02h) | Start address | | | (00h) | 80 |
| | | End address | | | (LINK INFORMATION) | 81 |
| | (03h) | Start address | | | (00h) | 82 |
| | | End address | | | (LINK INFORMATION) | 83 |
| | (04h) | Start address | | | (00h) | 84 |
| | | End address | | | (LINK INFORMATION) | 85 |
| | · · · | | | | | 86 |
| | (63h) | Start address | | | (00h) | 274 |
| | | End address | | | (LINK INFORMATION) | 275 |
| | (64h) | (zeros) | | | | 276 |
| | | (zeros) | | | | 277 |
| | · · · | (zeros) | | | | |
| | (FFh) | (zeros) | | | | 586 |
| | | (zeros) | | | | 587 |

AUX-TOC SECTOR 0

(AREA ALLOCATION TABLE)

FIG. 23

| | | 16bits even m | | 16bits odd m | | |
|---|---|---|---|---|---|---|
| | | Wm B | Wm A | Wm B | Wm A | |
| | | MSB d1 … LSB d8 | MSB d1 … LSB d8 | MSB d1 … LSB d8 | MSB d1 … LSB d8 | |
| HEADER | | 00000000 | 11111111 | 11111111 | 11111111 | 0 |
| HEADER | | 11111111 | 11111111 | 11111111 | 11111111 | 1 |
| HEADER | | 11111111 | 11111111 | 11111111 | 00000000 | 2 |
| HEADER | | ClusterH | ClusterL | Sector (01h) | MODE (02h) | 3 |
| | | (00h) | (00h) | (00h) | (00h) | 4 |
| | | (00h) | (00h) | (00h) | (00h) | 5 |
| | | "M" | "D" | "A" | "D" | 6 |
| | | (Maker code) | (Model code) | First PNO | Last PNO | 7 |
| | | (00h) | (00h) | (00h) | (00h) | 8 |
| | | (00h) | (00h) | (00h) | (00h) | 9 |
| | | (00h) | (00h) | (00h) | (00h) | 10 |
| POINTER SECTION | | (00h) | (00h) | (00h) | (P-EMPTY) | 11 |
| POINTER SECTION | | (P-PFRA) | P-PN01 | P-PN02 | P-PN03 | 12 |
| POINTER SECTION | | P-PN04 | P-PN05 | P-PN06 | P-PN07 | 13 |
| POINTER SECTION | | … | … | … | … | |
| POINTER SECTION | | P-PN092 | P-PN093 | P-PN094 | P-PN095 | 35 |
| POINTER SECTION | | P-PN096 | P-PN097 | P-PN098 | P-PN099 | 36 |
| | | (00h) | (00h) | (00h) | (00h) | 37 |
| | | … | … | … | … | |
| | | (00h) | (00h) | (00h) | (00h) | 74 |
| | | (00h) | (00h) | (00h) | (P-PN0255) | 75 |
| TABLE SECTION (99+1 PART TABLES) | (00h) | Start address (cover picture) | | | S. Pict. MODE | 76 |
| | | End address | | | (00h) | 77 |
| | (01h) | Start address | | | S. Pict. MODE | 78 |
| | | End address | | | (00h) | 79 |
| | (02h) | Start address | | | S. Pict. MODE | 80 |
| | | End address | | | (00h) | 81 |
| | (03h) | Start address | | | S. Pict. MODE | 82 |
| | | End address | | | (00h) | 83 |
| | (04h) | Start address | | | S. Pict. MODE | 84 |
| | | End address | | | (00h) | 85 |
| | . | | | | | 86 |
| | . | … | | | | |
| | (63h) | Start address | | | (00h) | 274 |
| | | End address | | | (LINK INFORMATION) | 275 |
| | (64h) | (zeros) | | | | 276 |
| | . | (zeros) | | | | 277 |
| | . | (zeros) | | | | |
| | . | … | | | | |
| | (FFh) | (zeros) | | | | 586 |
| | | (zeros) | | | | 587 |

AUX-TOC SECTOR 1
(PICTURE ALLOCATION TABLE)

FIG. 24

| | | 16bits even m: Wm B | 16bits even m: Wm A | 16bits odd m: Wm B | 16bits odd m: Wm A | |
|---|---|---|---|---|---|---|
| | | MSB d1 … LSB d8 | MSB d1 … LSB d8 | MSB d1 … LSB d8 | MSB d1 … LSB d8 | |
| HEADER | | 00000000 | 11111111 | 11111111 | 11111111 | 0 |
| HEADER | | 11111111 | 11111111 | 11111111 | 11111111 | 1 |
| HEADER | | 11111111 | 11111111 | 11111111 | 00000000 | 2 |
| HEADER | | ClusterH | ClusterL | Sector (02h) | MODE (02h) | 3 |
| | | (00h) | (00h) | (00h) | (00h) | 4 |
| | | (00h) | (00h) | (00h) | (00h) | 5 |
| | | "M" | "D" | "A" | "D" | 6 |
| | | (Maker code) | (Model code) | First PIF | Last PIF | 7 |
| | | (00h) | (00h) | (00h) | (00h) | 8 |
| | | (00h) | (00h) | (00h) | (00h) | 9 |
| | | (00h) | (00h) | (00h) | char. code | 10 |
| POINTER SECTION | | (00h) | (00h) | (00h) | (P-EMPTY) | 11 |
| POINTER SECTION | | (00h) | P-PIF1 | P-PIF2 | P-PIF3 | 12 |
| POINTER SECTION | | P-PIF4 | P-PIF5 | P-PIF6 | P-PIF7 | 13 |
| POINTER SECTION | | … | … | … | … | |
| POINTER SECTION | | P-PIF92 | P-PIF93 | P-PIF94 | P-PIF95 | 35 |
| POINTER SECTION | | P-PIF96 | P-PIF97 | P-PIF98 | P-PIF99 | 36 |
| | | (00h) | (00h) | (00h) | (00h) | 37 |
| | | … | … | … | … | |
| | | (00h) | (00h) | (00h) | (00h) | 74 |
| | | (00h) | (00h) | (00h) | (P-PIF255) | 75 |
| TABLE SECTION (255+1 SLOTS) | (00h) | Cover Picture information | | | | 76 |
| TABLE SECTION (255+1 SLOTS) | | Cover Picture information | | | LINK INFORMATION | 77 |
| TABLE SECTION (255+1 SLOTS) | (01h) | Cover Picture or still Picture information | | | | 78 |
| TABLE SECTION (255+1 SLOTS) | | Cover Picture or still Picture information | | | LINK INFORMATION | 79 |
| TABLE SECTION (255+1 SLOTS) | (02h) | Cover Picture or still Picture information | | | | 80 |
| TABLE SECTION (255+1 SLOTS) | | Cover Picture or still Picture information | | | LINK INFORMATION | 81 |
| TABLE SECTION (255+1 SLOTS) | (03h) | Cover Picture or still Picture information | | | | 82 |
| TABLE SECTION (255+1 SLOTS) | | Cover Picture or still Picture information | | | LINK INFORMATION | 83 |
| TABLE SECTION (255+1 SLOTS) | (04h) | Cover Picture or still Picture information | | | | 84 |
| TABLE SECTION (255+1 SLOTS) | | Cover Picture or still Picture information | | | LINK INFORMATION | 85 |
| TABLE SECTION (255+1 SLOTS) | ⋮ | | | | | 86 |
| TABLE SECTION (255+1 SLOTS) | | … | | | | |
| TABLE SECTION (255+1 SLOTS) | (63h) | Cover Picture or still Picture information | | | | 274 |
| TABLE SECTION (255+1 SLOTS) | | Cover Picture or still Picture information | | | LINK INFORMATION | 275 |
| TABLE SECTION (255+1 SLOTS) | (64h) | Cover Picture or still Picture information | | | | 276 |
| TABLE SECTION (255+1 SLOTS) | | Cover Picture or still Picture information | | | LINK INFORMATION | 277 |
| TABLE SECTION (255+1 SLOTS) | ⋮ | … | | | | |
| TABLE SECTION (255+1 SLOTS) | (FFh) | Cover Picture or still Picture information | | | | 586 |
| TABLE SECTION (255+1 SLOTS) | | Cover Picture or still Picture information | | | LINK INFORMATION | 587 |

AUX-TOC SECTOR 2
(PICTURE INFORMATION TABLE)

F I G. 25

| | | 16bits even m | | 16bits odd m | | |
|---|---|---|---|---|---|---|
| | | Wm B | Wm A | Wm B | Wm A | |
| | | MSB LSB | MSB LSB | MSB LSB | MSB LSB | |
| | | d1 d8 | d1 d8 | d1 d8 | d1 d8 | |
| HEADER | | 00000000 | 11111111 | 11111111 | 11111111 | 0 |
| HEADER | | 11111111 | 11111111 | 11111111 | 11111111 | 1 |
| HEADER | | 11111111 | 11111111 | 11111111 | 00000000 | 2 |
| HEADER | | ClusterH | ClusterL | Sector (03h) | MODE (02h) | 3 |
| | | (00h) | (00h) | (00h) | (00h) | 4 |
| | | (00h) | (00h) | (00h) | (00h) | 5 |
| | | "M" | "D" | "A" | "D" | 6 |
| | | (Maker code) | (Model code) | First TNP | Last TNP | 7 |
| | | (00h) | (00h) | (00h) | (00h) | 8 |
| | | (00h) | (00h) | (00h) | (00h) | 9 |
| | | (00h) | (00h) | (00h) | (00h) | 10 |
| POINTER SECTION | | (00h) | (00h) | (00h) | (P-EMPTY) | 11 |
| POINTER SECTION | | (00h) | P-TNP1 | P-TNP2 | P-TNP3 | 12 |
| POINTER SECTION | | P-TNP4 | P-TNP5 | P-TNP6 | P-TNP7 | 13 |
| POINTER SECTION | | | | | | |
| POINTER SECTION | | P-TNP92 | P-TNP93 | P-TNP94 | P-TNP95 | 35 |
| POINTER SECTION | | P-TNP96 | P-TNP97 | P-TNP98 | P-TNP99 | 36 |
| | | (00h) | (00h) | (00h) | (00h) | 37 |
| | | | | | | |
| | | (00h) | (00h) | (00h) | (00h) | 74 |
| | | (00h) | (00h) | (00h) | (P-TNP255) | 75 |
| TABLE SECTION (99+1 SLOTS) | (00h) | zeros | | | P-PNOj | 76 |
| TABLE SECTION (99+1 SLOTS) | | zeros | | | LINK INFORMATION | 77 |
| TABLE SECTION (99+1 SLOTS) | (01h) | Start offset address | | | P-PNOj | 78 |
| TABLE SECTION (99+1 SLOTS) | | End offset address | | | LINK INFORMATION | 79 |
| TABLE SECTION (99+1 SLOTS) | (02h) | Start offset address | | | P-PNOj | 80 |
| TABLE SECTION (99+1 SLOTS) | | End offset address | | | LINK INFORMATION | 81 |
| TABLE SECTION (99+1 SLOTS) | (03h) | Start offset address | | | P-PNOj | 82 |
| TABLE SECTION (99+1 SLOTS) | | End offset address | | | LINK INFORMATION | 83 |
| TABLE SECTION (99+1 SLOTS) | (04h) | Start offset address | | | P-PNOj | 84 |
| TABLE SECTION (99+1 SLOTS) | . | End offset address | | | LINK INFORMATION | 85 |
| TABLE SECTION (99+1 SLOTS) | . | | | | | 86 |
| TABLE SECTION (99+1 SLOTS) | (63h) | Start offset address | | | P-PNOj | 274 |
| TABLE SECTION (99+1 SLOTS) | | End offset address | | | LINK INFORMATION | 275 |
| TABLE SECTION (99+1 SLOTS) | (64h) | (zeros) | | | | 276 |
| | . | (zeros) | | | | 277 |
| | . | (zeros) | | | | |
| | (FFh) | (zeros) | | | | 586 |
| | | (zeros) | | | | 587 |

AUX-TOC SECTOR 3
(PICTURE PLAYBACK SEQUENCE TABLE)

FIG. 26

| | | 16bits even m | | 16bits odd m | | |
|---|---|---|---|---|---|---|
| | | Wm B | Wm A | Wm B | Wm A | |
| | | MSB LSB | MSB LSB | MSB LSB | MSB LSB | |
| | | d1 d8 | d1 d8 | d1 d8 | d1 d8 | |
| HEADER | | 00000000 | 11111111 | 11111111 | 11111111 | 0 |
| HEADER | | 11111111 | 11111111 | 11111111 | 11111111 | 1 |
| HEADER | | 11111111 | 11111111 | 11111111 | 00000000 | 2 |
| HEADER | | ClusterH | ClusterL | Sector (04h) | MODE (02h) | 3 |
| | | (00h) | (00h) | (00h) | (00h) | 4 |
| | | (00h) | (00h) | (00h) | (00h) | 5 |
| | | "M" | "D" | "A" | "D" | 6 |
| | | (Maker code) | (Model code) | First TXNO | Last TXNO | 7 |
| | | (00h) | (00h) | (00h) | (00h) | 8 |
| | | (00h) | (00h) | (00h) | (00h) | 9 |
| | | (00h) | (00h) | (00h) | (00h) | 10 |
| POINTER SECTION | | (00h) | (00h) | (00h) | (P-EMPTY) | 11 |
| POINTER SECTION | | (P-PFRA) | P-TXNO1 | P-TXNO2 | P-TXNO3 | 12 |
| POINTER SECTION | | P-TXNO4 | P-TXNO5 | P-TXNO6 | P-TXNO7 | 13 |
| POINTER SECTION | | | | | | |
| POINTER SECTION | | P-TXNO92 | P-TXNO93 | P-TXNO94 | P-TXNO95 | 35 |
| POINTER SECTION | | P-TXNO96 | P-TXNO97 | P-TXNO98 | P-TXNO99 | 36 |
| | | (00h) | (00h) | (00h) | (00h) | 37 |
| | | | | | | |
| | | (00h) | (00h) | (00h) | (00h) | 74 |
| | | (00h) | (00h) | (00h) | (P-TXNO255) | 75 |
| TABLE SECTION (99+1 PART TABLES) | (00h) | Start address (cover text) | Start address (cover text) | Start address (cover text) | Text MODE | 76 |
| | | End address | End address | End address | LINK INFORMATION | 77 |
| | (01h) | Start address | Start address | Start address | Text MODE | 78 |
| | | End address | End address | End address | LINK INFORMATION | 79 |
| | (02h) | Start address | Start address | Start address | Text MODE | 80 |
| | | End address | End address | End address | LINK INFORMATION | 81 |
| | (03h) | Start address | Start address | Start address | Text MODE | 82 |
| | | End address | End address | End address | LINK INFORMATION | 83 |
| | (04h) | Start address | Start address | Start address | Text MODE | 84 |
| | . | End address | End address | End address | LINK INFORMATION | 85 |
| | . | | | | | 86 |
| | . | | | | | |
| | (63h) | Start address | Start address | Start address | Text MODE | 274 |
| | | End address | End address | End address | LINK INFORMATION | 275 |
| | (64h) | (zeros) | (zeros) | (zeros) | | 276 |
| | . | (zeros) | (zeros) | (zeros) | | 277 |
| | . | (zeros) | (zeros) | (zeros) | | |
| | . | | | | | |
| | | (zeros) | (zeros) | (zeros) | | 586 |
| | (FFh) | (zeros) | (zeros) | (zeros) | | 587 |

AUX-TOC SECTOR 4
(TEXT ALLOCATION TABLE)

F I G. 27

| | | 16bits even m | | 16bits odd m | | |
|---|---|---|---|---|---|---|
| | | Wm B | Wm A | Wm B | Wm A | |
| | | MSB LSB | MSB LSB | MSB LSB | MSB LSB | |
| | | d1 d8 | d1 d8 | d1 d8 | d1 d8 | |
| HEADER | | 00000000 | 11111111 | 11111111 | 11111111 | 0 |
| HEADER | | 11111111 | 11111111 | 11111111 | 11111111 | 1 |
| HEADER | | 11111111 | 11111111 | 11111111 | 00000000 | 2 |
| HEADER | | ClusterH | ClusterL | Sector (05h) | MODE (02h) | 3 |
| | | (00h) | (00h) | (00h) | (00h) | 4 |
| | | (00h) | (00h) | (00h) | (00h) | 5 |
| | | "M" | "D" | "A" | "D" | 6 |
| | | (Maker code) | (Model code) | First TXIF | Last TXIF | 7 |
| | | (00h) | (00h) | (00h) | (00h) | 8 |
| | | (00h) | (00h) | (00h) | (00h) | 9 |
| | | (00h) | (00h) | (00h) | char. code | 10 |
| POINTER SECTION | | (00h) | (00h) | (00h) | (P-EMPTY) | 11 |
| POINTER SECTION | | (00h) | P-TXIF1 | P-TXIF2 | P-TXIF3 | 12 |
| POINTER SECTION | | P-TXIF4 | P-TXIF5 | P-TXIF6 | P-TXIF7 | 13 |
| POINTER SECTION | | | | | | |
| POINTER SECTION | | P-TXIF92 | P-TXIF93 | P-TXIF94 | P-TXIF95 | 35 |
| POINTER SECTION | | P-TXIF96 | P-TXIF97 | P-TXIF98 | P-TXIF99 | 36 |
| | | (00h) | (00h) | (00h) | (00h) | 37 |
| | | | | | | |
| | | (00h) | (00h) | (00h) | (00h) | 74 |
| | | (00h) | (00h) | (00h) | (P-TXIF255) | 75 |
| TABLE SECTION (255+1 SLOTS) | (00h) | Cover text information | | | | 76 |
| | | Cover text information | | | LINK INFORMATION | 77 |
| | (01h) | Cover text or text information | | | | 78 |
| | | Cover text or text information | | | LINK INFORMATION | 79 |
| | (02h) | Cover text or text information | | | | 80 |
| | | Cover text or text information | | | LINK INFORMATION | 81 |
| | (03h) | Cover text or text information | | | | 82 |
| | | Cover text or text information | | | LINK INFORMATION | 83 |
| | (04h) | Cover text or text information | | | | 84 |
| | | Cover text or text information | | | LINK INFORMATION | 85 |
| | ⋮ | | | | | 86 |
| | (63h) | Cover text or text information | | | | 274 |
| | | Cover text or text information | | | LINK INFORMATION | 275 |
| | (64h) | Cover text or text information | | | | 276 |
| | | Cover text or text information | | | LINK INFORMATION | 277 |
| | ⋮ | | | | | |
| | (FFh) | Cover text or text information | | | | 586 |
| | | Cover text or text information | | | LINK INFORMATION | 587 |

AUX-TOC SECTOR 5
(TEXT INFORMATION TABLE)

FIG. 28

| | 16bits even m | | 16bits odd m | | |
|---|---|---|---|---|---|
| | Wm B | Wm A | Wm B | Wm A | |
| | MSB LSB | MSB LSB | MSB LSB | MSB LSB | |
| | d1 d8 | d1 d8 | d1 d8 | d1 d8 | |
| HEADER | 00000000 | 11111111 | 11111111 | 11111111 | 0 |
| HEADER | 11111111 | 11111111 | 11111111 | 11111111 | 1 |
| HEADER | 11111111 | 11111111 | 11111111 | 00000000 | 2 |
| HEADER | ClusterH | ClusterL | Sector | MODE(02h) | 3 |
| Reserved | (00h) | (00h) | (00h) | (00h) | 4 |
| Reserved | (00h) | (00h) | (00h) | (00h) | 5 |
| DATA AREA | DP0 | DP1 | DP2 | DP3 | 6 |
| DATA AREA | DP4 | DP5 | DP6 | DP7 | 7 |
| DATA AREA | | | | | 57 |
| DATA AREA | | | | | 58 |
| DATA AREA | | | | | 110 |
| DATA AREA | | | | | 111 |
| DATA AREA | | | | | 163 |
| DATA AREA | | | | | 164 |
| DATA AREA | | | | | 216 |
| DATA AREA | | | | | 217 |
| DATA AREA | | | | | 269 |
| DATA AREA | | | | | 270 |
| DATA AREA | | | | | 322 |
| DATA AREA | | | | | 323 |
| DATA AREA | | | | | 375 |
| DATA AREA | | | | | 376 |
| DATA AREA | | | | | 428 |
| DATA AREA | | | | | 429 |
| DATA AREA | | | | | 481 |
| DATA AREA | | | | | 482 |
| DATA AREA | | | | | 534 |
| DATA AREA | | | | | 535 |
| DATA AREA | DP2320 | DP2321 | DP2322 | DP2323 | 586 |
| DATA AREA | (00h) | (00h) | (00h) | (00h) | 587 |

PICTURE FILE SECTOR

FIG. 29

| | 16bits even m | | 16bits odd m | | |
|---|---|---|---|---|---|
| | Wm B | Wm A | Wm B | Wm A | |
| | MSB LSB | MSB LSB | MSB LSB | MSB LSB | |
| | d1 d8 | d1 d8 | d1 d8 | d1 d8 | |
| HEADER | 00000000 | 11111111 | 11111111 | 11111111 | 0 |
| | 11111111 | 11111111 | 11111111 | 11111111 | 1 |
| | 11111111 | 11111111 | 11111111 | 00000000 | 2 |
| | ClusterH | ClusterL | Sector | MODE (02h) | 3 |
| Reserved | (00h) | (00h) | (00h) | (00h) | 4 |
| | (00h) | (00h) | (00h) | (00h) | 5 |
| DATA AREA | DT0 | DT1 | DT2 | DT3 | 6 |
| | DT7 | DT5 | DT6 | DT7 | 7 |
| | | | | | |
| | | | | | 57 |
| | | | | | 58 |
| | | | | | 110 |
| | | | | | 111 |
| | | | | | 163 |
| | | | | | 164 |
| | | | | | 216 |
| | | | | | 217 |
| | | | | | 269 |
| | | | | | 270 |
| | | | | | 322 |
| | | | | | 323 |
| | | | | | 375 |
| | | | | | 376 |
| | | | | | 428 |
| | | | | | 429 |
| | | | | | 481 |
| | | | | | 482 |
| | | | | | 534 |
| | | | | | 535 |
| | DT2320 | DT2321 | DT2322 | DT2323 | 586 |
| | (00h) | (00h) | (00h) | (00h) | 587 |

TEXT FILE SECTOR

FIG. 30A

| | | |
|---|---|---|
| d1, d2 (COPY STATUS) | 0h | COPY PERMITTED |
| | 1h | COPY PERMITTED ONLY ONCE |
| | 2h | COPY PERMITTED ONLY ONCE THROUGH AUTHENTICATED BUS (COPY INHIBITED THROUGH BUS NOT AUTHENTICATED) |
| | 3h | COPY INHIBITED |
| d3～d8 | Reserved(NOT DEFINED) | |

S. Pict. MODE (COPY STATUS)

FIG. 30B

| | BEFORE COPY | AFTER COPY |
|---|---|---|
| COPY STATUS | 0h (COPY PERMITTED) | 0h (COPY PERMITTED) |
| | 1h (COPY PERMITTED ONLY ONCE) | 3h (COPY INHIBITED) |
| | 2h (COPY PERMITTED ONLY ONCE THROUGH AUTHENTICATED BUS) | 3h (COPY INHIBITED) |
| | 3h (COPY INHIBITED) | —— |

COPY STATUS UPDATING TABLE

DATA STRUCTURE OF PICTURE (TEXT) INFORMATION FILE

FIG. 32

| | | |
|---|---|---|
| d1–d2 (COPY STATUS) | 0h | COPY PERMITTED |
| | 1h | COPY PERMITTED ONLY ONCE |
| | 2h | COPY PERMITTED ONLY ONCE THROUGH AUTHENTICATED BUS (COPY INHIBITED THROUGH BUS NOT AUTHENTICATED) |
| | 3h | COPY INHIBITED |
| d3–d4 | 0h | sung text |
| | 1h | ARTIST INFORMATION |
| | 2h | LINER NOTE |
| | 3h | OTHERS |
| d5 | 0 | TIME STAMP ABSENT |
| | 1 | TIME STAMP PRESENT |
| d6–d7–d8 | 0h | ASCII |
| | 1h | modified ISO 8859-1 |
| | 2h | Music Shifted JIS |
| | 3h | KS C 5601-1989 |
| | 4h | GB2312-80 |
| | 5h | reserved |
| | 6h | reserved |
| | 7h | plain text |

Text MODE

| PIN NUMBER | SIGNAL |
|---|---|
| 1 | VP (POWER SUPPLY) |
| 2 | VG (GROUND) |
| 3 | TPB1 |
| 4 | TPB2 |
| 5 | TPA1 |
| 6 | TPA1 |

| PIN NUMBER | SIGNAL |
|---|---|
| 1 | VP |
| 2 | VG |
| 3 | TPB1 |
| 4 | TPB2 |
| 5 | TPA1 |
| 6 | TPA2 |

FIG. 37A Data (TPBout-TPAin)

FIG. 37B Strobe (TPAout-TPBin)

FIG. 37C Clock (Data^Strobe)

IEEE 1394 BUS CONNECTION

F I G. 41A

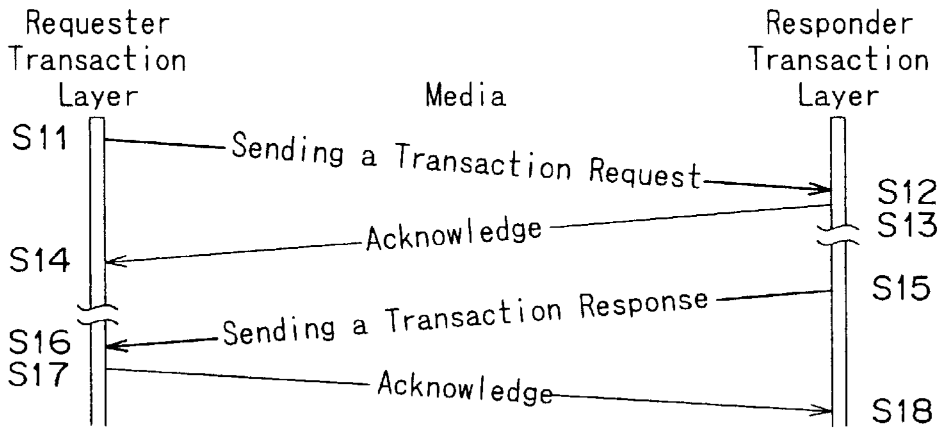

F I G. 41B

| Sending a Transaction Request | Sending a Transaction Response |
|---|---|
| Write Request (data quadlet) | Write Response<br>No Response (Unified Transaction) |
| Write Request (data block:data length=4byte | |
| Write Request (data block:data length≠4byte | |
| Read Request (data quadlet) | Read Response (data quadlet) |
| Read Request (data block:data length=4byte | Read Response (data block) |
| Read Request (data block:data length≠4byte | |
| Lock Request | Lock Response |

FIG. 43

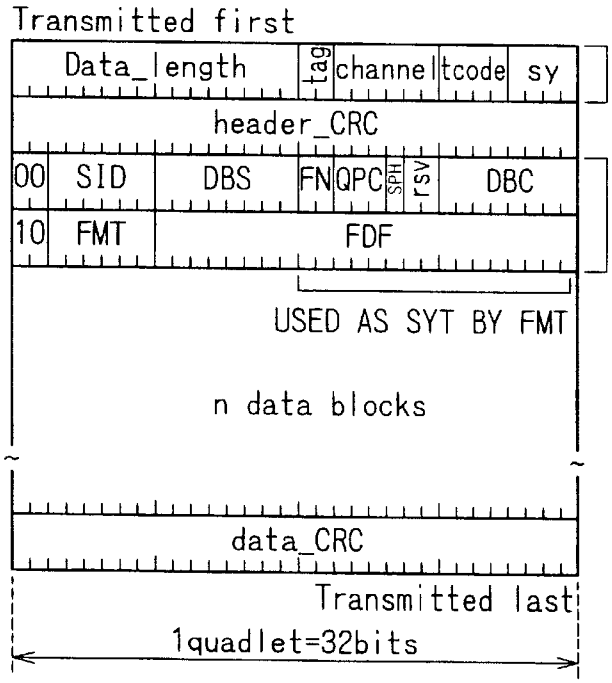

1394 PACKET HEADER

CIP HEADER

SID TRANSMISSION NODE NUMBER
DBS UNIT FOR PACKETIZATION (SIZE OF DATA BLOCK)
FN NUMBER OF DIVISIONS UPON PACKETIZATION
QPC NUMBER OF QUADLETS ADDED FOR DIVISION
SPH FLAG OF HEADER OF SOURCE PACKET
DBC COUNTER FOR DETECTING DROP OF PACKET
FMT SIGNAL FORMAT
FDF FORMAT DEPENDING FIELD

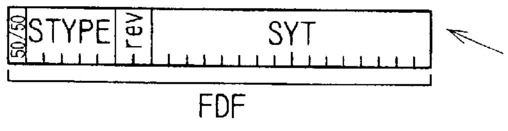

(FOR MPBG)
TSF TIME SHIFT FLAG
(FOR DVCR)
50/60 NUMBER OF FIELDS PER ONE SECOND
STYPE VIDEO FORMAT (SD OR HD)
SYT TIME STAMP FOR FRAME SYNCHRONIZATION

| | |
|---|---|
| CTS | ID of command set |
| ctype | Type of function of command |
| response | Result of processing of command |
| subunit type | Address(specifies functional unit in apparatus) |
| id | Address(identifies subunit of the same type) |
| opcode | command |
| operand | Parameter of command |

FIG. 48 ctype/response

| | | |
|---|---|---|
| Command | 0000 | CONTROL |
| | 0001 | STATUS |
| | 0010 | INQUIRY |
| | 0011 | NOTIFY |
| | 0100 ~ 0111 | (reserved) |
| Response | 1000 | NOT IMPLEMENTED |
| | 1001 | ACCEPTED |
| | 1010 | REJECTED |
| | 1011 | IN TRANSITION |
| | 1100 | IMPLEMENTED/STABLE |
| | 1101 | CHANGED |
| | 1110 | (reserved) |
| | 1111 | INTERIM |

FIG. 49A subunit_type

| | |
|---|---|
| 00000 | Monitor |
| ~ | (reserved) |
| 00011 | Disc recorder/player |
| 00100 | VCR |
| 00101 | Tuner |
| 00111 | Camera |
| ~ | (reserved) |
| 11111 | Unit* |

FIG. 49B opcode : Operation Code

| | |
|---|---|
| 00h | VENDOR-DEPENDENT |
| 50h | SEARCH MODE |
| 52h | ATN |
| 60h | OPEN MIC |
| 61h | READ MIC |
| 62h | WRITE MIC |
| C1h | LOAD MEDIUM |
| C2h | RECORD |
| C3h | PLAY |
| C4h | WIND |
| ~ | ~ |

* TABLE OF opcode IS PROVIDED FOR EACH subunit

* operand IS DEFINED FOR EACH opcode

| Address offset | Description |
|---|---|
| 0 | consumer port |
| 4 | producer port[1] |
| 8.12....52 | producer port[2]−to−port[3] |
| 56 | port[14] |
| 60 | reserved |
| 64 | Segment buffer |

plug address space components

Asynchronous plug organization (2)

Asynchronous Connection
TRANSMISSION/RECEPTION PROCEDURE

FIG. 57

Record Object Command

| | | |
|---|---|---|
| opcode | C2h | 1Byte |
| operand0 | result | |
| operand1 | subfunction1 | |
| operand2 | subfunction2 (00h) | |
| operand3 | plug type (01h) | |
| operand4 | plug ID | |
| operand5 | new object position number (FFFFh) | |
| operand6 | destination List_ID | |

FIG. 58

| | | |
|---|---|---|
| subfunction1 | 01h~FEh | Number of objects to be recorded |
| | FFh | Number of objects not designated |
| plug type | 00h | Source plug |
| | 01h | Destination plug |
| plug ID | 01h | DSI |
| | 02h | text |
| destination List_ID | 1020h | DSI |
| | 11xxh | text |
| | 1100h | Cover text |

FIG. 59

Object Number Select Command

| | | |
|---|---|---|
| opcode | 0Dh | 1Byte |
| operand0 | Source_plug | |
| operand1 | subfunction(Only D3h is accepted) | |
| operand2 | status(FFh) | |
| operand3 | number ONS selection | |
| operand4 | Root_list_ID (1000h) | |
| operand5 | selection_indicator | |
| operand6 | Target_depth(FFh) | |
| operand7 | List_ID | |
| operand8 | target object_position | |
| | ⋮ | |

FIG. 60

| | | |
|---|---|---|
| Source_plug | 01h | DSI |
| | 02h | text |
| Selection Indicator | 00h | Designation of entire object |
| | 01h | Designation of child |
| List_ID | 1020h | DSI |
| | 11xxh | text |
| | 1100h | Cover text |

FIG. 61

Stop Command

| | | |
|---|---|---|
| opcode | C5h | 1Byte |
| operand0 | result | |
| operand1 | subfunction1 (00h) | |
| operand2 | subfunction2 (00h) | |
| operand3 | plug type | |
| operand4 | plug ID | |

FIG. 62

| | | |
|---|---|---|
| plug type | 00h | Source plug |
| | 01h | Destination plug |
| plug ID | 01h | DSI |
| | 02h | text |

MD AUX DATA RECORDING PROCESSING

MD AUX DATA REPRODUCTION PROCESSING

TRANSMISSION APPARATUS, RECORDING APPARATUS, TRANSMISSION AND RECEPTION APPARATUS, TRANSMISSION METHOD, RECORDING METHOD AND TRANSMISSION AND RECEPTION METHOD

BACKGROUND OF THE INVENTION

1. Field of the Invention

This invention relates to a transmission apparatus, a recording apparatus, a transmission and reception apparatus, a transmission method, a recording method and a transmission and reception method by which data are transmitted and received through a data interface in accordance with a predetermined data communication format.

2. Description of the Related Art

As a recording apparatus and/or a reproduction apparatus which can record and/or reproduce music and so forth, a recording apparatus and/or a reproduction apparatus are known on which a magneto-optical disc, a magnetic tape or the like on which an audio signal is recorded as a digital signal is used as a recording medium. A mini disc (Trade Mark) is known as such a magneto-optical disc as mentioned above. In a recording and reproduction system in which the magneto-optical disc is used, a user can not only record and reproduce an audio signal of tunes and so forth as programs, but also record a title unique to the recording medium, that is, a disc name, and titles, that is, track names, of the programs such as tunes recorded on the recording medium as character information on the recording medium. For example, upon reproduction, the disc title, the titles of the tunes, the names of artists and so forth can be displayed on a display section of a reproduction apparatus.

It is to be noted that, in the present specification, the term "program" is used to signify a unit of audio data or the like such as a tune as main data recorded on a disc. For Example, audio data for one tune make one program. Also the term "track" is used in the same significance as the "program".

A mini disc system in which a mini disc is used as a recording medium has been proposed by the Assignee of the present invention wherein a recording area. into which sub data incidental to audio data as main data can be recorded is provided separately from a recording area into which the main data are recorded on a mini disc such that still picture data and character data can be recorded as the sub data. It is to be noted that the character data in the present specification include also data of symbols, marks and so forth.

For example, also a conventional mini disc system different from the mini disc system described above can record character information such as a disc name and a track name. Such character information is recorded in a corresponding relationship to each program in the U-TOC (User Table Of Contents) of a mini disc. However, since the U-TOC itself does not have a very large capacity, it merely allows recording of characters of titles and so forth as described above.

In contrast, where an area exclusively used to record sub data therein is provided on a mini disc, it can be realized readily to record not only character information but also video data which do not require a very large capacity such as, for example, a still picture.

In recent years, digital direct broadcasting has spread progressively. The digital direct broadcasting is tough against noise and fading, for example, when compared with existing analog broadcasting, and allows transmission of a signal of a high quality. Further, the digital direct broadcasting exhibits an augmented frequency utilization efficiency and allows utilization of multiple channels. In particular, the digital direct broadcasting allows assurance of several hundreds channels with one satellite. In such digital direct broadcasting, a large number of exclusive channels for sports, motion pictures, music, news and so forth are prepared, and programs for respectively exclusive contents are broadcast in the exclusive channels.

It has been proposed to make use of such a digital direct broadcasting system as described above so that a user can download audio data of a tune or the like or can, for example, make a purchase contract regarding some commodity while observing a broadcasting screen. In short, the digital direct broadcasting system involves data service broadcasting together with broadcasting of ordinary broadcasting contents.

As an example, in downloading of music data, the broadcasting side multiplexes tune data and video data of an album jacket or the like and text data of liner notes, that is, sentences regarding tunes, artists and so forth, incidental to the tune data and broadcasts the multiplexed data in parallel to a broadcasting program. Upon downloading of such tune data and incidental information, a GUI (Graphical User Interface) screen, which is an operation screen for downloading, is displayed so that a user can perform interactive operations. Also data for such GUI screen outputting are broadcast in a multiplexed condition.

On the user side who owns a reception apparatus, while a desired channel is selected, a predetermined operation is performed for the reception apparatus so that a GUI screen for downloading tune data is displayed or outputted. Then, the user performs an operation for the operation screen displayed in this manner so that, for example, the data are supplied to and recorded by a digital audio apparatus connected to the reception apparatus.

Further, in recent years, a data transmission system has been proposed wherein various electronic apparatus such as digital AV (Audio Visual) apparatus and a personal computer apparatus are connected to each other, for example, by an IEEE (Institute of Electrical Engineers) 1394 bus so that data may be communicated between them.

From the technical background described above, it is a possible idea to provide a system wherein audio data as main data and video data and text data as sub data incidental to the audio data which can be handled by the mini disc system described above are broadcast as download data, for example, by digital direct broadcasting such that the user side can receive the download data by means of a digital direct broadcasting reception apparatus and record the received download data onto a mini disc by means of a mini disc player over an IEEE 1394 bus.

Further, if a personal computer apparatus or some other AV apparatus is connected to a mini disc player of such a system as just described over an IEEE 1394 bus, then also it is possible, for example, to fetch data reproduced by the AV apparatus into the personal computer apparatus and perform editing processing and so forth for the data using the personal computer or to cause the personal computer to perform operation control for some other AV apparatus.

Where the AV system whose components are connected to each other by the IEEE 1394 bus as described above transmits audio data as main data and video data or text data as sub data which are handled by the mini disc system described above, it is preferable to establish a transmission form which exhibits an efficiency as high as possible taking, for example, a burden to hardware, software and so forth into consideration while the IEEE 1394 standard is observed.

SUMMARY OF THE INVENTION

It is an object of the present invention to provide a transmission apparatus, a recording apparatus, a transmission and reception apparatus, a transmission method, a recording method and a transmission and reception method by which data can be communicated between different apparatus over a single data bus in accordance with a first communication method wherein data can be transmitted and/or received periodically and a second communication method wherein data can be transmitted and/or received asynchronously.

In order to attain the object described above, according to a first aspect of the present invention, there is provided an information transmission apparatus which can communicate data with another apparatus over a single data bus in accordance with a first communication system wherein data can be transmitted periodically and a second communication system wherein data can be transmitted asynchronously, including discrimination means for discriminating whether data to be transmitted are main data to be outputted successively in time or sub data relating to the main data and transmission means for transmitting, when the discrimination means discriminates that the data to be transmitted are main data to be outputted successively in time, the data in accordance with the first communication system but transmitting, when the discrimination means discriminates that the data are sub data relating to the main data, the data in accordance with the second communication system.

According to a second aspect of the present invention, there is provided a recording apparatus which communicates data over a single data bus in accordance with a first communication system wherein data can be received periodically and a second communication system wherein data can be received asynchronously and records the received data onto a recording medium, including discrimination means for discriminating whether data received are main data transmitted thereto in accordance with the first communication system and to be outputted successively in time or sub data transmitted in accordance with the second communication system and relating to the main data and recording means for recording, when the discrimination means discriminates that the received data are main data to be outputted successively in time, the received main data into a first area of the recording medium but recording, when the discrimination means discriminates that the received data are sub data relating to the main data, the received sub data into a second area of the recording medium.

According to a third aspect of the present invention, there is provided a transmission and reception system, including first reception means for receiving main data to be outputted successively in time and sub data relating to the main data, transmission means for transmitting the main data received by the first reception means and to be outputted successively in time in accordance with a first communication system wherein data can be transmitted periodically and transmitting the sub data relating to the main data in accordance with a second communication system wherein data can be transmitted asynchronously, second reception means for receiving the main data and the sub data transmitted from the transmission means over a single cable, and separation means for separating the main data transmitted in accordance with the first communication system and received by the second reception means and the sub data transmitted in accordance with the second communication system and received by the second reception means from each other.

According to a fourth aspect of the present invention, there is provided an information transmission method by which data can be communicated between different apparatus over a single data bus in accordance with a first communication system wherein data can be transmitted periodically and a second communication system wherein data can be transmitted asynchronously, including the steps of discriminating whether data to be transmitted are main data to be outputted successively in time or sub data relating to the main data, and transmitting, when it is discriminated by the discriminating step that the data to be transmitted are main data to be outputted successively in time, the data in accordance with the first communication system but transmitting, when it is discriminated by the discriminating step that the data are sub data relating to the main data, the data in accordance with the second communication system.

According to a fifth aspect of the present invention, there is provided a recording method by which data are communicated over a single data bus in accordance with a first communication system wherein data can be received periodically and a second communication system wherein data can be received asynchronously and the received data are recorded onto a recording medium, including the steps of discriminating whether data received are main data transmitted thereto in accordance with the first communication system and to be outputted successively in time or sub data transmitted in accordance with the second communication system and relating to the main data, and recording, when it is discriminated by the discriminating step that the received data are main data to be outputted successively in time, the received main data into a first area of the recording medium but recording, when it is discriminated by the discriminating step that the received data are sub data relating to the main data, the received sub data into a second area of the recording medium.

According to a sixth aspect of the present invention, there is provided a transmission and reception method, including a first receiving step of receiving main data to be outputted successively in time and sub data relating to the main data, a transmitting step of transmitting the received main data to be outputted successively in time in accordance with a first communication system wherein data can be transmitted periodically and transmitting the sub data relating to the main data in accordance with a second communication system wherein data can be transmitted asynchronously, a second receiving step of receiving the main data and the sub data transmitted in the transmitting step over a single cable, and a separating step of separating the received main data transmitted in accordance with the first communication system and the received sub data transmitted in accordance with the second communication system from each other.

The above and other objects, features and advantages of the present invention will become apparent from the following description and the appended claims, taken in conjunction with the accompanying drawings in which like parts or elements denoted by like reference symbols.

BRIEF DESCRIPTION OF THE DRAWINGS

FIG. 17 is a diagrammatic view illustrating a data structure of the U-TOC sector 0 recorded in the management area;

FIG. 19 is a diagrammatic view illustrating a data structure of the U-TOC sector 1 recorded in the management area shown in FIG. 16B;

FIG. 20 is a diagrammatic view illustrating a data structure of the U-TOC sector 2 recorded in the management area;

FIG. 21 is a diagrammatic view illustrating a data structure of the U-TOC sector 4 recorded in the management area;

FIG. 22 is a diagrammatic view illustrating a data structure of the AUX-TOC sector 0 recorded in the management area;

FIG. 23 is a diagrammatic view illustrating a data structure of the AUX-TOC sector 1 recorded in the management area;

FIG. 24 is a diagrammatic view illustrating a data structure of the AUX-TOC sector 2 recorded in the management area;

FIG. 25 is a diagrammatic view illustrating a data structure of the AUX-TOC sector 3 recorded in the management area;

FIG. 26 is a diagrammatic view illustrating a data structure of the AUX-TOC sector 4 recorded in the management area;

FIG. 27 is a diagrammatic view illustrating a data structure of the AUX-TOC sector 5 recorded in the management area;

FIG. 28 is a diagrammatic view illustrating a data structure of AUX picture file data recorded in an AUX data area of the management area shown in FIG. 16B;

FIG. 29 is a diagrammatic view illustrating a data structure of AUX text file data recorded in the AUX data area of the management area;

FIG. 30A is a diagrammatic view illustrating a table for a copy status regarding a picture file;

FIG. 30B is a diagrammatic view illustrating a copy status updating table;

FIG. 32 is a diagrammatic view showing a table illustrating contents of definitions for a text mode set in part tables of the AUX-TOC sector 4 shown in FIG. 26;

FIG. 41A is a processing transition diagram illustrating basic transactions in asynchronous communication;

FIG. 41B is a table illustrating particular contents of a transaction request;

FIG. 43 is a diagrammatic view showing a data structure of a CIP;

FIG. 48 is a table illustrating contents of definitions of a c-type and a response;

FIG. 49A is a table for $subunit_{13}$ type used in an apparatus having a plurality of functions;

FIG. 49B is a table for opcode which is an operation code;

FIG. 57 is a diagrammatic view showing a data structure of a record object command;

FIG. 58 is a diagrammatic view showing a table for a plug type;

FIG. 59 is a diagrammatic view showing a data structure of an ONS command;

FIG. 60 is a diagrammatic view showing a data structure of a selection indicator;

FIG. 61 is a diagrammatic view showing a data structure of a stop command in an AV/C command packet;

FIG. 62 is a diagrammatic view showing a table for a plug type and a plug ID in the stop command illustrated in FIG. 61;

DESCRIPTION OF THE PREFERRED EMBODIMENT

A preferred embodiment of the present invention is described below.

The description proceeds in the following order.

1. Digital Direct Broadcast Reception System
1-1. General Construction
1-2. Operation for GUI Screen
1-3. Terrestrial Station
1-4. Transmission Format
1-5. IRD
1-6. Mini Disc Recording and Reproduction Apparatus
1-6-1. Construction of MD Recorder/Player
1-6-2. Sector Format and Address Format
1-6-3. Area Structure
1-6-4. U-TOC
1-6-4-1. U-TOC Sector 0
1-6-4-2. U-TOC Sector 1
1-6-4-3. U-TOC Sector 2
1-6-4-4. U-TOC Sector 4
1-6-5. AUX-TOC
1-6-5-1. AUX-TOC Sector 0
1-6-5-2. AUX-TOC Sector 1
1-6-5-3. AUX-TOC Sector 2
1-6-5-4. AUX-TOC Sector 3
1-6-5-5. AUX-TOC Sector 4
1-6-5-6. AUX-TOC Sector 5
1-6-6. Data File
1-6-6-1. Picture File Sector
1-6-6-2 Text File Sector
1-7. Personal Computer
2. Data Transmission by IEEE 1394 in the Embodiment
2-1. Outline
2-2. Stack Model
2-3. Signal Transmission Form
2-4. Bus Connection between Apparatus
2-5. Packet
2-6. Transaction Rule
2-7. Addressing
2-8. CIP (Common Isochronous Packet)
2-9. Connection Management
2-10. Command and Response in FCP
2-11. AV/C Command Packet
2-12. Plug for Asynchronous Communication
2-13. Asynchronous Connection Transmission Procedure
2-14. Concept of Plug in AUX Data Transmission
2-15. Example of Object List
2-16. Record Object Command
2-17. Object Number Select Command
2-18. Stop Command
2-19. AUX Data Recording Processing
2-20. AUX Data Reproduction Processing

1. Digital Direct Broadcast Reception System

1-1. General Construction

In the present embodiment, an AV system which transmits and receives data over an IEEE 1394 bus is described as an example. The AV system is generally constructed such that it can receive a digital direct broadcast and download the received data.

Thus, an outline of a digital direct broadcast transmission and reception system including the AV system as the embodiment of the present invention is described.

Figure 1:
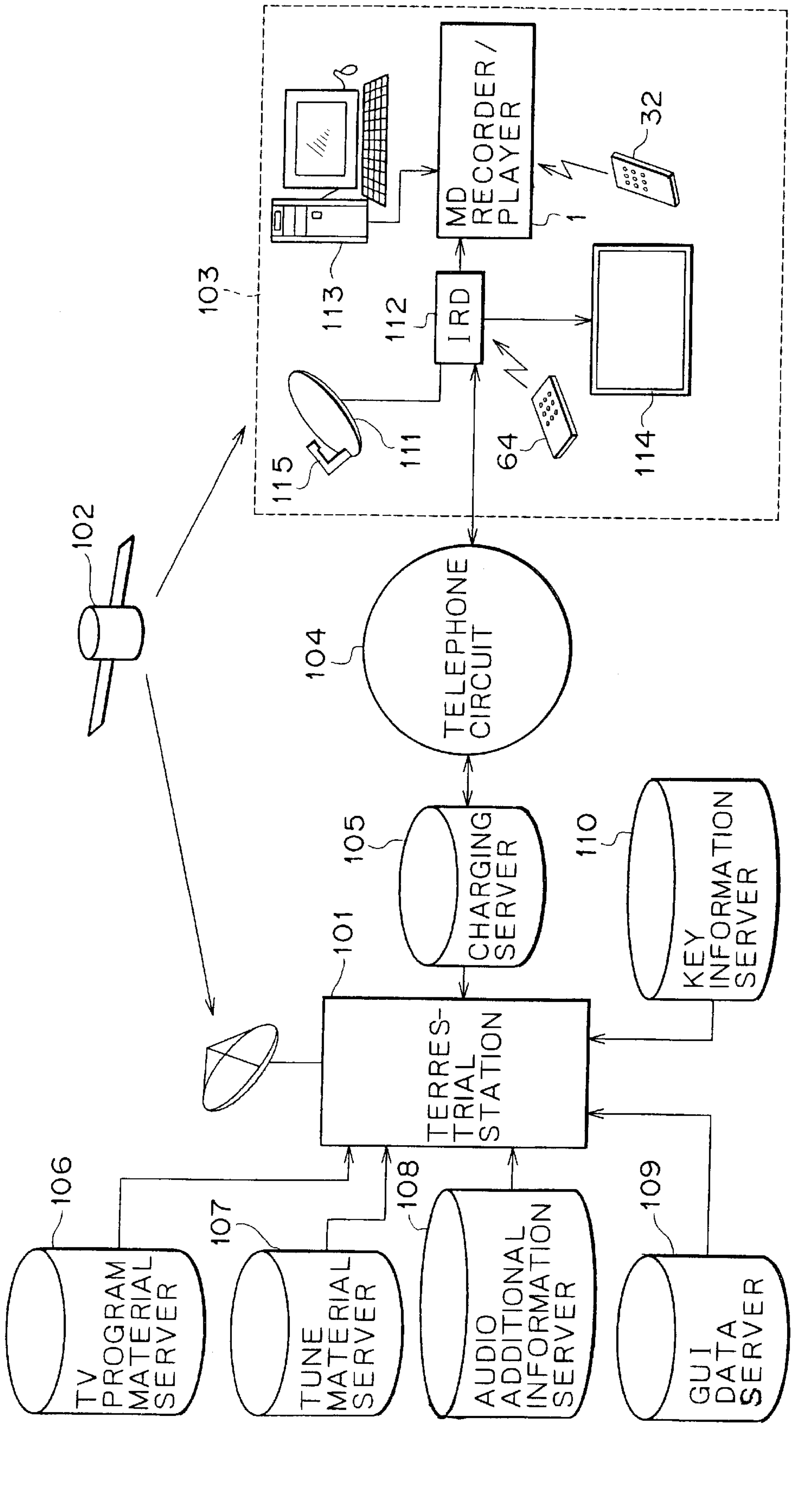
FIG. 1 is a block diagram showing a digital direct broadcast reception system to which the present invention is applied.

FIG. 1 shows a general construction of the digital direct broadcasting system of the present embodiment. Referring to FIG. 1, a material for television program broadcasting from a television program material server 106, a material of tune data from a tune material server 107, audio additional information from an audio additional information server 108 and GUI data from a GUI data server 109 are sent to a terrestrial station 101 for digital direct broadcasting.

The television program material server 106 provides a material for an ordinary broadcasting program. The material for audio broadcasting sent from the television program material server 106 includes video and audio information. For example, in an audio broadcasting program, video and audio materials of the television program material server 106 are utilized to broadcast video and audio, for example, for promotion of a new tune.

The tune material server 107 provides an audio program using an audio channel. The audio program uses only audio data as a material. The tune material server 107 transmits a plurality of materials for audio programs of different audio channels to the terrestrial station 101.

In a broadcast of a program of each audio channel, the same tune is broadcast repetitively within a predetermined unit time. The audio channels are independent of each other and can be utilized in various manners. For example, in an audio channel, a Japanese popular tune is repetitively broadcast within a certain fixed time while, in another audio channel, a latest foreign popular tune is repetitively broadcast within another certain time.

The audio additional information server 108 provides time information and so forth of a tune outputted from the tune material server 107.

The GUI data server 109 provides "GUI data" to be used to form a GUI screen which is used for operation by a user. For example, such a GUI screen regarding downloading of a tune as hereinafter described provides video data and/or text data to be used to form a list page of tunes to be distributed or an information page of such tunes or a still picture of an album jacket. Further, also EPG (Electrical Program Guide) data which are used to display a program list called EPG on the AV system 103 side are provided from the GUI data server 109.

It is to be noted that, for "GUI data", for example, the MHEG (Multimedia Hypermedia Information Coding Experts Group) system is adopted. The MHEG is an international standard for scenario description for grasping multimedia information, procedures, operations and so forth and combinations of them as objects and encoding the objects and then producing a title (for example, a GUI screen) for them. The MHEG-5 is adopted in the present embodiment.

The terrestrial station 101 multiplexes information transmitted thereto from the television program material server 106, tune material server 107, audio additional information server 108 and GUI data server 109 and transmits the multiplexed information.

In the present embodiment, video data transmitted from the audio additional information server 108 are compression coded in accordance with the MPEG (Moving Picture Experts Group) 2 system while audio data are compression coded in accordance with the MPEG 2 audio system. Meanwhile, audio data transmitted from the tune material server 107 are compression coded, for each audio channel, for example, in accordance with one of the MPEG 2 audio system and the ATRAC (Adaptive Transform Acoustic Coding) system.

Upon such data multiplexion, the data are enciphered making use of key information from a key information server 110.

It is to be noted that an example of an internal construction of the terrestrial station 101 is hereinafter described.

A signal from the terrestrial station 101 is received by a reception equipment (hereinafter referred to sometimes as AV system) 103 of each home through a satellite 102. The satellite 102 has a plurality of transponders carried thereon. One transponder has a transmission capacity of, for example, 30 Mbps. The AV system 103 in each home includes a parabola antenna 111, an IRD (Integrated Receiver Decoder) 112, a monitor apparatus 114, an MD recorder/player 1, and a personal computer 113.

The AV system 103 shown in FIG. 1 further includes a remote controller 64 for operating the IRD 112, and a remote controller 32 for operating the MD recorder/player 1.

A signal broadcast through the satellite 102 is received by the parabola antenna 111. The received signal is converted into a signal of a predetermined frequency by an LNB (low noise block down converter) 115 attached to the parabola antenna 111 and then supplied to the IRD 112.

As general operation of the IRD 112, the IRD 112 selects a signal of a predetermined channel from the received signal, demodulates video data and audio data of a program from the selected signal to obtain a video signal and an audio signal, respectively, and outputs the video signal and the audio signal. Further, the IRD 112 outputs a GUI screen based on GUI data transmitted thereto in a multiplexed condition with data of the program. The output of the IRD 112 is supplied, for example, to the monitor apparatus 114. Consequently, the monitor apparatus 114 can perform display of an image and audio outputting of the program received and selected by the IRD 112 and can display a GUI screen in response to such an operation as hereinafter described.

The MD recorder/player 1 can record or reproduce audio data onto or from a mini disc loaded therein. The MD recorder/player 1 further can record still picture data (a picture file) of an album jacket or the like and text data (a text file) of the words of a tune, a liner note and so forth incidental to audio data as main data onto a disc, and reproduce or output data of such a picture file, a text file and so forth recorded on the disc in synchronism with a reproduction time of the audio data from the disc.

It is to be noted that such data of a picture file, a text file and so forth incidental to audio data as described above may hereinafter be referred to as "AUX (Auxiliary) data" for the convenience of description in accordance with handling of the same on the MD recorder/player 1 which is hereinafter described.

The personal computer 113 can fetch, for example, data received by the IRD 112 or data reproduced by the MD recorder/player 1 and perform various required editing processing for the fetched data. Further, the personal computer 113 can perform operation control of the IRD 112 or the MD recorder/player 1 in response to an operation of the personal computer 113 by a user.

Figure 2:
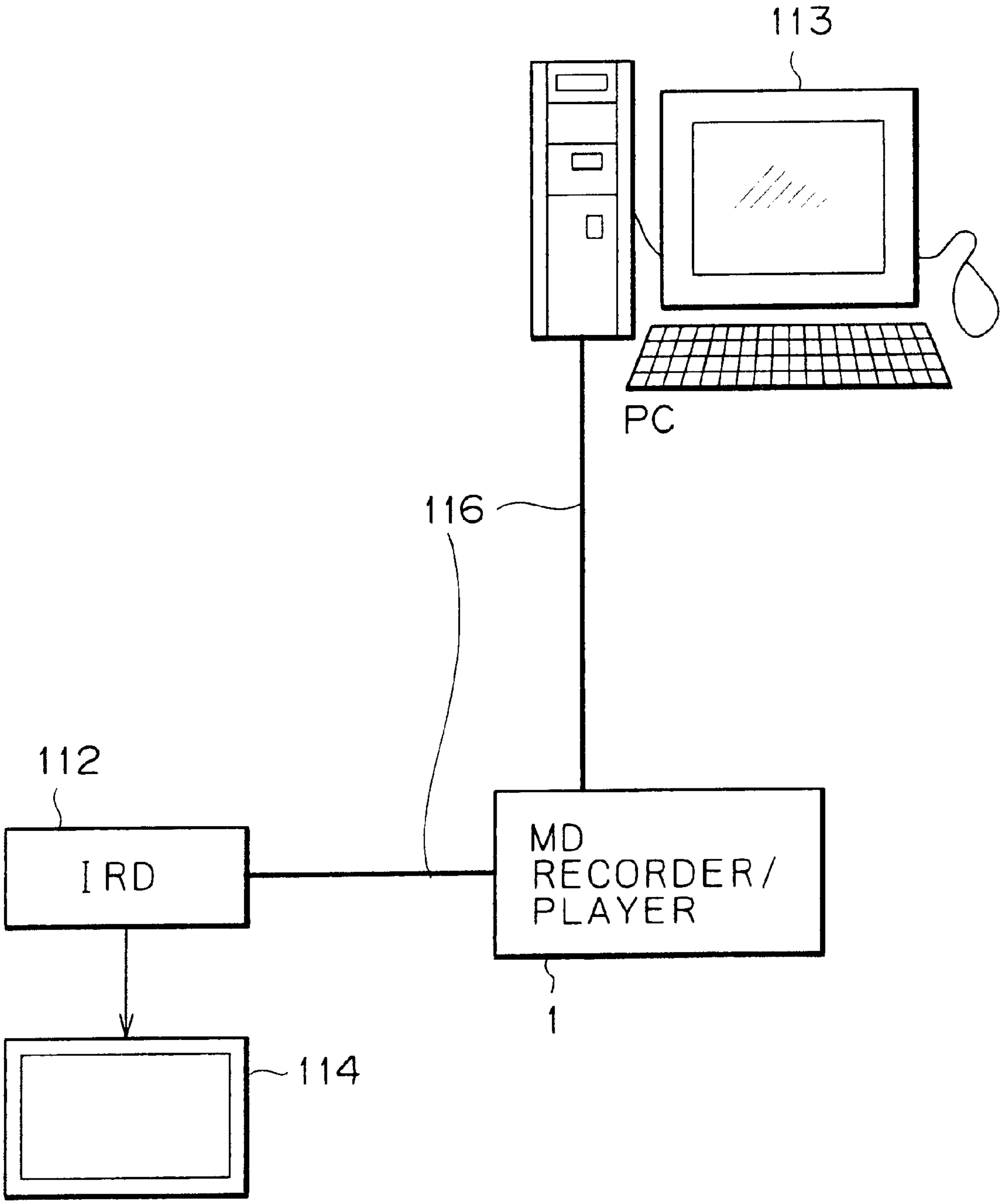
FIG. 2 is a detailed block diagram showing an AV system shown in FIG. 1.

In the AV system 103 in the present embodiment, the IRD 112, MD recorder/player 1 and personal computer 113 are connected to each other by an IEEE 1394 bus 116 as seen in FIG. 2.

In particular, each of the IRD 112, MD recorder/player 1 and personal computer 113 which form the AV system 103 includes a data interface conforming with the IEEE 1394 as a data transmission standard.

Consequently, in the present embodiment, audio data as downloaded data received by the IRD 112 can be directly fetched and recorded without performing decompression processing therefor in accordance with the ATRAC system. Further, also AUX data downloaded from the transmission side can be recorded together with such audio data.

The IRD 112 can communicate, for example, with a charging server 105 over a telephone circuit 104 as seen from FIG. 1. An IC card on which various information is stored in such a manner as hereinafter described is inserted into the IRD 112. For example, if downloading of audio data of a tune is performed, then history information regarding this is stored into the IC card. The stored information of the IC card is sent to the charging server 105 at a predetermined opportunity or timing over the telephone circuit 104. The charging server 105 sets an amount of money in accordance with the history information sent thereto in this manner to perform a charging operation and requests the user to pay for the charge.

As can be recognized from the foregoing description, in the system to which the present invention is applied, the terrestrial station 101 multiplexes video data and audio data from the television program material server 106 which make a material of a music program broadcast, audio data from the tune material server 107 which makes a material of an audio channel, audio data from the audio additional information server 108 and GUI data from the GUI data server 109 and transmits the multiplexed data.

When the broadcast is received by the AV system 103 in each home, a program of a selected channel can be enjoyed, for example, on the monitor apparatus 114. Further, as a GUI screen based on GUI data transmitted together with data of a program, firstly an EPG (Electrical Program Guide) screen can be displayed to perform searching for a program or the like. Secondly, for example, if a GUI screen for a particular service other than an ordinary program broadcast is utilized to perform a required operation, then a service other than an ordinary program service provided by the broadcasting system can be enjoyed.

For example, if a GUI screen for an audio data downloading service is displayed and an operation is performed making use of the GUI screen, then a user can download audio data of a desired tune and record and store the audio data into and in the MD recorder/player 1.

It is to be noted that a data service broadcast which provides a particular service other than an ordinary program broadcast which allows an operation for such a GUI screen as described above has an interactive performance and may sometimes be referred to as "interactive broadcast".

1-2. Operation for GUI Screen

Figure 3:
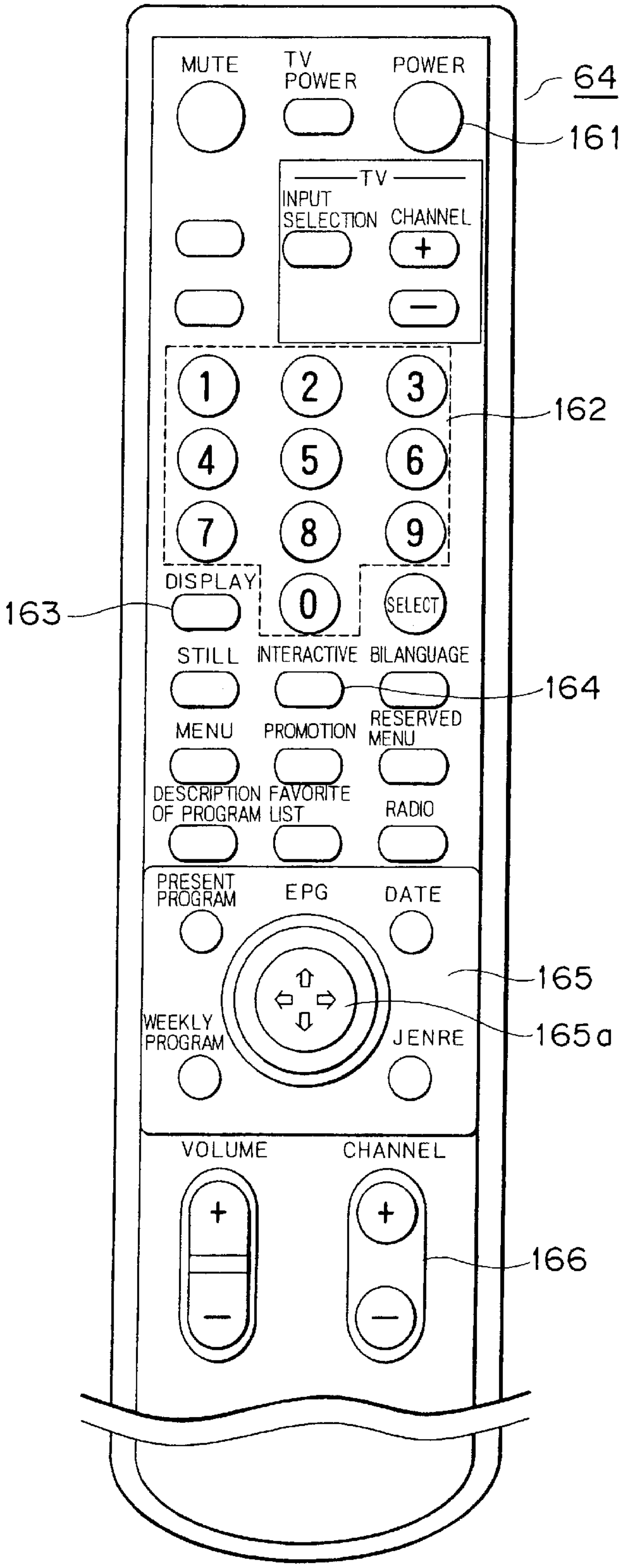
FIG. 3 is a schematic view showing an appearance of a remote controller for an IRD shown in FIG. 1.
Figure 4A:
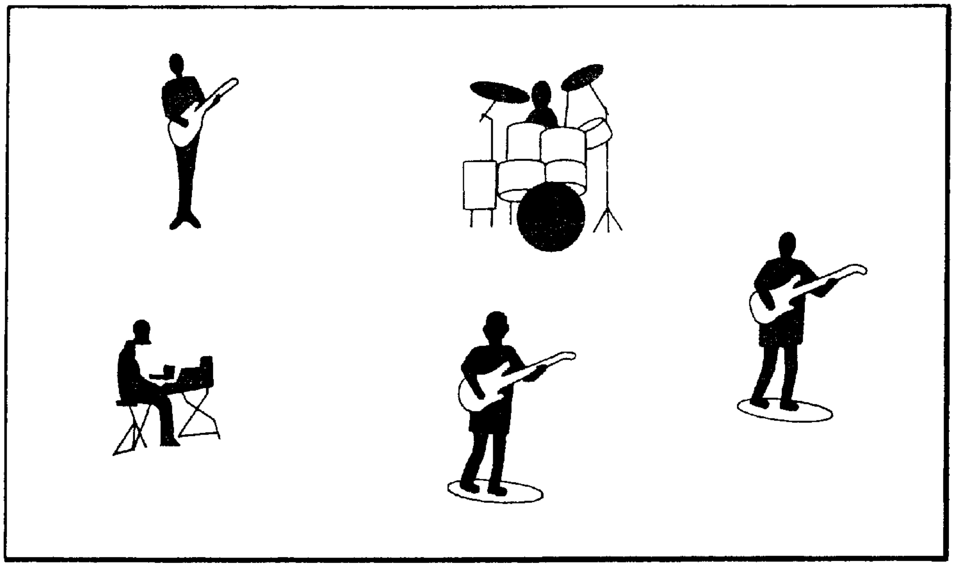
FIG. 4A is a schematic view showing an image displayed on a monitor shown in FIG. 1 upon reception of a broadcast.
Figure 4B:
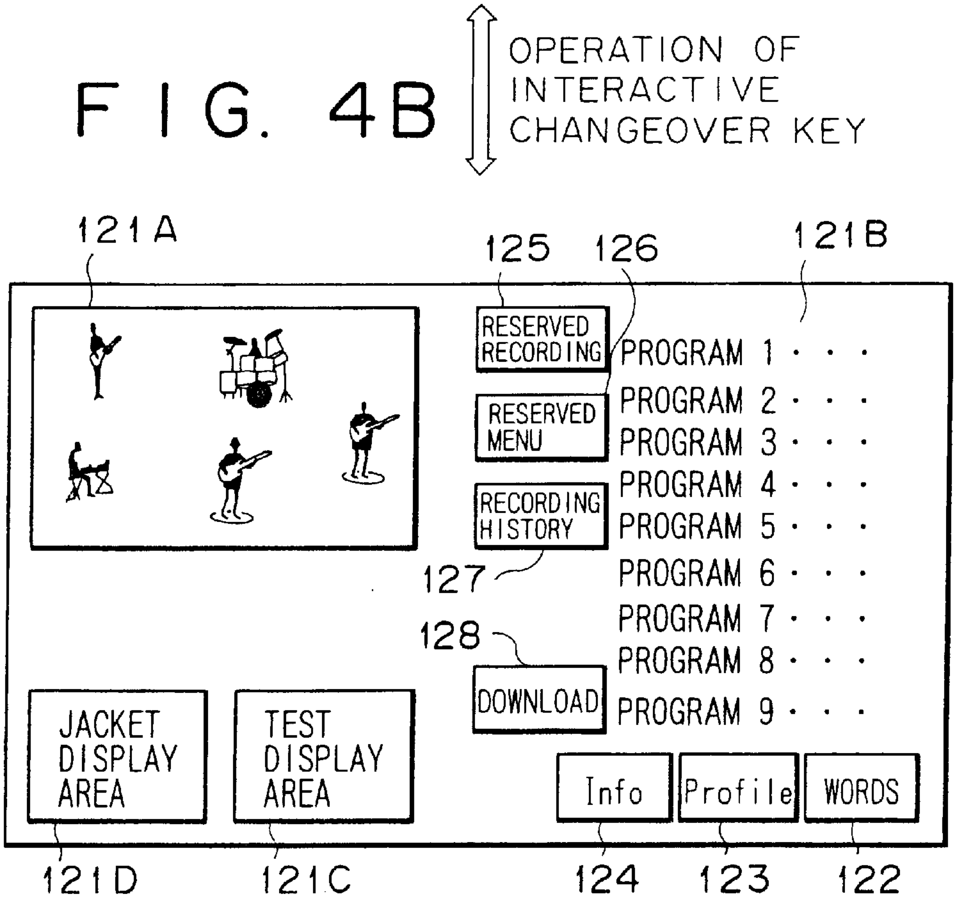
FIG. 4B is a schematic view showing an image displayed on the monitor shown in FIG. 1 upon downloading.

Here, an example of utilization of an interactive broadcast described above, that is, an example of operation for a GUI screen, is described briefly with reference to FIGS. 3, 4A and 4B. Here, operation when downloading of audio data is to be performed is described.

First, particularly important ones of operation keys of the remote controller 64 for being operated by a user to operate the IRD 112 are described with reference to FIG. 3.

FIG. 3 shows an operation panel surface of the remote controller 64 on which various keys are provided. Here, of the various keys, a power supply key 161, numeral keys 162, a screen display changeover key 163, an interactive changeover key 164, an EPG key panel section 165 and a channel key 166 are described.

The power supply key 161 is provided to perform an on/off operation for the power supply to the IRD 112. The numeral keys 162 are operated to change over the channel by numerical designation or perform, for example, a numerical value inputting operation for a GUI screen.

The screen display changeover key 163 is operated to perform changeover, for example, between an ordinary broadcasting screen and an EPG screen. For example, if a key disposed on the EPG key panel section 165 is operated while an EPG screen is recalled by means of the screen display changeover key 163, then a program search making use of a display screen of an electronic program guide can be performed. Further, an arrow mark key 165*a* in the EPG key panel section 165 can be used also to move a cursor on a GUI screen for a service which is hereinafter described.

The interactive changeover key 164 is provided to perform changeover between an ordinary broadcasting screen and a GUI screen for a service incidental to the broadcast program.

The channel key 166 is provided to successively change over the selected channel by the IRD 112 among different channels in an ascending order or a descending order of the channel number.

It is to be noted that, while the remote controller 64 in the present embodiment is constructed so as to perform various operations, for example, also for the monitor apparatus 114 and has various keys for the operations provided thereon, description of the keys for operation of the monitor apparatus 114 is omitted herein.

Now, a detailed example of an operation for a GUI screen is described with reference to FIGS. 4A and 4B.

If a broadcast is received and a desired channel is selected by the AV system 103, then a moving picture based on a material of a program provided from the television program material server 106 is displayed on the display screen of the monitor apparatus 114 as shown in FIG. 4A. In other words, contents of an ordinary program are displayed on the monitor apparatus 114. Here, it is assumed that, for example, a music program is displayed. Also it is assumed that a download service (interactive broadcast) of audio data of the tune is incidental to the music program.

Then, for example, if a user operates the interactive changeover key 164 of the remote controller 64 while the music program is displayed, then such a GUI screen for downloading of the audio data as shown in FIG. 4B is switchably displayed on the display screen of the monitor apparatus 114.

On the GUI screen, an image based on video data from the television program material server 106 displayed on the display screen shown in FIG. 4A is displayed in a reduced scale in a television program display area 121A at an upper left portion of the display screen shown in FIG. 4B.

Meanwhile, at an upper right portion of the display screen, a list 121B of tunes of different channels broadcast in audio channels is displayed. Further, a text display area 121C and a jacket display area 121D are displayed at lower left portions of the display screen. Furthermore, a tune words display button 122, a profile display button 123, an information display button 124, a reserved recording button 125, a reserved list display button 126, a recording history display button 127 and a download button 128 are disposed on right side portions of the screen.

The user will observe the titles of tunes displayed on the list 121B and searches for a tune in which the user is interested. Then, if the tune in which the user is interested is found, then the user will operate the arrow mark key 165*a* in the EPG key panel section 165 of the remote controller 64 to move and adjust the cursor at a position at which the tune is displayed and then perform an entering operation. In this instance, in the present embodiment, the user depresses a central position of the arrow mark key 165*a*.

The user can thus enjoy the tune to which the cursor is adjusted. In particular, since the same tune is repetitively broadcast within a predetermined unit time in each audio channel, if the channel to be enjoyed is switched to the audio channel of the tune selected by the operation by means of the IRD 112 to output audio data of the audio channel while the screen of the television program display area 121A is displayed, then the user can enjoy the tune. Thereupon, a jacket image of the tune is displayed in the jacket display area 121D.

On the other hand, for example, if the cursor is adjusted to the tune words display button 122 in the condition described above and then performs an entering operation, then the words of the tune are displayed at a timing synchronized with the audio data in the text display area 121C. It is to be noted that, in the following description, to adjust the cursor to a displayed button and perform an entering operation is referred to as to “depress the button”. Similarly, if the profile display button 123 or the information display button 124 is depressed, then a profile of an artist corresponding to the tune or concert information is displayed in the text display area 121C. In this manner, the user can know what tune is being distributed at present and further can know detailed information of each tune.

If the user wants to purchase the thus enjoyed tune, then the user will depress the download button 128. If the download button 128 is depressed, then audio data of the selected tune are downloaded and recorded onto a disc by the MD recorder/player 1. Together with audio data of the tune, also data of the words of the tune, profile information of the artist, still picture data of the jacket and so forth can be downloaded.

Each time audio data of a tune are downloaded in this manner, the history information is stored into the IC (Integrated Circuit) card in the IRD 112. Such information stored on the IC card is fetched by the charging server 105, for example, once a month. Then, an amount of money based on the history of use of data services is charged on the user. Consequently, the copyright of each downloaded tune can be protected.

Further, if the user wants to reserve downloading, the user will depress the reserved recording button 125. In response to the depression of the reserved recording button 125, the display of a GUI screen is changed over, and a list of tunes which can be reserved is displayed over the entire screen. For example, the list may display tunes searched out in a unit of one hour, in a unit of one week, in a unit of a channel or in some other unit. The user will select a tune to be reserved for downloading from the list. Information of the thus selected tune is registered into the IRD 112. If the user wants to confirm tunes which have already been reserved for downloading, then the user can depress the reserved list display button 126 to display them on the entire screen. Each of the tunes reserved in this manner is downloaded by the IRD 112 when the reserved time thereof comes, and the downloaded tune is recorded onto the disc by the MD recorder/player 1.

If the user wants to confirm the history of any of tunes which have been downloaded in the past, then the user can depress the recording history display button 127 to cause a list of tunes, which have been downloaded already, to be displayed on the entire screen.

In this manner, with the AV system 103 of the system to which the present invention is applied, a list of tunes is displayed on a GUI screen of the monitor apparatus 114. Then, if the user selects a tune in accordance with the display on the GUI screen, then the user can enjoy the tune in trial and can know the words of the tune, the profile of the artist and so forth. Further, downloading of a tune and reservation of such downloading and displaying of a history of downloading, a list of reserved tunes and so forth can be performed.

Although detailed description is omitted, displaying of such a GUI screen as shown in FIG. 4B, changing of the display on the GUI screen responsive to an operation of the user for the GUI screen and audio outputting can be realized by prescribing relationships of objects in a scenario description based on the MHEG system described hereinabove. The objects are video data corresponding to the various buttons and material data displayed in the display areas shown in FIG. 4B.

Further, in the present specification, an output form such as a video display or an audio output which is realized by a scenario description which defines relationships between objects such as a GUI screen is called "scene". Further, an object which forms one scene may be a file itself of a scenario description.

As described above, in the digital direct broadcasting system to which the present invention is applied, a broadcasting program is distributed, and audio data of a tune are distributed using a plurality of audio channels. Then, it is possible to search for a desired tune using a list of tunes being distributed or the like and record the audio data of the desired tune onto a disc medium simply by means of the MD recorder/player.

It is to be noted that various other services than provision of a program by the digital direct broadcasting system can possibly be provided in addition to the downloading of tune data described above. For example, also such a service as to broadcast a commodity recommendation program called television shopping and broadcast a GUI screen on which a purchase contract can be made may be prepared.

1-3. Terrestrial Station

An outline of the digital direct broadcasting system of the present embodiment is described above, and in the following, more detailed description of the system is given. First, a construction of the terrestrial station 101 is described with reference to FIG. 5.

It is to be noted that the following description proceeds based on the following presumption.

In the present embodiment, for the transmission from the terrestrial station 101 to the AV system 103 through the satellite 102, the DSM-CC (Digital Storage Media-Command and Control) protocol is adopted.

The DSM-CC (MPEG-part 6) system prescribes, as well known in the art, commands and control methods for retrieving an MPEG coded bit stream stored on a digital storage medium (hereinafter referred to as DSM) or storing a stream onto a DSM. In the present embodiment, the DSM-CC system is adopted as a transmission standard for the digital direct broadcasting system.

In order to transmit contents of a data broadcasting service in accordance with the DSM-CC system, a describing format of contents must be defined. In the present embodiment, the MHEG described above is adopted as a definition of the describing format.

Figure 5:
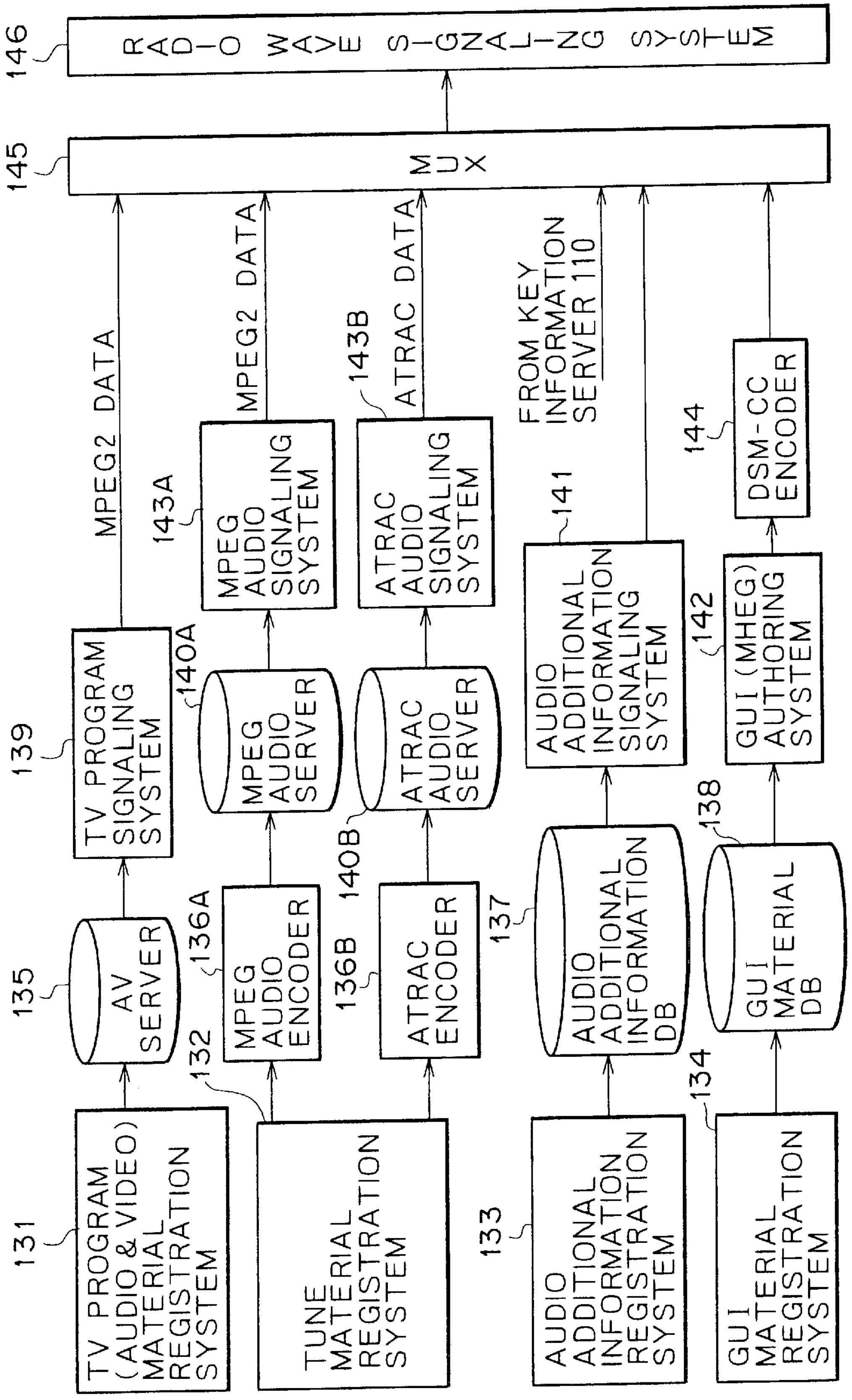
FIG. 5 is a block diagram showing an internal construction of a terrestrial station shown in FIG. 1.

The terrestrial station 101 shown in FIG. 5 includes a television program material registration system 131 which registers material data acquired from the television program material server 106 into an AV server 135. The material data are sent to a television program signaling system 139, by which video data are compressed in accordance with, for example, the MPEG 2 system and audio data are packetized in accordance with, for example, the MPEG 2 audio system. An output of the television program signaling system 139 is sent to a multiplexer 145.

Meanwhile, a tune material registration system 132 supplies material data from the tune material server 107, that is, audio data, to an MPEG 2 audio encoder 136A and an ATRAC encoder 136B. The MPEG 2 audio encoder 136A and the ATRAC encoder 136B perform encoding processing (compression coding) for the audio data supplied thereto and register resulting data into an MPEG audio server 140A and an ATRAC audio server 140B, respectively.

The MPEG audio data registered in the MPEG audio server 140A are transmitted to an MPEG audio signaling system 143A, by which they are packetized, and the packetized data are transmitted to the multiplexer 145. The ATRAC data registered in the ATRAC audio server 140B are sent as ATRAC data to an ATRAC audio signaling system 143B, by which they are packetized, and the packetized data are sent out to the multiplexer 145. In this instance, the ATRAC data are transferred at a high speed to the ATRAC audio server 140B.

An audio additional information registration system 133 registers audio additional information, which is material data from the audio additional information server 108, into an audio additional information database (DB) 137. The audio additional information registered in the audio additional information database 137 is transmitted to an audio additional information signaling system 141, by which is packetized similarly, and the packetized data are transmitted to the multiplexer 145.

A GUI material registration system 134 registers GUI data, which are material data from the GUI data server 109, into a GUI material database 138.

The GUI material data registered in the GUI material database 138 are transmitted to a GUI authoring system 142, by which they are processed so as to have a data format in which they can be outputted as a GUI screen, that is, a "scene" described hereinabove with reference to FIG. 4B.

In particular, data transmitted from the GUI authoring system 142 include, for example, if they are for a GUI screen for downloading of a tune, still picture data of an album jacket, text data of the words of the tune and so forth, audio data to be outputted in response to an operation, and so forth.

Each data described above is called mono medium. The GUI authoring system 142 uses an MHEG authoring tool to encode such mono medium data and handles them as objects.

Then, contents of the MHEG-5 are prepared together with a scenario describing file (script) which prescribes relationships of the objects so that an output form of video and audio data, for example, in accordance with a display form of such a scene (GUI screen) as described above with reference to FIG. 4B and an operation may be obtained.

Further, on such a GUI screen as shown in FIG. 4B, also MPEG video data and MPEG audio data which are video and audio data based on material data of the television program material server 106, MPEG audio data based on tune material data of the tune material server 107 and so forth are displayed, and an output form in accordance with an operation is provided.

Accordingly, in the scenario describing file, the GUI authoring system 142 handles video and audio data based on material data of the television program material server 106, MPEG audio data based on tune material data of the tune material server 107 and audio additional information based on the audio additional information server 108 described above as objects when necessary, and prescription by an MHEG script is performed.

It is to be noted that data of MHEG contents transmitted from the GUI authoring system 142 may be script files and various still picture files or text data files as objects, and the still picture data are, for example, data of 640×480 pixels compressed in accordance with the JPEG (Joint Photograph Experts Group) system whereas the text data are provided as a file including, for example, less than 800 characters.

Data of MHEG contents obtained by the GUI authoring system 142 are transmitted to a DSM-CC encoder 144.

The DSM-CC encoder 144 converts the MHEG contents data into a transport stream (hereinafter referred to simply as TS) of a format with which it can be multiplexed with data streams of video data and audio data in accordance with the MPEG 2 format, and packetizes the transport stream, and then outputs the packetized transport stream to the multiplexer 145.

The multiplexer 145 time base multiplexes video packets and audio packets from the television program signaling system 139, audio packets from the MPEG audio signaling system 143A, high speed audio packets from the ATRAC audio signaling system 143B, audio additional information packets from the audio additional information signaling system 141 and GUI data packets from. the GUI authoring system 142, and enciphers the time base multiplexed packets with key information outputted from the key information server 110 shown in FIG. 1.

The output of the multiplexer 145 is transmitted to a radio wave signaling system 146, by which such processing as, for example, addition of error correction codes, modulation and frequency conversion is performed for the received output of the multiplexer 145. Then, an output of the radio wave signaling system 146 is outputted from the antenna so as to be transmitted to the satellite 102.

1-4. Transmission Format

Now, a transmission format in the present embodiment prescribed in accordance with the DSM-CC system is described.

Figures 6A, 6B, 6C, 6D, 6E, 6F, 6G, 6H, 6I:
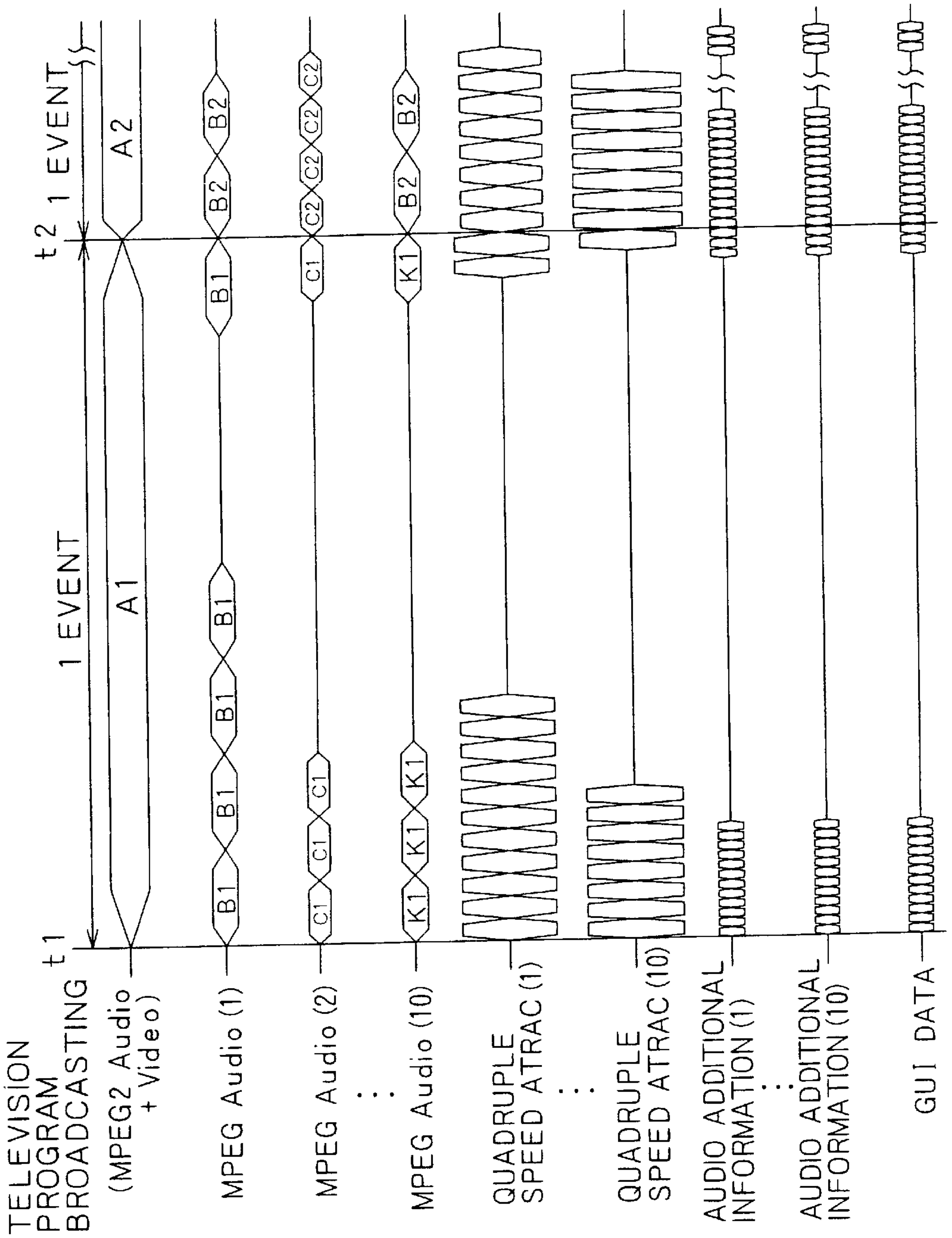
FIG. 6A is a timing chart illustrating television program broadcast data transmitted from the terrestrial station of FIG. 5.
FIGS. 6B, 6C and 6D are timing charts illustrating different MPEG2 audio data repetitively outputted from an MPEG audio signaling system shown in FIG. 5.
FIGS. 6E and 6F are timing charts illustrating different ATRAC audio data repetitively outputted from an ATRAC audio signaling system shown in FIG. 5.
FIGS. 6G and 6H are timing charts illustrating different audio additional information repetitively outputted from an audio additional information signaling system shown in FIG. 5.
FIG. 6I is a timing chart illustrating GUI data repetitively outputted from a DSM-CC encoder shown in FIG. 5.
Figure 7A:
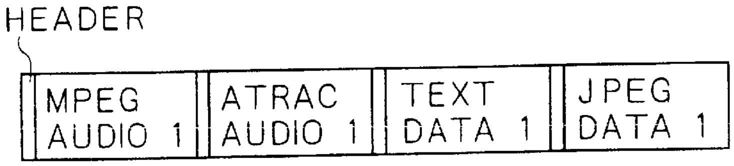
FIGS. 7A to 7D are diagrammatic views individually showing structures of data of 4 channels transmitted in a time division multiplexed condition.
Figure 7B:
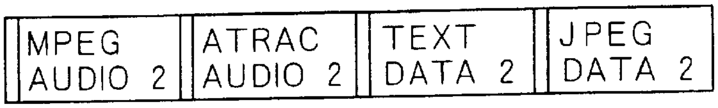
Figure 7C:
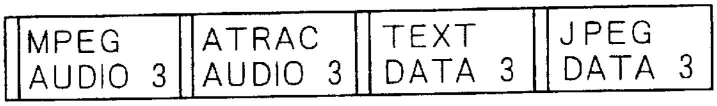
Figure 7D:
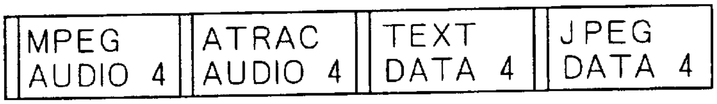
Figure 7E:
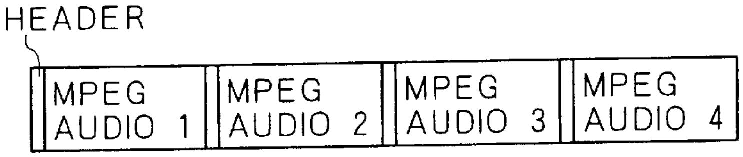
FIGS. 7E to 7H are diagrammatic views individually showing structures of data obtained by reconstructing the received data of 4 channels illustrated in FIGS. 7A to 7D.
Figure 7F:
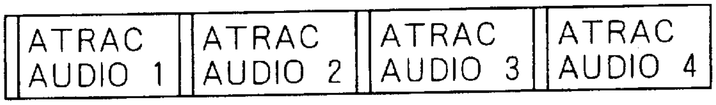
Figure 7G:
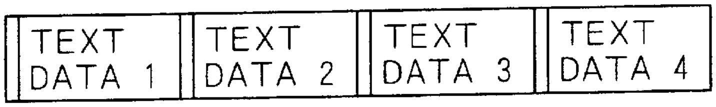
Figure 7H:
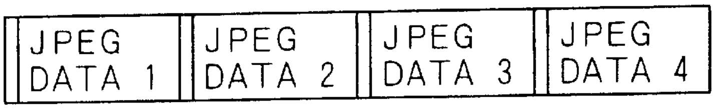

FIGS. 6A to 6I illustrate an example of data when they are outputted from the terrestrial station 101 and transmitted to the satellite 102. It is to be noted that, as described hereinabove, the various data shown in FIGS. 6A to 6I are actually in a time base multiplexed state. Further, as seen in FIG. 6A, an event occurs within a period from time t1 to time t2, and another event occurs after time t2. The event here is, for example, with regard to a channel of a music program, a unit in which a set of a lineup of a plurality of tunes is changed, and has a time of approximately 30 minutes or one hour.

As seen from FIG. 6A, in the event from time t1 to time t2, a program having predetermined contents A1 is broadcast in an ordinary program broadcast of moving pictures. In the event beginning at time t2, another program of contents A2 is broadcast. What are broadcast in the ordinary programs are moving pictures and audio.

MPEG audio channels (1) to (10) are prepared for 10 channels from channel CH1 to channel CH10. In each of the audio channels CH1, CH2, CH3, . . . , CH10 shown in FIGS. 6B to 6D, the same tune is transmitted repetitively while one event is broadcast. In particular, within the period of the event from time t1 to time t2, a tune B1 is repetitively transmitted in the audio channel CH1, and another tune C1 is repetitively transmitted in the audio channel CH2. Similarly, the same tune is repetitively transmitted in each of the other audio channels CH3 to CH9, and a tune K1 is repetitively transmitted in the audio channel CH10. This similarly applies to quadruple speed ATRAC audio channels (1) to (10) shown in FIGS. 6E to 6F.

In FIGS. 6B to 6F, equal ones of the numerals in the parentheses indicative of the MPEG audio channels and the quadruple speed ATRAC audio channels denote the same tune. In particular, in the present embodiment, both of audio data compressed in accordance with the MPEG 2 system and audio data compressed in accordance with the ATRAC system are outputted with regard to a given tune. Further, the numeral in each parenthesis indicative of a channel number of audio additional information represents audio additional information added to audio data having the same channel number. Furthermore, also still data and text data to be transmitted as GUI data are formed for each channel. Those data are time division multiplexed into transport packets of the MPEG 2 as seen from FIGS. 7A to 7D and transmitted as such transport packets. Then, the data are re-constructed in the IRD 112 as seen in FIGS. 7E to 7H using header information of the individual data packets.

Further, GUI data utilized for a data service (interactive broadcast) illustrated in FIG. 6I are logically formed in the following manner in accordance with the DSM-CC system. Here, description is given restrictively of data of a transport stream outputted from the DSM-CC encoder 144.

Figures 8A, 8B, 8C, 8D, 8E, 8F:
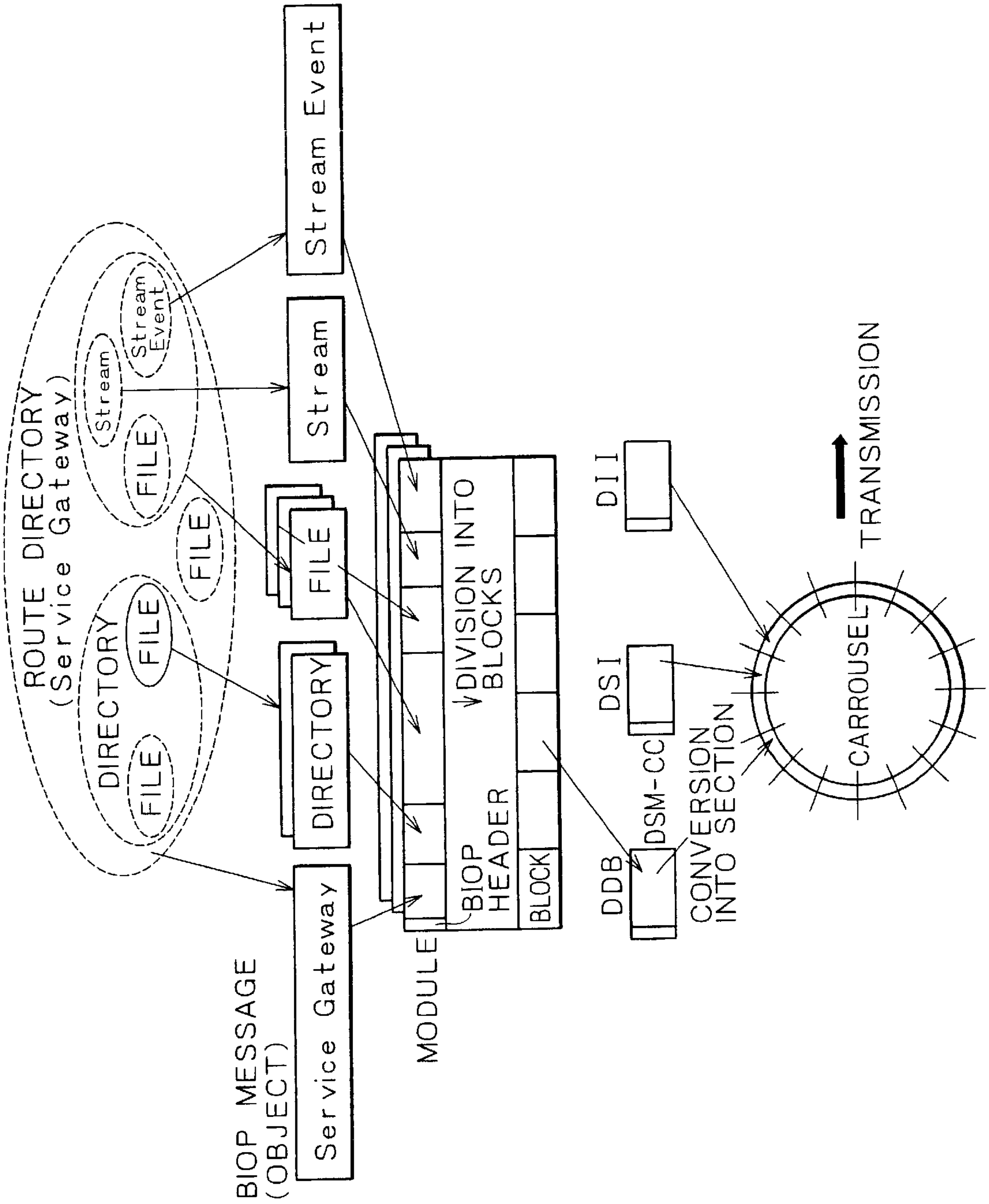
FIG. 8A is a schematic view showing a file structure in a DSM-CC system.
FIG. 8B is a diagrammatic view showing an object when a file of the DSM-CC system shown in FIG. 8A is converted into a BIOP message.
FIG. 8C is a diagrammatic view showing a data structure of a module.
FIG. 8D is a schematic view showing a blocked form of the module shown in FIG. 8C.
FIG. 8E is a diagrammatic view illustrating a message named DDB wherein a header is added to a block shown in FIG. 8D.
FIG. 8F is a schematic view illustrating a data transfer method for transmitting a message repetitively and periodically.

As seen from FIG. 8A, all of data broadcasting services in the present embodiment transmitted in accordance with the DSM-CC system are included in a root directory named Service Gateway. The Service Gateway includes different kinds of objects including a directory, a file, a stream, and a stream event as seen from FIG. 8B.

Of the objects mentioned above, the file includes various individual data files of still pictures, audio data, text data, and scripts described in accordance with the MHEG.

The stream includes information to be linked to some other data services and an AV stream of MPEG video data and audio data of a television program material, MPEG audio data and ATRAC audio data as a tune material and so forth.

The stream event includes similar link information and time information.

The directory is a folder in which data relating to each other are collected.

In the DSM-CC system, such unit information and the Service Gateway are each grasped as a unit of an object as seen from FIG. 8B, and each object is converted into a BIOP (Broadcast Interoperable Object Reference) message in form.

It is to be noted that, since the distinction among the three objects of a file, a stream and a stream event is not essential to the description of the present invention, the following description proceeds in regard to an object as a file representing them.

Then, in the DSM-CC system, a data unit called module shown in FIG. 8C is produced. The module is a data unit of a variable length formed such that it includes one or more objects each in the form of a BIOP message shown in FIG. 8B and a BIOP header is added to it, and is a buffering unit of received data on the reception side which is hereinafter described.

Further, in the DSM-CC system, a relationship between objects in a case wherein one module is formed from a plurality of objects is not specifically prescribed or limited. In short, radically speaking, even if one module is formed from two or more objects between scenes having no relationship to each other, this does not violate the provisions under the DSM-CC system.

The module is mechanically divided into data units of a fixed length in principle called "block" as seen in FIG. 8D so that it may be transmitted in a form called section prescribed by the MPEG 2 format. However, the last block of the block need not necessarily have the prescribed fixed length. The reason why a module is divided into blocks resides in that the MPEG 2 format has a prescription that one section must not exceed 4 KB.

Further, in this instance, the data unit as a block and the section are common in significance.

To each block obtained by dividing the module in this manner, a header is added as seen in FIG. 8E so that the block is converted into a message in form called DDB (Download Data Block).

Further, in parallel to such conversion into DDBs, control messages called DSI (Download Server Initiate) and DII (Download Indication Information) are prepared.

The DSI and the DII are information required when the reception side (IRD 112) acquires a module from received data, and the DSI principally has an identifier of a carousel which is described below, information regarding the entire carousel representative of a time required for one rotation of the carousel and a timeout value of rotation of the carousel, and so forth. The DSI further has information for discrimination of a location of the root directory (Service Gateway) of a data service (in the case of an object carousel system).

The DII is information corresponding to each module included in the carousel and has information of a size, a version, a timeout value and so forth of each module.

Then, the three kinds of messages of the DDB, DSI and DII are signaled periodically and repetitively in a corresponding relationship to data units of the section. Consequently, the receiver side can at any time receive, for example, a module in which an object necessary to acquire a target GUI screen (scene) is included.

In the present specification, such a transmission system as just described is called "carousel system" from the similarity to a carousel, and a data transmission form as schematically represented in FIG. 8F is called carousel.

Further, the "carousel system" is divided into two levels including a "data carousel system" and an "object carousel system". Particularly, in the object carousel system, objects having such attributes as a file, a directory, a stream and a service gateway are transferred as data using a carousel. The object carousel system is much different from the data carousel system in that it can handle a directory structure. The system of the present embodiment adopts the object carousel system.

GUI data transmitted by a carousel in such a manner as described above, that is, data outputted from the DSM-CC encoder 144 of FIG. 5, are outputted in the form of a transport stream. The transport stream has, for example, such a structure as shown in FIGS. 9A to 9C.

Figure 9A:
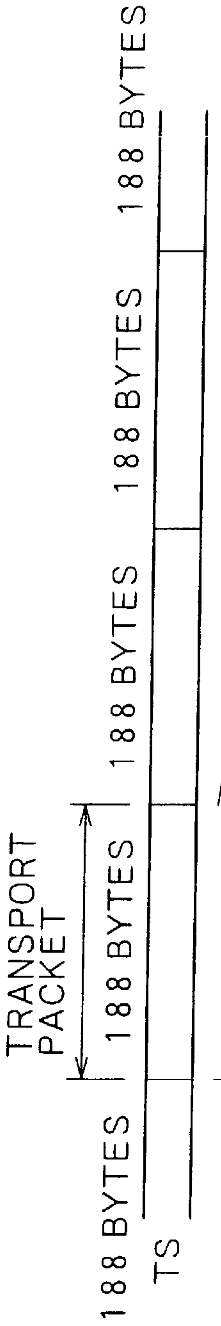
FIG. 9A is a timing chart illustrating a transport stream.

FIG. 9A shows a transport stream. The transport stream is a bit train defined in the MPEG system and is formed from a connection of fixed length packets (hereinafter referred to as transport packets) of 188 bytes as seen from FIG. 9A.

Figure 9B:
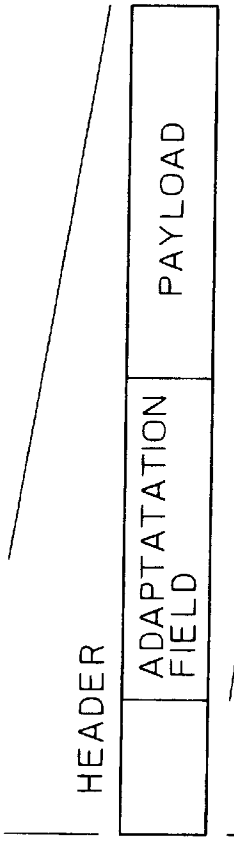
FIG. 9B is a diagrammatic view showing a data structure of a transport packet included in the transport stream shown in FIG. 9A.
Figure 9C:
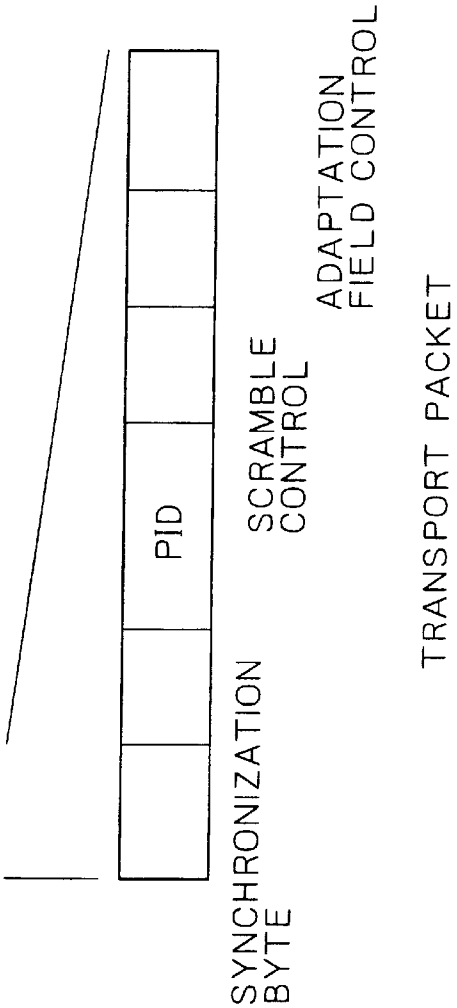
FIG. 9C is a diagrammatic view showing a data structure of a header included in the transport packet shown in FIG. 9A.

Each transport packet includes, as seen from FIG. 9B, a header, an adaptation field for allowing additional information to be included in a particular individual packet, and a payload representative of contents of video/audio data and so forth of the packet.

The header actually has a length of, for example, 4 bytes and has a synchronization byte at the top thereof without fail. The header further has, placed at predetermined positions thereof following the synchronization byte, a PID (Packet_ID) which is identification information of the packet, scramble control information representative of presence or absence of scrambling, adaptation field control information representative of presence or absence of a payload, and so forth.

Based on such control information, the reception apparatus side can perform descrambling in a unit of a packet and perform separation and extraction of a required packet of video/audio data and so forth using a demultiplexer. Further, also time information which is used as a reference for synchronized reproduction of video/audio data can be performed here.

Further, as can be recognized from the foregoing description, one transport stream has packets of video/audio data for a plurality of channels multiplexed therein. One transport stream further has multiplexed therein a signal for controlling channel selection called PSI (Program Specific Information), information (EMM (Entitlement Management Message)/ECM (Entitlement Common Message)) necessary for restrictive reception which is a reception function of determining whether or not a subscription channel can be received in accordance with a situation of the contract of the individual, and SI (Service Information) for realizing a service of an EPG (Electric Program Guide) or the like. Here, the PSI is described.

The PSI is formed from four tables as seen from FIGS. 10A to 10D. Each of the tables is represented in a format conforming to the MPEG system called section format.

Figures 10A, 10B, 10C, 10D:
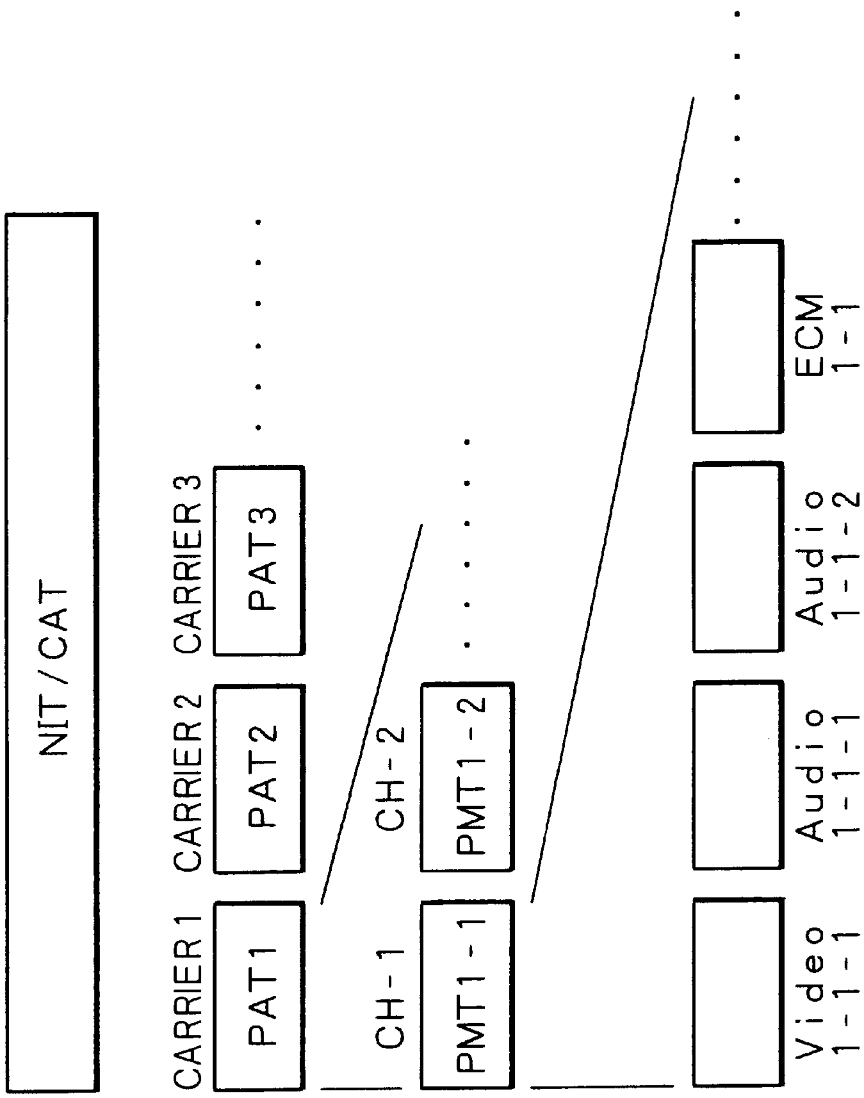
FIG. 10A is a diagrammatic view showing a data structure of a NIT/CAT.
FIG. 10B is a diagrammatic view showing a data structure of carriers included in the NIT/CAT of FIG. 10A.
FIG. 10C is a diagrammatic view showing a data structure of channel information for each carrier.
FIG. 10D is a schematic view showing a data structure of components and an ECM packet from which a channel is formed.

In FIG. 10A, NIT (Network Information Table) and CAT (Conditional Access Table) is shown.

The NIT is multiplexed in contents common to all carriers. Various transmission dimensions such as a polarization plane, a carrier frequency and a convolution rate for each carrier and a list of channels multiplexed there are described. The PID of the NIT is determined as PID=1x0010.

Also the CAT is multiplexed in contents common to all carriers. A PID of an EMM (Entitlement Management Message) packet which is information for identification of a restrictive reception method, contract information and so forth is described in the CAT. The PID for the CAT is indicated by PID=0x0001.

FIG. 10B illustrates PATs as information having contents unique to the individual carriers. Each PAT has described therein channel information in the carrier and a PID of a PMT which represents contents of the channel. The PID for the PATS is indicated by PID=0x0000.

Further, as information for each channel of the carrier, a PMT (Program Map Table) table shown in FIG. 10C is provided.

The PMTs have contents of the different channels multiplexed therein. For example, as shown in FIG. 10D, each PMT is formed from components (video/audio data components and so forth) which form each channel, and ECM (Entitlement Common Message) packets necessary for descrambling.

1-5. IRD

Subsequently, an example of a construction of the IRD 112 included in the AV system 103 is described with reference to FIG. 11.

Figure 11:
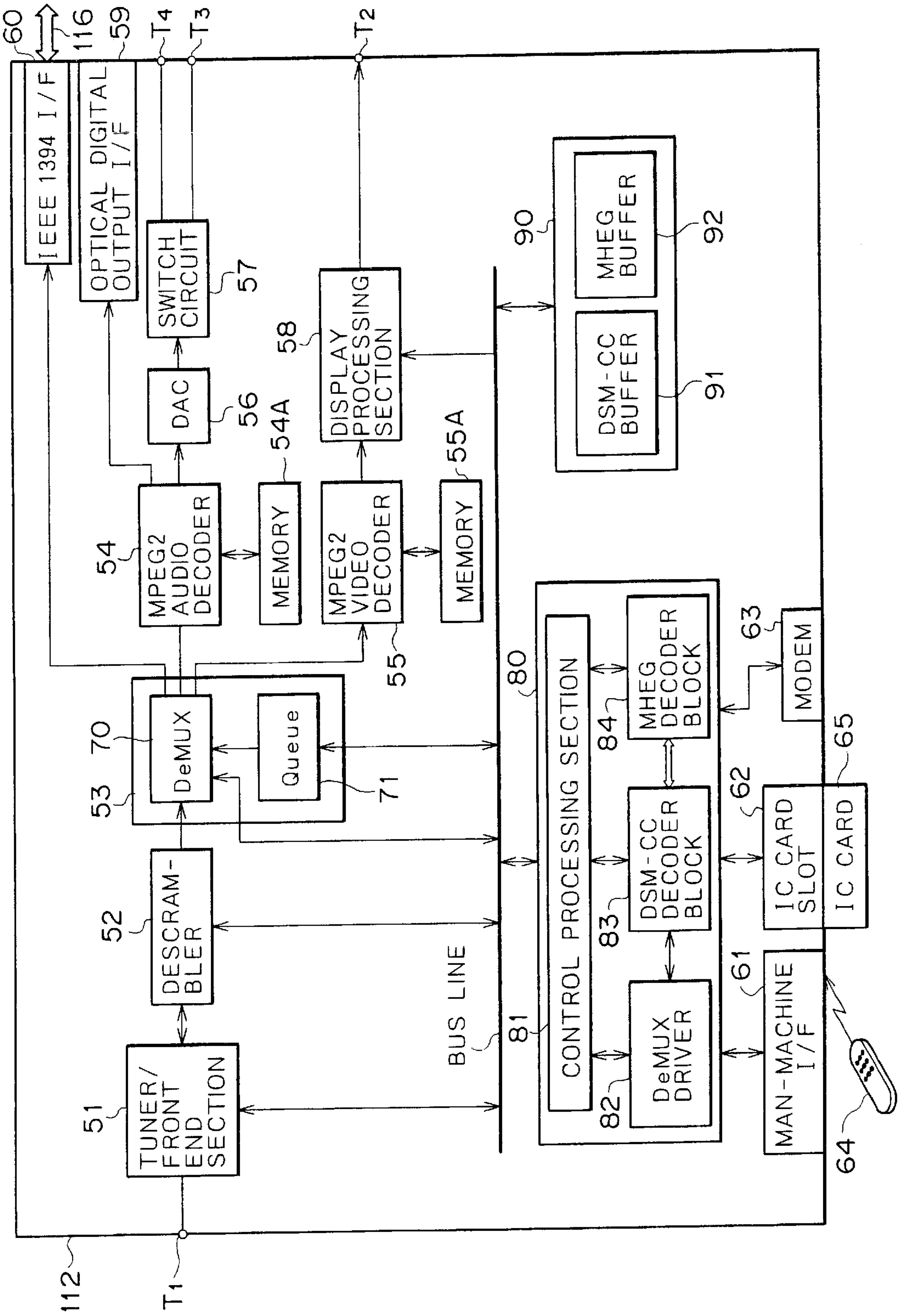
FIG. 11 is a detailed block diagram of the IRD shown in FIG. 1.

The IRD 112 shown in FIG. 11 has an input terminal Ti to which a received signal received by the parabola antenna 111 and converted into a signal of a predetermined frequency by the LNB 115 of the parabola antenna 111 is inputted. The inputted received signal is supplied from the input terminal T1 to a tuner/front end section 51.

The tuner/front end section 51 receives,. based on a setting signal indicative of transmission dimensions and so forth set by and received from a CPU (Central Processing Unit) 80, a carrier of a reception frequency determined by the setting signal and performs necessary processing such as, for example, viterbi demodulation processing and error correction processing for the carrier to obtain a transport stream.

The transport stream obtained by the tuner/front end section 51 is supplied to a descrambler 52. The tuner/front end section 51 further acquires a packet of the PSI from the transport stream and updates channel selection information of the PSI packet. Furthermore, the tuner/front end section 51 acquires the component PID of each channel in the transport stream and transmits it, for example, to the CPU 80. The CPU 80 thus utilizes the thus acquired PIDs for processing of the received signal.

The descrambler 52 receives descramble key data stored in an IC card 65 through the CPU 80, and a PID is set to the descrambler 52 by the CPU 80. The descrambler 52 executes descrambling processing based on the descramble key data and the PID and transmits resulting data to a transport section 53.

The transport section 53 includes a demultiplexer (DeMUX) 70 and a queue 71 which is formed from, for example, a DRAM or a like element. The queue 71 is formed such that a plurality of memory areas corresponding to module units are arranged in columns. For example, in the present embodiment, 32 columns of memory areas are provided. In other words, the queue 71 can simultaneously store information of 32 modules in the maximum.

As general operation of the demultiplexer 70, it demultiplexes the transport stream supplied thereto from the descrambler 52 to obtain necessary transport packets in accordance with filter conditions set by a demultiplexer (DeMUX) driver 82 of the CPU 80 and utilizes, if necessary, the queue 71 as a working area to obtain data of such a format as described hereinabove with reference to FIGS. 7E to 7H. Then, the demultiplexer 70 supplies the thus obtained data to necessary functioning circuit sections.

MPEG video data separated by the demultiplexer 70 are inputted to an MPEG 2 video decoder 55 while MPEG audio data are inputted to an MPEG 2 audio decoder 54. Individual packets of the MPEG video/audio data separated by the demultiplexer 70 are inputted in a format called PES (Packetized Elementary Stream) to the respective decoders.

Data of MHEG contents of the transport stream are separated and extracted in a unit of a transport packet from the transport stream by the demultiplexer 70 and written into a required memory area of the queue 71 such that they are arranged in a unit of a module. Then, the data of the MHEG contents arranged in a unit of a module are written into a DSM-CC buffer 91 in a main memory 90 over the data bus under the control of the CPU 80 and thereafter held in the DSM-CC buffer 91.

Also compressed audio data in the form of quadruple speed ATRAC data in the transport stream are separated and extracted by the demultiplexer 70, for example, in a unit of a transport packet and outputted to an IEEE 1394 interface 60. The IEEE 1394 interface 60 allows signaling not only of audio data but also video data, text data, various command signals and so forth.

The MPEG 2 video decoder 55 to which the MPEG video data of the format of the PES are inputted to perform decoding processing for the MPEG video data in accordance with the MPEG 2 format using a memory 55A as a working area. The thus decoded video data are supplied to a display processing section 58.

To the display processing section 58, the video data inputted from the MPEG 2 video decoder 55 described above and video data for a GUI screen for a data service and so forth obtained by an MHEG buffer 92 of the main memory 90 in such a manner as hereinafter described are inputted. The display processing section 58 performs required signal processing for the video data inputted in this manner to covert the video data into an analog audio signal in accordance with a predetermined television system and outputs the analog audio signal to an analog video output terminal T2.

Consequently, if the analog video output terminal T2 and a video input terminal of the monitor apparatus 114 are connected to each other, then, for example, such displaying as described hereinabove with reference to FIG. 4A is performed.

The MPEG 2 audio decoder 54 to which the MPEG audio data of the format of the PES are inputted performs decoding processing for the MPEG audio data in accordance with the MPEG 2 format utilizing a memory 54A as a working area. The thus decoded audio data are supplied to a D/A converter 56 and an optical digital output interface 59.

The D/A converter 56 converts the audio data inputted thereto into analog audio signal and outputs the analog audio signal to a switch circuit 57. The switch circuit 57 performs switching of a signal path so that the analog audio signal may be outputted to one of a pair of analog audio output terminals T3 and T4.

Here, the analog audio output terminal T3 is provided so as to be connected to an audio input terminal of the monitor apparatus 114. Meanwhile, the analog audio output terminal T4 is used to output therethrough a downloaded tune as an analog signal.

The optical digital output interface 59 converts the digital audio data inputted thereto into an optical digital signal and outputs the optical digital signal. In this instance, the optical digital output interface 59 conforms with, for example, the IEC (International Electrotechnical commission) 958.

The main memory 90 is used as a working area when the CPU 80 performs various controlling processing. In the present embodiment, areas as the DSM-CC buffer 91 and the MHEG buffer 92 described hereinabove are allocated to the main memory 90.

The MHEG buffer 92 is used as a working area for production of video data such as, for example, video data for a GUI screen produced in accordance with the description of a script of the MHEG system, and video data produced here are supplied to the display processing section 58 over a bus line.

The CPU 80 executes entire control of the IRD 112. The control includes control for data separation and extraction by the demultiplexer 70.

The CPU 80 further performs decoding processing for acquired data of MHEG contents to perform processing for constructing a GUI screen in accordance with contents of description of the script and outputting the GUI screen.

To this end, the CPU 80 in the present embodiment includes, in addition to a control processing section 81 which executes main control processing, for example, at least the demultiplexer driver 82, a DSM-CC decoder block 83 and an MHEG decoder block 84. In the present embodiment, at least the DSM-CC decoder block 83 and the MHEG decoder block 84 among the components are formed by software.

The demultiplexer driver 82 sets a filter condition for the demultiplexer 70 based on the PID of the transport stream inputted thereto.

The DSM-CC decoder block 83 has a function as a DSM-Manager and re-constructs data in a unit of a module stored in the DSM-CC buffer 91 into data of MHEG contents. Further, the DSM-CC decoder block 83 executes processing relating to required DSM-CC decoding and so forth in accordance with an access from the MHEG decoder block 84.

The MHEG decoder block 84 accesses the data of MHEG contents obtained by the DSM-CC decoder block 83, that is, the data of MHEG contents obtained by the DSM-CC buffer 91, and performs decoding processing for outputting a scene for the data of MHEG contents. In short, the MHEG decoder block 84 realizes a relationship between objects prescribed by a script file of the MHEG contents to form a scene. Thereupon, when a GUI screen as a scene is formed, the MHEG decoder block 84 utilizes the MHEG buffer 92 and produces video data for a GUI screen in accordance with contents of the script file stored in the MHEG buffer 92.

For the interface between the DSM-CC decoder block 83 and the MHEG decoder block 84, a U-U (User-User) API (Application Portability Interface) is adopted.

The U-U API is an interface for accessing a DSM Manager object (server object for realizing a function of a DSM) and performs an operation for objects such as the service gateway, a directory, a file, a stream, and a stream event.

A client object can perform an operation for those objects by using the U-U API.

Here, an example of operation for extracting a target object necessary to form a scene from a transport stream by control of the CPU 80 is described.

The DSM-CC uses an IOR (Interoperable Object Reference) in order to indicate a location of an object in a transport stream. The IOR includes an identifier corresponding to a carousel for finding out an object, an identifier (hereinafter referred to as module_id) of a module in which the object is included, and an identifier (hereinafter referred to as object_key) for specifying the object in one module, as well as tag (association_tag) information for identifying a DII having information of the module in which the object is included.

Further, the DII having the module information includes information of the module_id, the module size and the module version of each of more than one modules and tag (association_tag) information for identifying the modules.

When the IOR extracted from the transport stream is identified by the CPU 80, for example, such a process as described below is performed to receive and separate the object indicated by the IOR.

(Pr1) The demultiplexer driver 82 of the CPU 80 searches out an elementary stream (hereinafter referred to as ES) having a value equal to that of the association_tag of the IOR from an ES loop of the PMP of the carousel to obtain a PID. The DII is included in the ES which has the PID.

(Pr2) The PID and a table_id_extension are set as filter conditions to the demultiplexer 70. Consequently, the demultiplexer 70 separates the DII and outputs it to the CPU 80.

(Pr3) The association_tag of a module in the DII which corresponds to the module_id included in the preceding IOR is obtained.

(Pr4) An ES having a value equal to the association_tag described above is searched out from the ES loop (carousel) of the PMT to obtain a PID. The target module is included in the ES which has the PID.

(Pr5) The PID and the module_id are set as filter conditions, and filtering by the demultiplexer 70 is performed in accordance with the filter conditions. Transport packets separated and extracted in accordance with the filter conditions are stored into required memory areas (columns) of the queue 71 until a target module is formed finally.

(Pr6) An object which corresponds to the object_key included in the preceding IOR is extracted from the module. This is the target module. The object extracted from the module is written, for example, into a predetermined area of the DSM-CC buffer 91.

For example, if the operation described above is repeated to collect target objects and store them into the DSM-CC buffer 91, then MHEG contents for forming a necessary scene are obtained.

A man-machine interface 61 receives a command signal transmitted thereto from the remote controller 64 and transfers it to the CPU 80. The CPU 80 executes required controlling processing so that an operation of an apparatus corresponding to the received command signal may be obtained.

An IC card 65 is inserted into an IC card slot 62. The CPU 80 performs reading out and writing of information from and to the IC card 65 inserted in the IC card slot 62.

A modem 63 is connected to the charging server 105 over the telephone circuit 104 and is controlled by the CPU 80 so that communication between the IRD 112 and the charging server 105 may be performed.

Here, flows of signals from video/audio sources in the IRD 112 having the construction described above are described supplementally in connection with the displayed form described hereinabove with reference to FIGS. 4A and 4B.

When an ordinary program is to be outputted in such a manner as seen in FIG. 4A, MPEG video data and MPEG audio data of a necessary program are extracted from an inputted transport program, and decoding processing is performed for the MPEG video data and the MPEG audio data. The MPEG video data and the MPEG audio data are outputted to the analog video output terminal T2 and the analog audio output terminal T3, respectively, so that image displaying and audio outputting of the broadcasting program are performed on the monitor apparatus 114.

On the other hand, when a GUI screen shown in FIG. 4B is to be outputted, data of MHEG contents necessary for the GUI screen are separated and extracted from an inputted transport stream by the transport section 53 and fetched into the DSM-CC buffer 91. Then, the DSM-CC decoder block 83 and the MHEG data block 84 function as described above making use of the fetched data so that video data for the GUI screen are produced in the MHEG buffer 92. Then, the video data are supplied to the analog video output terminal T2 through the display processing section 58 so that the GUI screen is displayed on the monitor apparatus 114.

Further, if a tune is selected from a list 121B for tunes on the GUI screen shown in FIG. 4B so that audio data of the tune may be enjoyed in trial, MPEG audio data of the tune are obtained by the demultiplexer 70. Then, the MPEG audio data are outputted as an analog audio signal through the MPEG audio decoder 54, D/A converter 56, switch circuit 57 and analog audio output terminal T3 to the monitor apparatus 114.

On the other hand, if the download button 128 is depressed on the GUI screen shown in FIG. 4B to download audio data, audio data of a tune to be downloaded are extracted by the demultiplexer 70 and outputted to the analog audio output terminal T4, optical digital output interface 59 or IEEE 1394 interface 60.

Here, particularly where the MD recorder/player 1 is connected over the IEEE 1394 bus 116 to the IEEE 1394 interface 60, quadruple speed ATRAC data of the downloaded tune are extracted by the demultiplexer 70 and recorded onto a disc loaded in the MD recorder/player 1 from the IEEE 1394 interface 60 through the IEEE 1394 bus 116. Further, in this instance, also still picture data (a picture file) of an album jacket compressed, for example, in accordance with the JPEG system and text data (a text file) of the words of the tune, a profile of the artist and so forth are extracted from the transport stream by the demultiplexer 70, and transferred from the IEEE 1394 interface 60 to the MD recorder/player 1 over the IEEE 1394 bus 116. The MD recorder/player 1 can record such still picture data and text data into predetermined areas of the disc loaded therein.

1-6. Mini Disc Recording and Reproduction Apparatus 1-6-1. Construction of MD Recorder/Player FIG. 12 shows an internal construction of the recording and reproduction apparatus (MD player/recorder) 1 provided in the AV system 3 of the present embodiment.

Figure 12:
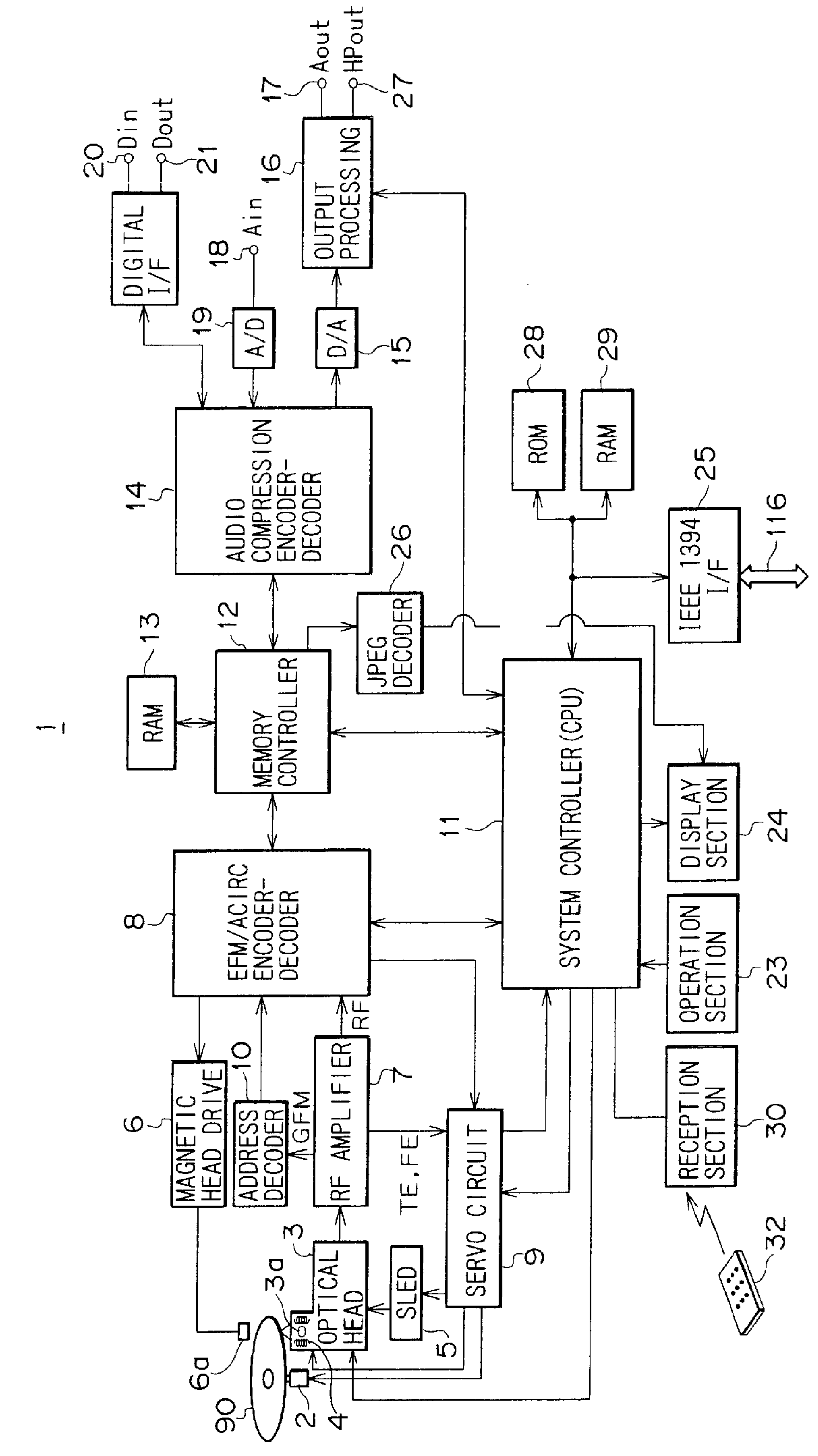
FIG. 12 is a detailed block diagram of a recording and reproduction apparatus to which the present invention is applied.

Referring to FIG. 12, a magneto-optical disc (mini disc) 90 onto which audio data are to be recorded is driven to rotate by a spindle motor 2. Upon recording and/or reproduction, a laser beam from an optical head 3 is irradiated upon the magneto-optical disc 90.

Upon recording, the optical head 3 outputs a laser beam of a high level for heating a recording track to a Curie temperature, but upon reproduction, the optical head 3 outputs a laser beam of a comparatively low level for detecting data from reflected light from the magneto-optical disc 90 by a magnetic Kerr effect.

To this end, the optical head 3 includes an optical system which in turn includes a laser diode serving as laser outputting means, a polarizing beam splitter, an objective lens 3*a* and so forth, a detector for detecting reflected light, and other necessary elements. The objective lens 3*a* is supported for displacement in a radial direction of and in a direction toward or away from the magneto-optical disc 90 by a biaxial mechanism 4.

A magnetic head 6a is disposed in an opposing relationship to the optical head 3 across the magneto-optical disc 90. The magnetic head 6a is adapted to apply to the magneto-optical disc 90 a magnetic field modulated with data supplied thereto.

The entire optical head 3 and the magnetic head 6*a* are supported for movement in a radial direction of the magneto-optical disc 90 by a sled mechanism 5.

Information detected from the magneto-optical disc 90 by the optical head 3 upon reproduction is supplied to a RF amplifier 7. The RF amplifier 7 performs arithmetic processing for the information supplied thereto to detect a reproduction RF signal, a tracking error signal TE, a focusing error signal FE, groove information GFM and other necessary information. The groove information is absolute position information recorded as pre-grooves (wobbling grooves) on the magneto-optical disc 90.

The extracted reproduction RF signal is supplied to an encoder and decoder section 8. The tracking error signal TE and the focusing error signal FE are supplied to a servo circuit 9, and the groove information GFM is supplied to an address decoder 10.

The servo circuit 9 generates various servo driving signals based on the tracking error signal TE and the focusing error signal FE supplied thereto from the RF amplifier 7, a track jump instruction or an access instruction from a system controller 11, which is formed from a microcomputer, rotational speed detection information of the spindle motor 2, and so forth to control the biaxial mechanism 4 and the sled mechanism 5 to effect focusing and tracking control and control the spindle motor 2 to rotate at a constant linear velocity (CLV).

The address decoder 10 decodes the groove information GFM supplied thereto from the RF amplifier 7 to extract address information. The address information is supplied to the system controller 11 and used for various controlling operations by the system controller The reproduction RF signal is subject to decoding processing such as EFM (Eight to Fourteen Modulation) demodulation and CIRC (cross Interleave Reed Solomon Coding) in the encoder and decoder section 8. Upon such decoding processing, also an address, sub code data and so forth are extracted and supplied to the system controller 11.

Audio data in the form of sectors obtained by the decoding processing such as EFM demodulation and CIRC by the encoder and decoder section 8 are written once into a buffer memory 13 by a memory controller 12. It is to be noted that reading of data from the disc 90 by the optical head 3 and transfer of reproduction data in a system from the optical head 3 to the buffer memory 13 are performed intermittently at the rate of 1.41 Mbit/sec.

The data written in the buffer memory 13 are read out at a timing at which transfer of the reproduction data is performed at the rate of 0.3 Mbit/sec, and are supplied to an encoder and decoder section 14. The data supplied to the encoder and decoder section 14 are subject to reproduction signal processing such as decoding processing corresponding to audio compression processing so that they are converted into a digital audio signal sampled with 44.1 KHz and quantized with 16 bits.

The digital audio signal is converted into an analog signal by a D/A converter 15 and then subject to level adjustment, impedance adjustment and so forth by an output processing section 16. A resulting signal from the output processing section 16 is outputted as an analog audio signal Aout from a line output terminal 17 to an external apparatus. The signal from the output processing section 16 is supplied also as a headphone output HPout to a headphone output terminal 27 so that it is outputted to a headphone connected to the headphone output terminal 27.

Meanwhile, the digital audio signal after decoded by the encoder and decoder section 14 is supplied to a digital interface section 22 so that it can be outputted as a digital audio signal Dout from a digital output terminal 21 to an external apparatus. The digital audio signal is outputted to the external apparatus, for example, by transmission over an optical cable.

When a recording operation onto the magneto-optical disc 90 is to be performed, an analog audio signal Ain supplied to a line input terminal 18 is converted into digital data by an A/D converter 19 and then supplied to the encoder and decoder section 14, by which audio compression encoding is performed therefor.

On the other hand, if a digital audio signal Din is supplied from an external apparatus to a digital input terminal 20, then extraction of audio data, control codes and so forth is performed by the digital interface section 22. The audio data are supplied to the encoder and decoder section 14, by which audio compression encoding processing is performed therefor.

Though not shown, it is naturally possible to provide a microphone input terminal so that a microphone input may be used as a recording signal.

The compressed recording data from the encoder and decoder section 14 are written once into and accumulated in the buffer memory 13 by the memory controller 12 and then read out for each data unit of a predetermined amount and sent to the encoder and decoder section 8. Then, the recording data are subject to encoding processing such as CIRC encoding and EFM modulation by the encoder and decoder section 8, and resulting data are supplied to a magnetic head drive circuit 6.

The magnetic head drive circuit 6 supplies a magnetic head driving signal to the magnetic head 6*a* in accordance with the encoded recording data from the encoder and decoder section 8. In other words, the magnetic head drive circuit 6 causes the magnetic head 6*a* to perform application of a magnetic field of the N or S pole to the magneto-optical disc 90. Further, the system controller 11 thereupon supplies a control signal to the optical head 3 so that the optical head 3 may output a laser beam of a recording level.

An operation section 23 is operated by a user and includes operation keys, a dial and so forth which serve as operation elements. The operation elements include, for example, operation elements regarding recording and reproduction operations such as reproduction, recording, pause, stop, FF (fast feeding), REW (rewinding) and AMS (Auto Music Search) (head search), operation elements regarding play modes such as normal reproduction, program reproduction and shuffle reproduction, an operation element for a display mode operation for switching the displaying state of a display section 24, and operation elements for program editing operations such as track division, track connection, track erasure, track name inputting and disc name inputting.

Operation information by the operation keys and the dial is supplied to the system controller 11. The system controller 11 thus executes operation control based on the control information.

The recording and reproduction apparatus 1 in the present embodiment further includes a reception section 30. The reception section 30 receives a command signal transmitted, for example, by infrared rays from the remote controller 32, performs decoding processing for the command signal, and outputs the decoded command signal as a command code to the system controller 11. The system controller 11 executes operation control based on the command code received from the reception section 30.

A displaying operation of the display section 24 is controlled by the system controller 11.

In particular, in order to cause the display section 24 to perform a displaying operation, the system controller 11 transmits data to be displayed to a display driver in the display section 24. The display driver drives a displaying operation of a display unit such as a liquid crystal panel based on the data supplied thereto to display required numerals, characters, marks and so forth.

The display section 24 displays an operation mode state of a disc being recorded or played back, a track number, a recording time or reproduction time, an editing operation state and so forth.

The disc 90 allows recording thereon of character information such as a track name which is managed incidentally to a program as main data. When such character information is inputted, the inputted characters are displayed, and also character information read out from the disc is displayed.

Further, in the present embodiment, sub data (AUX data) which make data files independent of data of tunes and so forth as programs can be recorded on the disc 90.

A data file as AUX data includes information of characters, a still picture or the like, and such characters or still picture can be displayed on the display section 24.

In the present embodiment, a JPEG decoder 26 is provided as a component for allowing the display section 24 to display a still picture and characters of AUX data.

In particular, in the present embodiment, still picture data of a data file as AUX data are recorded in the form of a file compressed in accordance with the JPEG (Joint Photographic Coding Experts Group) system. The JPEG decoder 26 receives a file of still picture data reproduced from the disc 90 and stored, for example, in the buffer memory 13 through the memory controller 12, performs decompression processing in accordance with the JPEG system for the file, and outputs resulting data to the display section 24. Consequently, the still picture data as the AUX data are displayed on the display section 24.

It is to be noted, however, that, where character information or still picture information of AUX data is outputted, a full dot display unit or a CRT display unit which has a comparatively large screen and can use the screen freely to some degree is preferably used frequently. Therefore, it is a possible idea to display AUX data on an external monitor apparatus or the like which is connected to an interface section 25.

Further, while a user can record an AUX data file onto the disc 90, it is sometimes necessary to use an image scanner, a personal computer or a keyboard as an inputting apparatus then, and it is a possible idea to input information as an AUX data file from such an inputting apparatus as just mentioned to the recording and reproduction apparatus 1 through the interface section 25.

It is to be noted that, in the present embodiment, an IEEE 1394 interface is adopted for the interface section 25. Therefore, in the following description, the interface section 25 is sometimes represented as IEEE 1394 interface 25. Accordingly, the IEEE 1394 interface 25 can be connected to various external apparatus over the IEEE 1394 bus 116.

The system controller 11 is formed as a microcomputer including a CPU, an internal interface unit and so forth and controls the various operations described hereinabove.

A program ROM 28 has stored therein a program and so for to be used to realize the various operations of the recording and reproduction apparatus 1. Further, data, programs and so forth necessary for the system controller 11 to execute various processes are suitably stored into and held by a work RAM 29.

When a recording or reproduction operation is performed for the disc 90, management information recorded on the disc 90, that is, the P-TOC (Pre-mastered Table Of Contents) and the U-TOC (User Table Of Contents) must be read out. The system controller 11 discriminates an address of an area to be recorded or an address of an area to be played back on the disc 90 based on the management information.

The management information is stored in the buffer memory 13.

When the disc 90 is loaded into the recording and reproduction apparatus 1, the system controller 11 causes a reproduction operation of the innermost circumference of the disc 90, on which the management information is recorded, to be executed to read out the management information and stores the management information into the buffer memory 13 so that the management information may thereafter be referred to upon recording, reproduction or editing operation for the disc 90.

The U-TOC is rewritten in response to recording or editing processing of program data. More particularly, each time a recording or editing operation is performed, the system controller 11 performs U-TOC updating processing for the U-TOC information stored in the buffer memory 13 and rewrites the U-TOC area of the disc 90 at a predetermined timing in response to the rewriting operation.

While AUX data files are recorded on the disc 90 separately from programs, an AUX-TOC is formed on the disc 90 for allowing management of the AUX data files.

The system controller 11 performs also reading out of the AUX-TOC upon reading out of the U-TOC and stores the AUX-TOC into the buffer memory 13 so that, when necessary, it can refer to the AUX data management state.

Further, when necessary, the system controller 11 reads out an AUX data file at a predetermined timing and stores the AUX data file into the buffer memory 13. Then, in response to an outputting timing which is managed with the AUX-TOC, the system controller 11 causes the display section 24 or the external apparatus connected to the interface section 25 to execute an outputting operation of characters or an image.

1-6-2. Sector Format and Address Format

Data units called sector and cluster are described below with reference to FIGS. 13A to 13E.

Figures 13A, 13B, 13C, 13D, 13E:
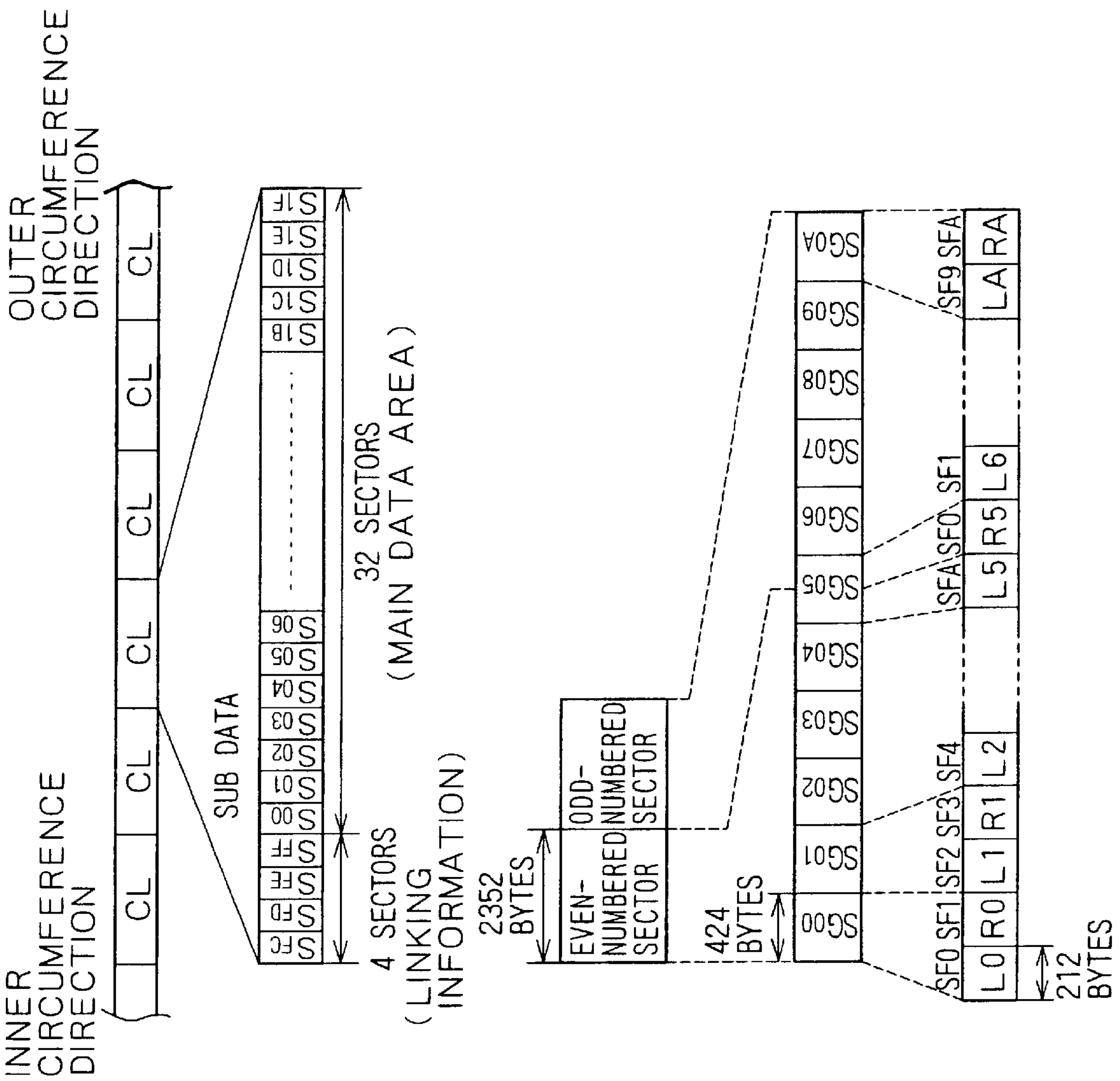
FIG. 13A is a diagrammatic view showing a data structure of clusters recorded on a recording track of a disc used in the recording and reproduction apparatus of FIG. 12.
FIG. 13B is a diagrammatic view showing a data structure of sectors which form a cluster shown in FIG. 13A.
FIG. 13C is a diagrammatic view showing a data structure of sound groups which form a pair of sectors shown in FIG. 13B.
FIG. 13D is a diagrammatic view showing a data structure of eleven sound groups formed from a pair of sectors.
FIG. 13E is a diagrammatic view showing a data structure of sound frames which form the eleven sound groups shown in FIG. 13D.

In a recording track in the mini disc system, clusters CL are formed successively as seen in FIG. 13A, and one cluster makes a minimum unit upon recording. One cluster corresponds to 2 to 3 circumferential tracks.

Referring to FIG. 13B, one cluster CL includes a linking area of four sectors SFC to SFF and a main data area of 32 sectors S00 to S1F.

As seen from FIG. 13C, one sector is a unit of data including 2,352 bytes.

Of the sub data area of four sectors shown in FIG. 13B, the sector SFF is used as a sub data sector which can be used for recording of information as sub data. However, the remaining three sectors SFC to SFE are not used for recording of data.

Mean while, TOC data, audio data, AUX data and so forth are recorded into the main data area for 32 sectors.

It is to be noted that an address is recorded for each one sector.

Referring to FIGS. 13C and 13D, one sector is further divided into units called sound groups. More particularly, two sectors are divided into 11 sound groups.

More specifically, as seen from FIGS. 13C and 13D, two successive sectors including an even-numbered sector such as the sector S00 and an odd-numbered sector such as the sector S01 include sound groups SG00 to SG0A. One sound group is formed from 424 bytes and includes an amount of audio data corresponding to the time of 11.61 msec.

As seen from FIGS. 13D and 13F, data are recorded separately for the left channel and the right channel in one sound group SG. For example, the sound group SG00 includes left channel data L0 and right channel data R0, and the sound group SG01 includes left channel data L1 and right channel data R1.

It is to be noted that 212 bytes which make a data area for the left channel or the right channel is called sound frame.

An address format in the mini disc system is described below with reference to FIGS. 14A and 14B.

An address of each sector is represented by a cluster address and a sector address. As seen from FIG. 14A, a cluster address has a value of 16 bits (=2 bytes), and a sector address has a value of 8 bits (=1 byte).

Thus, an address of 3 bytes is recorded at the top position of each sector.

Further, by adding a sound group address of 4 bits, also an address of a sound group in a sector can be represented. For example, if a sound group address is described for management of the U-TOC or the like, setting of a reproduction position in a unit of a sound group is allowed.

Figures 14A, 14B:
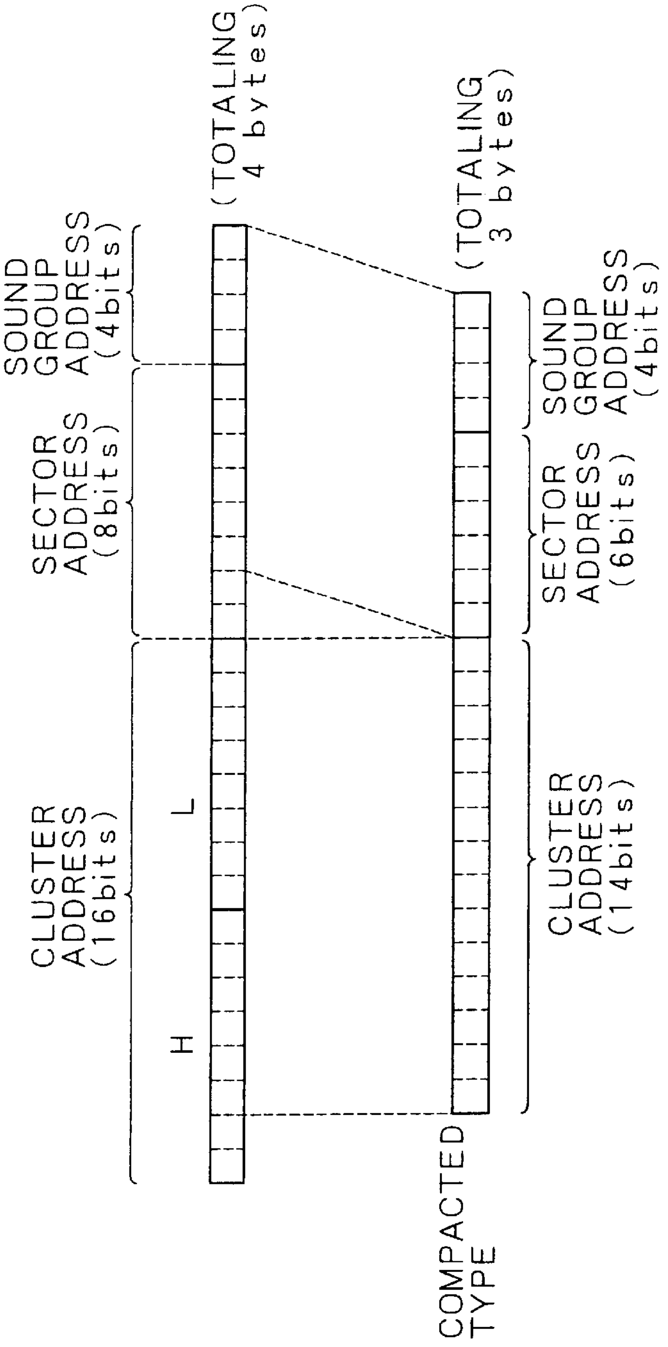
FIG. 14A is a diagrammatic view showing a data structure of an ordinary address format applied to a recording medium for use with the recording and reproduction apparatus.
FIG. 14B is a diagrammatic view showing a data structure of a compacted type address format applied to the recording medium for use with the recording and reproduction apparatus.

By the way, in the U-TOC or the AUX-TOC, in order to allow a cluster address, a sector address and a sound group address to be represented in three bytes, such a compacted type address as seen in FIG. 14B is used.

First, a sector can be represented with 6 bits because one cluster includes 36 sectors. Accordingly, the two high order bits of a sector address can be omitted. Similarly, since a cluster up to the outermost. circumference of the disc can be represented with 14 bits, the two high order bits can be omitted.

By omitting the two most significant bits of each of a sector address and a cluster address, an address which allows designation also of a sound group can be represented with 3 bytes.

Further, in the U-TOC and the AUX-TOC which are hereinafter described, an address to be used for management of a reproduction position, a reproduction timing or the like is described in an address of the compacted type. The address may be represented in the form of an absolute address or in the form of an offset address. The offset address is, for example, a relative address which represents the position in each program such as a tune with reference to the top position of the program determined as a position of the address 0. An example of the offset address is described below with reference to FIGS. 15A to 15C.

As hereinafter described with reference to FIGS. 16A and 16B, programs such as tunes are recorded in clusters beginning with the 50th cluster on the disc, that is, the 32h-th cluster in hexadecimal notation. It is to be noted that any numerical value followed by "h" represents a value of the hexadecimal notation.

Figure 15A:
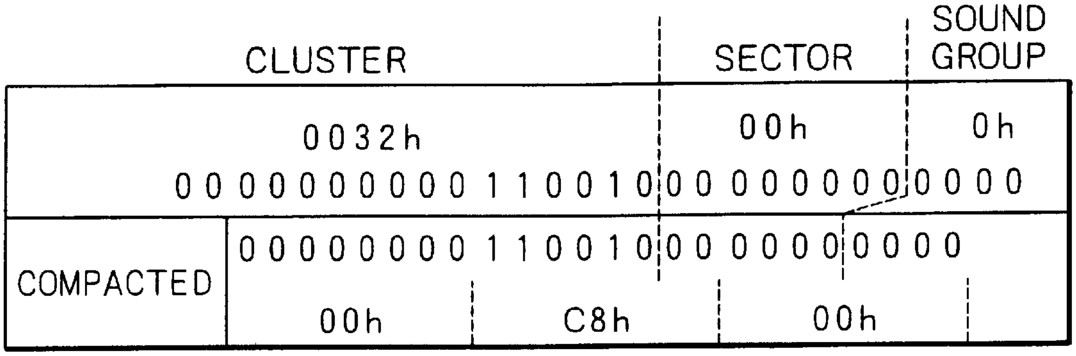
FIG. 15A is a diagrammatic view showing an example of description when data of the ordinary address format are described in the compacted address format.

For example, the address value of the address of the top position of the first program (that is, cluster "32h", sector "00h", sound group "0h") is "0000000000110010000000000000" as seen in FIG. 15A, that is, "0032h", "00h", "0h". If this is represented in the compacted type, it is "000000001100100000000000", that is, "00h", "C8h", "00h".

Figure 15B:
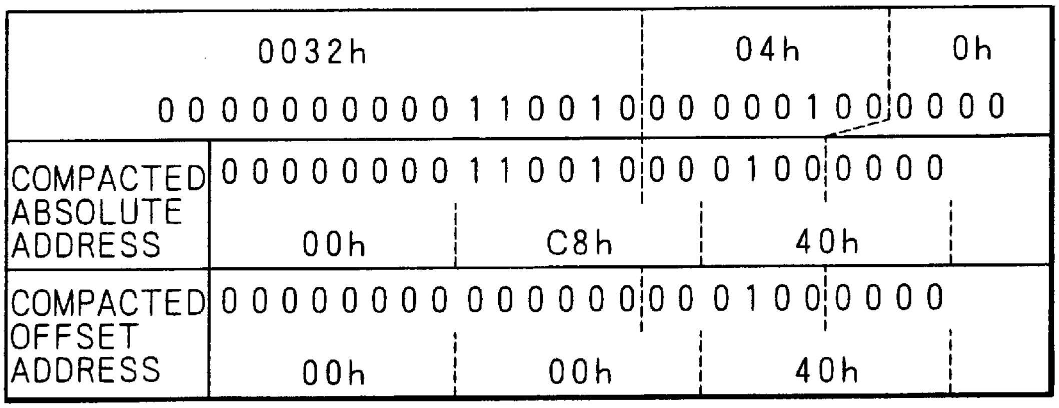
FIG. 15B is a diagrammatic view showing an example of description when data of the ordinary address format are described in a compacted type absolute address format and a compacted type offset address.

With the top address determined as a start point, the address of a certain point in the first program, for example, the address of the cluster "0032h", sector "04h", sound group "0h" is, in the compacted absolute address representation as in FIG. 15B, "00h", "C8h", "40h". Meanwhile, the address described above in the offset address representation is "00h", "00h", "40h" because the cluster "0032h", sector "04h", sound group "0h" is represented as a finite difference from the start point provided by the top address.

Figure 15C:
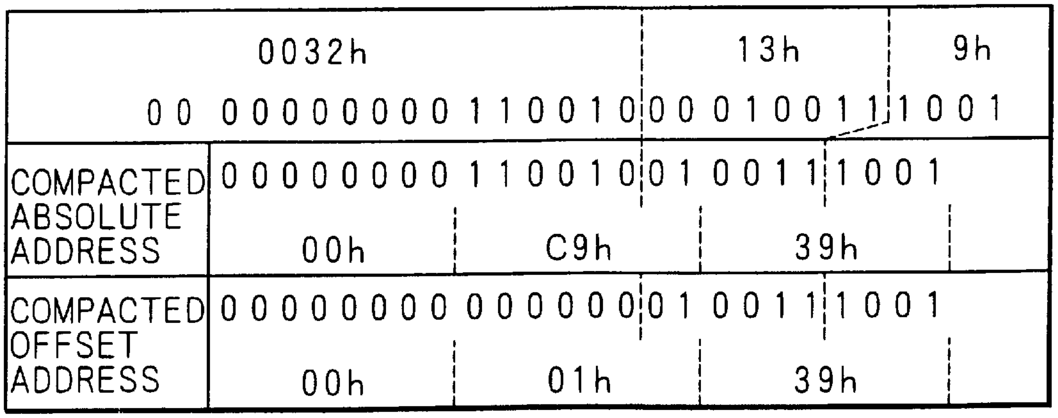
FIG. 15C is a diagrammatic view showing another example of description when data of the ordinary address format are described in a compacted type absolute address format and a compacted type offset address.

On the other hand, with the top address of FIG. 15A determined as a start point, another certain position in the first program, for example, the address of the cluster "0032h", sector "13h", sound group "9h" is, in the compacted absolute address, "00h", "C9h", "39h" as seen in FIG. 15C, but is, in the offset address, "00h", "01h", "39h".

Like the examples described above, a position in a program can be designated with an absolute address or an offset address.

1-6-3. Area Structure

An area structure of the disc 90 which can be handled by the MD recorder/player 1 of the present embodiment is described below with reference to FIGS. 16A and 16B.

Figures 16A, 16B:
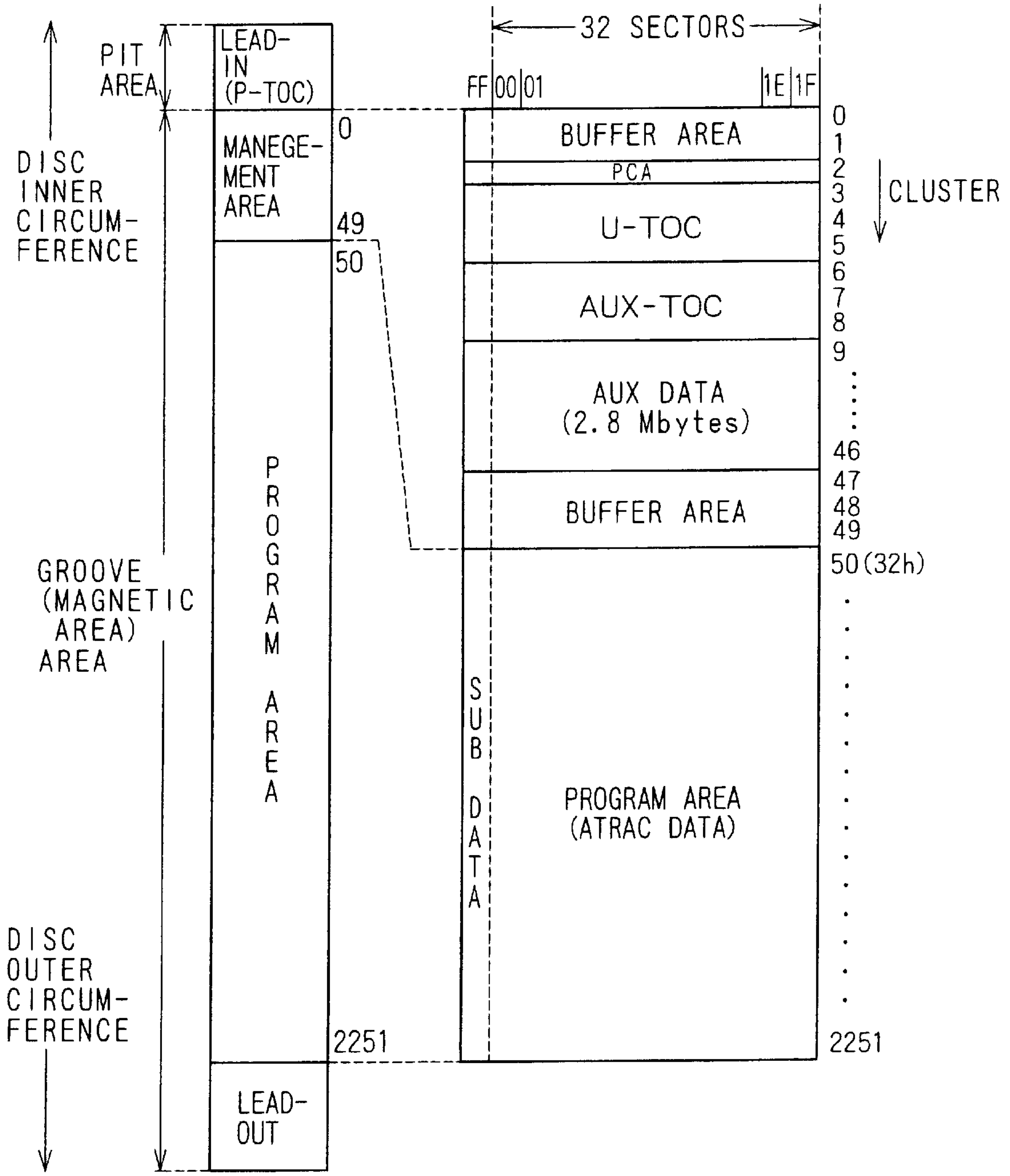
FIG. 16A is a diagrammatic view showing an area structure of a magneto-optical disk used in the recording and reproduction apparatus of FIG. 12.
FIG. 16B is a diagrammatic view showing a detailed area structure of a management area and a program area shown in FIG. 16A.

FIG. 16A shows different areas from the innermost circumference side to the outermost circumference side of the disc 90.

The disc 90 as a magneto-optical disc has, on the innermost circumference side, a pit area in which read only data in the form of embossed pits are formed and the P-TOC is recorded.

The remaining area on the outer circumferences with respect to the pit area is formed as a magneto-optical area and as a recording/reproduction allowing area in which grooves as guide grooves for recording tracks are formed.

A section of the magneto-optical area from the cluster 0 on the innermost circumference side to the cluster 49 is used as a management area whereas another section from the cluster 50 to the cluster 2,251 is used as a program area in which actual programs such as tunes are recorded. The remaining outer circumferential area with respect to the program area is used as a lead-out area.

The management area is illustrated more particularly in FIG. 16B. FIG. 16B shows sectors in a horizontal direction and shows clusters in a vertical direction.

The clusters 0 and 1 in the management area form a buffer area to the pit area. The cluster 2 is used as a power calibration area PCA and used for output power adjustment of a laser beam and so forth.

In the clusters 3, 4 and 5, the U-TOC is recorded. While contents of the U-TOC are hereinafter described, a data format is defined in each sector in one cluster, and predetermined management information is recorded in each sector. The U-TOC data are repetitively recorded three times in the three clusters 3, 4 and 5 having the sectors in which the U-TOC data are recorded.

The clusters 6, 7 and 8 are used to record the AUXTOC. Although also contents of the AUX-TOC are hereinafter described, a data format is defined in each sector in one cluster and predetermined management information is recorded in each sector. The AUX-TOC data are repetitively recorded three times in the three clusters 6, 7 and 8 having the sectors in which the AUX-TOC data are recorded.

The region from the cluster 9 to the cluster 46 is used to record AUX data. A data file of AUX data is formed in a unit of a sector and includes picture file sectors as a still picture file, text file sectors as a character information file, karaoke text file sectors as a character information file synchronized with a program and so forth which are hereinafter described.

Regions in the AUX data area in which data files of AUX data, AUX data files and so forth can be recorded are managed with the AUX-TOC.

It is to be noted that the recording capacity for data files in the AUX data area is 2.8 Mbytes where an error correction system mode 2 is presumed.

Also it is possible to form a second AUX data area, for example, in a rear half portion of the program area or a region on the outer circumference side than the program area such as, for example, the lead-out portion to increase the recording capacity for data files.

The clusters 47, 48 and 49 are used as a buffer area to the program area.

In the program area beginning with the cluster 50 (="32h"), data of one or a plurality of tunes or the like are recorded in the form compressed by a compression method called ATRAC.

Programs recorded and a-recording allowing region are managed with the U-TOC.

It is to be noted that, in each cluster in the program area, the sector "FFh" can be used for recording of some information as sub data as described hereinabove.

It is to be noted that, although, in the present mini disc system, a reproduction only disc on which programs and so forth are recorded as reproduction only data in the form of pits can be used, the entire area of the reproduction only disc is formed as a pit area. The programs recorded on the reproduction only disc are managed in a manner substantially similar to that with the U-TOC, which is hereinafter described, and the U-TOC is not formed.

However, where reproduction only data files are recorded as AUX data, the AUX-TOC for managing the data files is recorded.

1-6-4. U-TOC 1-6-4-1. U-TOC Sector 0

As described hereinabove, in order to perform a recording and reproduction operations of a program onto and from the disc 90, the system controller 11 reads out the P-TOC and the U-TOC as management information recorded on the disc 90 in advance, and refers to them when necessary.

Here, the U-TOC sectors as management information to be used for management of recording and reproduction operations of tracks on the disc 90 are described.

It is to be noted that the P-TOC is formed in the pit area on the innermost circumference side of the disc 90 as described hereinabove with reference to FIG. 16A. Then, management of the positions of recordable areas, the lead-out area and the U-TOC area and so forth of the disc is performed based on the P-TOC. It is to be noted that, with a read only optical disc on which all data are recorded in the form of pits, also management of tunes recorded as a ROM (Read Only Memory) can be performed with the P-TOC, but no U-TOC is formed.

Detailed description of the P-TOC is omitted, and here, the U-TOC which is provided on a recordable magneto-optical disc is described.

FIG. 17 shows the format of the U-TOC sector 0.

It is to be noted that, as the U-TOC sectors, the sectors from the sector 0 up to the sector 32 can be provided, and among the sectors, the sector 1 and the sector 4 can be used as an area in which character information is to be recorded and the sector 2 is used as an area into which recording dates/times are to be recorded.

First, the U-TOC sector 0 required without fail for recording and reproduction operations for the disc 90 is described.

The U-TOC sector 0 is a data area in which management information principally regarding programs such as tunes recorded by a user and free areas into which programs can be recorded newly is recorded.

For example, if a user intends to record a certain tune onto the disc 90, the system controller 11 searches out a free area on the disc 90 from the U-TOC sector 0 and records audio data into the free area. On the other hand, upon reproduction, an area in which a tune to be reproduced is recorded is discriminated from the U-TOC sector 0, and the area is accessed to perform a reproduction operation.

At the top position of the data area (4 bytes×588=2,352 bytes) of the U-TOC sector 0, a synchronization pattern in which several 1-byte data of all 0s or all 1s are formed successively is recorded.

Then, an address including a cluster address (Cluster H) (Cluster L) and a sector address (Sector) is recorded over 3 bytes, and 1 byte of mode information (MODE) is added. The bytes mentioned form a header. The address of 3 bytes here is an address of the sector itself.

The structure of the header part in which the synchronization pattern and an address are recorded applies not only to the U-TOC sector 0 but also to the P-TOC sectors, AUX-TOC sectors, AUX file sectors and program sectors, and although description of the header part of any of the sectors hereinafter described with reference to FIGS. 19 to 29 is omitted, in the header part of any of the sectors, an address of the sector itself and the synchronization pattern are recorded in a unit of a sector.

It is to be noted that, as the address of a sector itself, the cluster address is represented in 2 bytes of a high order address (Cluster H) and a low order address (Cluster L) and the sector address (Sector) is represented with 1 byte. In other words, the address is not of the compacted type.

Then, at predetermined byte positions, data of a maker code, a model code, a track number (First TNO) of the first track, a track number (Last TNO) of the last track, a sector use situation (Used sectors), a disc serial number, a disc ID and so forth are recorded.

Further, a region is prepared in which various pointers (P-DFA (Pointer for Defective Area), P-EMPTY (Pointer for Empty Slot), P-FRA (Pointer for Free Area), P-TNO1 to P-TNO255) provided to allow identification of regions of tracks recorded by recording operations performed by a user, free areas and so forth by making them correspond to a table section which is hereinafter described are to be recorded.

In the table section which is made correspond to the pointers (P-DFA to P-TNO255), 255 part tables "01h" to "FFh" are provided. In each part table, a start address which defines a start point of a given part, an end address which defines an end point of the part, and mode information of the part are recorded. Further, since a part indicated by a part table may possibly be linked to another part, link information indicative of a part table in which a start address and an end address of the part of the destination of the link are recorded can be recorded.

It is to be noted that the term "part" signifies a track portion in which successive data in time are recorded physically continuously in one track.

Addresses represented as start addresses and end addresses designate a part or each of a plurality of parts which form a track.

Those addresses are recorded in compacted representations and each designates a cluster, a sector and a sound group.

In a recording and reproduction apparatus of the type described above, data of tune such as a program or track are sometimes recorded physically discontinuously or discretely in a plurality of parts. This is because, as regards audio data or the like recorded by a user, even if they are recorded over a plurality of parts, there is no trouble in a reproduction operation by successively accessing the parts to reproduce them, and this allows efficient use of recordable areas and so forth.

To this end, link information is provided, and for example, by designating a part table to be linked based on the numbers "01h" to "FFh" given to the individual part tables, the part table can be linked.

In particular, in the management table section in the U-TOC sector 0, one part table represents one part, and, for example, for a tune formed from three parts linked to each other, the part positions are managed with three part tables linked with the link information.

It is to be noted that actually the link information is indicated by a value representing a byte position in the U-TOC sector 0 by predetermined calculation processing. In particular, a part table is designated as 304+(link information)×8 (−th byte)

Each of the part tables "01h" to "FFh" in the U-TOC sector 0 indicates contents of the part in the following manner with the pointers (P-FDA, P-EMPTY, P-FRA, P-TNO1 to PTNO255) in the pointer section.

The pointer P-DFA indicates a defective area on the magneto-optical disc 90 and designates a part table or the top one of a plurality of part tables which represents a part or represent parts which provides or provide a defective area because of damage to the same. In short, if the magneto-optical disc 90 includes a defective part, one of the part tables "01h" to "FFh" is recorded in the pointer P-DFA, and in the corresponding part table, the defective part is indicated with start and end addresses. Further, if the magneto-optical disc 90 includes another defective part, the part table of this defective part is designated as the link information in the first-mentioned part table, and also in the part table, the defective part is indicated. If no other defective part is involved, then the link information is set, for example, to "00h", which indicates absence of any further link.

The pointer P-EMPTY indicates a part table of a non-used part or the top one of a plurality of non-used part tables in the management table section. Where a non-used part table is present, one of "01h" to "FFh" is recorded in the pointer P-EMPTY.

Where a plurality of non-used part tables are present, such part tables are successively designated with link information from the part table designated by the pointer P-EMPTY such that all of the non-used part tables are linked on the management table section.

The pointer P-RFA indicates a free area including an erased area on the magneto-optical disc 90 into which data can be written and designates a part table or the top one of a plurality of part tables which includes or include a free area. In particular, if a free area is present, then one of "01h" to "FFh" is recorded in the pointer P-FRA, and in a part table corresponding to it, the part which forms the free area is indicated with start and end addresses. Further, where a plurality of such parts are present, or in other words, where a plurality of such part tables are present, the part tables are successively designated with link information until the link information of "00h" is found.

Figure 18:
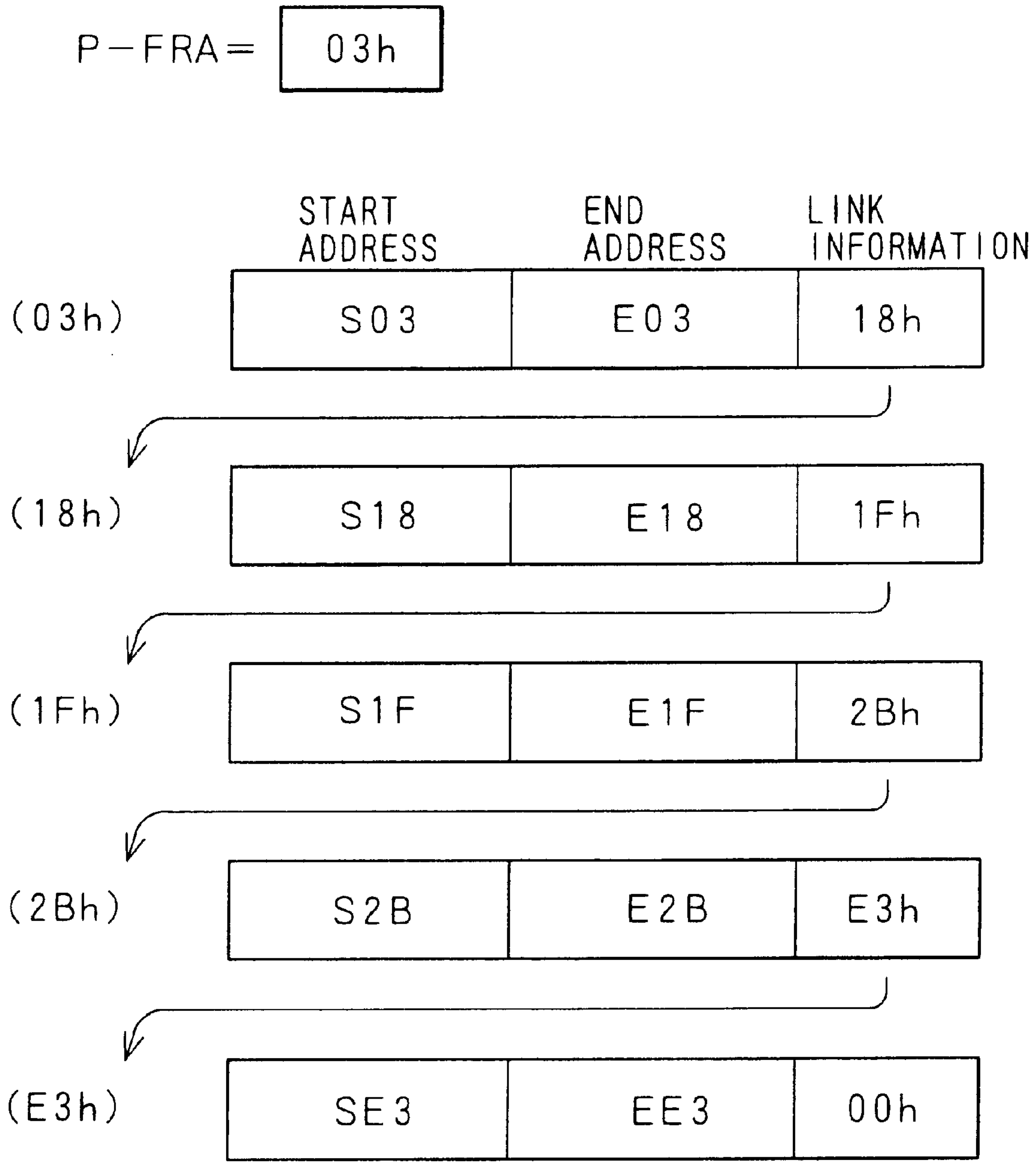
FIG. 18 is a diagrammatic view illustrating a link structure.

FIG. 18 schematically illustrates a manner of management of parts which form a free area with part tables. In FIG. 18, the parts "03h", "18h", "1Fh", "2Bh" and "E3h" form a free area and are successively linked beginning with the pointer P-FRA. Also such defective area and non-used part tables as described above are managed in a similar manner.

Referring back to FIG. 17, the pointers P-TNO1 to P-TNO255 indicate tracks of tunes or the like recorded on the magneto-optical disc 90 by a user. For example, the pointer P-TNO1 designates a part table which indicates a part or a top one, with respect to time, of a plurality of parts in which data of the first track are recorded.

For example, if a tune of a first track or a first program is recorded without being divided, that is, recorded in one part, on the disc, the recording area of the first track is designated with start and end addresses in a part table indicated by the pointer P-TNO1.

Further, if a tune of a second track or a second program is recorded discretely in a plurality of parts on the disc, the n the parts for indicating the record ed positions of the second track are designated in accordance with an order in time. In particular, beginning with a part table designated by the pointer P-TNO2, the other part tables are successively designated in accordance with an order in time with link information to link the parts until the part table whose link information is "00h" is reached. The manner of linkage is similar to that described hereinabove with reference to FIG. 18.

Since all parts in which, for example, data of the second tune are recorded are successively designated and recorded in this manner, when reproduction of the second tune or overwrite recording into the region of the second tune is to be performed using the data of the U-TOC sector 0, the optical head 3 and the magnetic head 6*a* can be controlled to access the discrete parts to extract the continuous music information or to effect recording with the recording area used efficiently.

In this manner, with the re-writable magneto-optical disc 90, management of the areas on the disc is performed based on the P-TOC and management of tunes recorded in the recordable service area, a free area and so forth is performed based on the U-TOC.

1-6-4-2. U-TOC Sector 1

FIG. 19 shows the format of the U-TOC sector 1. The U-TOC sector 1 is a data region into which inputted character information is recorded when a track name is to be applied to a recorded track or a disc name as information of the name or the like of the disc itself is to be applied to the disc.

In the U-TOC sector 1, pointers P-TNA1 to P-TNA255 are prepared as a pointer section which corresponds to recorded tracks, and 255 slots "01h" to "FFh" of 8 bytes designated by the pointers P-TNA1 to P-TNA255 and one slot "00h" of 8 bytes are prepared. The U-TOC sector 1 is thus used for management of character data in a substantially similar manner to that of the U-TOC sector 0.

Character information representing a disc title or a track name is recorded in ASCII codes in each of the slots "01h" to "FFh".

For example, in a slot designated by the pointer P-TNA1, characters inputted corresponding to the first track by a user are recorded. Further, as a slot is linked with link information, a number of characters greater than 7 bytes (7 characters) may be inputted for one track.

It is to be noted that the slot "00h" of 8 bytes is prepared as an area for exclusive use to record a disc name and is prevented from being designated by the pointer P-TNA(x).

Also in the U-TOC sector 1, the pointer P-EMPTY is used for management of non-used slots.

1-6-4-3. U-TOC Sector 2

FIG. 20 shows the format of the U-TOC sector 2. The U-TOC sector 2 is a data region into which recording dates/times of tunes recorded by a user are recorded principally.

In the U-TOC sector 2, pointers P-ERD1 to P-TRD255 are prepared as a pointer section which corresponds to tracks recorded, and a slot section designated by the pointers P-TRD1 to P-TRD255 is prepared. Further, 255 slots "01h" to "FFh" of 8 bytes are prepared in the slot section, and the U-TOC sector 2 is used for management of date/time data substantially in a similar manner to that of the U-TOC sector 0.

In the slots "01h" to "FFh", recording date/times of tracks as tunes are recorded in 6 bytes. In the 6 bytes, values corresponding to the year, the month, the day, the hour, the minute and the second are recorded successively for each one byte. The remaining 2 bytes are prepared for a maker code and a model code, and code data representing a manufacturer of a recording apparatus used for recording of the tune and code data representing a type of the recording apparatus used for recording are recorded in them.

For example, if a track as a first tune is recorded onto the disc, then the recording date/time, the maker code of the recording apparatus used and the model code are recorded into a slot designated by the pointer P-TRD1. The recording date/time data are automatically recorded by the system controller 11 referring to an internal clock.

The slot "00h" of 8 bytes is prepared as an area for exclusive use to record the recording date/time of the disc and is prevented from being designated by the pointer P-TRD(x).

It is to be noted that, also in the U-TOC sector 2, the slot pointer P-EMPTY is used for management of slots which are not used. In such non-used slots, link information is recorded in place of a model code. Thus, the non-used slots are linked with such link information beginning with the slot pointer P-EMPTY to manage the non-used slots.

1-6-4-4. U-TOC sector 4

FIG. 21 shows the U-TOC sector 4. The U-TOC sector 4 is a data area into which inputted character information is recorded when a tune name is to be applied to a track recorded by a user or a disc name is to be applied to the disc similarly to the U-TOC sector 1 described hereinabove. As can be seen from comparison of FIG. 21 with FIG. 19, the format of the U-TOC sector 4 is substantially similar to that of the U-TOC sector 1.

However, the U-TOC sector 4 allows recording of code data, that is, 2 byte codes, corresponding to a Kanji or a European character such as French or German, and in addition to data of the U-TOC sector 1 of FIG. 19, an attribute of a character code is recorded at a predetermined byte position.

Management of character information of the U-TOC sector 4 is performed with pointers P-TNA1 to P-TNA255 and slots "01h" to "FFh" designated by the pointers P-TNA1 to P-TNA255, like U-TOC sector 1.

It is to be noted that the recording and reproduction apparatus or MD recorder/player 1 of the present embodiment can handle a reproduction only disc on which no U-TOC is formed. Where such a reproduction only disc is used, it may have character information of a disc name and track names recorded in the P-TOC thereof.

In particular, sectors substantially similar to the U-TOC sector 1 and the U-TOC sector 4 are prepared as P-TOC sectors, and a disc maker can record a disc name and track names on the P-TOC sectors in advance.

1-6-5. AUX-TOC 1-6-5-1. AUX-TOC Sector 0

In the disc 90 in the present embodiment, regions in which AUX data files and the AUX-TOC are to be recorded are set as described hereinabove with reference to FIG. 16B, and character information, image information and so forth independent of tracks of programs such as tunes can be recorded as AUX data files.

Such AUX data files are managed with the AUX-TOC. The AUX-TOC is recorded three times repetitively over 3 clusters, and accordingly, as a management data structure, 32 sectors in one cluster can be used similarly as in the U-TOC.

In the present embodiment, the AUX-TOC sectors 0 to 5 are set to manage the AUX data files as described below.

First, the format of the AUX-TOC sector 0 is described with reference to FIG. 22.

The AUX-TOC sector 0 is used as an area allocation table principally for management of a free area in the overall AUX data region.

As seen from FIG. 22, in the AUX-TOC sector 0, a header including a sector address (sector)=00h" and mode information (MODE)="02h" is recorded first, and the four characters of 'M', 'D', 'A' and 'D' are recorded in the form of ASCII codes in a region of 4 bytes at predetermined byte positions. The characters 'M', 'D', 'A' and 'D' indicate a format ID and are recorded commonly at a same byte position in the AUX-TOC sectors which are hereinafter described.

Further, a maker code and a model code are recorded at predetermined byte positions following the format ID, and used sector information is recorded at predetermined byte positions following the maker code and the mode code.

The used sector information indicates a situation of use of sectors in the AUX-TOC.

The eight bits d8 to d1 which form the Used Sector o correspond to 0 to 7 sectors, respectively. In a similar manner, the 8 bits d8 to d1 of the Used Sector 1 correspond to 8 to 15 sectors, respectively. The 8 bits d8 to d1 of the Used Sector 2 correspond to 16 to 23 sectors, respectively. The 8 bits d8 to d1 of the Used Sector 3 correspond to 24 to 31 sectors, respectively.

In the AUX-TOC sector 0, a pointer section is formed from pointers P-EMPTY and P-BLANK.

In a table section, 99 part tables of 8 bits in which a start address, an end address and link information are formed such that management of the AUX data area may be performed in a similar manner as with the U-TOC sector 0 described hereinabove. In this instance, however, part tables "01h" to "63h" are used as the table section, but the remaining part tables "64h" to "FFh" are not used with all 0s (zeros) placed herein.

It is to be noted that, although the part tables beginning with the part table "64h" may possibly be used as the table section, for practical use, it is sufficient to use 99 part tables for management. Here, the reason why the part tables "01h" to "63h" are used as the effective table section is that it is determined taking a particular capacity of the buffer memory 13 into consideration.

The pointer P-EMPTY is used for management in the form of a linkage of non-used part tables in the AUX-TOC sector 0.

The pointer P-BLANK is used for management in the form of a linkage of part tables of a free area in the AUX data area, that is, non-recorded regions into which AUX data files can be recorded, similarly to the pointer P-FRA of the U-TOC sector 0.

It is to be noted that a start address and an end address are represented in compacted representations and consequently designation up to a sound group position is allowed. However, in the AUX-TOC sector 0 in the present embodiment, it is prescribed to designate an address in a unit of a cluster, and all 0s are placed at the data position indicating a sound group unit in the sector, start address and end address.

Also the start address and the end address recorded in 3 bytes in the table section or the slot section in the AUX-TOC sectors 1 to 5 described below are represented in compacted representations. Further, the prescription of up to which data unit a start address or an end address designates is different among different sector contents, and such prescriptions are hereinafter described suitably.

Where the AUX-TOC is formed on a reproduction only disc, no part table uses link information.

1-6-5-2. AUX-TOC Sector 1

The AUX-TOC sectors 1 to 3 are used for management of picture files as still picture information.

The AUX-TOC sector 1 shown in FIG. 23 is a management sector as a picture allocation table and is used for management of data files recorded as picture files in the AUX data area.

With the AUX-TOC sector 1, management of picture files is performed in a manner similar to that with the U- TOC sector 0.

In the present embodiment, the file length of a picture file of one still picture recorded in the AUX data area is not prescribed specifically. In the present embodiment, however, 100 picture files in the maximum including a cover picture can be managed as hereinafter described. Accordingly, also the number of substantially recordable picture files is 100.

The cover picture may be, for example, a picture file which is a disc jacket or the like.

In the AUX-TOC sector 1, a sector address (Sector)= "01h" and mode information (MODE)="02h" are recorded in the header.

As pointers P-PNO(x) to be used for management of 99 picture files other than the cover picture, pointers P-PNO1 to P-PNO99 are formed in the AUX-TOC sector 1. At individual byte positions in the pointers from the pointer P-PNO99 to the pointer immediately prior to the table section, "00h" is recorded.

However, in order to enable to cope with a case wherein recording of a greater number of picture files is made possible by an expansion of an AUX data area or a change of the file size in the future, it is possible to set, as the pointers P-PNO(x), the pointers P-PNO100 to P-PNO255 to byte positions from the byte position following the pointers P-PNO1 to P-PNO99 to the byte position of the pointer P-PNO255 indicated in blankets in FIG. 23.

Further, the region of 2 bytes following the maker code and the model code is used for the pointers First PNO and Last PNO. In the pointer First PNO, the number x of the first one P-PNO(x) of used ones of the pointers P-PNO1 to P-PNO99 is recorded, and the number x of the last one P-PNO(x) of used ones of the pointers P-PNO1 to P-PNO99 is recorded in the pointer Last PNO. For example, if it is assumed that, from among the pointers P-PNO1 to P-PNO99, the pointers P-PNO1 to P-PNO5 are used, then the pointer First PNO="01h" and the pointer Last PNO= "05h" are recorded.

In the pointer section, also the pointers P-PFRA and P-EMPTY are formed.

Further, in the table section, 99 part tables "01h" to "63h" in each of which a start address, an end address and a picture mode (S. Pict. mode) are recorded are formed as part tables of 8 bytes corresponding to the individual pointers. Also in this instance, similarly to the AUX-TOC sector 0, the remaining part tables "64h" to "FFh" are not used with all 0s (zeros) placed therein.

The part table "00h" is prevented from being designated by any pointer, and is used exclusively for address management of a picture file determined as a cover picture. The picture mode (S. Pict. mode) mentioned above is provided also in the part table "00h" for a cover picture.

The pointers P-PNO1 to P-PNO99 are used for management of regions, in each of which one picture file is recorded, by designating a particular part table. For example, in a part table designated by the pointer P-PNO1, a start address, an end address and a picture mode (S. Pict. mode) of a picture file of image data for a first picture are recorded.

It is to be noted that, with the AUX-TOC sector 1, file management which is performed by linking part tables with link information (Link-P) is not performed. In other words, one picture file is not recorded in sections physically spaced from each other.

However, non-used part tables in the AUX-TOC sector 1 are managed in the form of a link beginning with the pointer P-EMPTY.

The pointer P-PFRA in the AUX-TOC sector 1 is a pointer to be used for management of a free area where picture data whose amount is smaller than 1 cluster are recorded in a region of 1 cluster in the AUX data area and the region in the 1 cluster in which picture data are not recorded is a recordable region and hence a free area. In short, an address of a section as a free area is recorded in a part table designated by the pointer P-PFRA.

The picture mode (S. Pict. mode) in each part table in the AUX-TOC sector 1 represents mode information including a copy status of a picture file recorded in an address designated by each part table.

The picture mode (S. Pict. mode) is defined, for example, in such a manner as illustrated in FIG. 30A.

The picture mode is composed of 8 bits d1 to d8, and a copy status is indicated by the 2 bits of d1 and d2. The copy status is information set regarding whether or not copying of a corresponding picture file is permitted.

In this instance, if the copy status is "0h", then this represents that copying is permitted, and the picture file can be copied any number of times.

If the copy status is "1h", then this represents that copying of the picture file is permitted only once.

If the copy status is "2h", this represents that copying of the picture file is permitted only once over an authenticated data bus. Conversely speaking, copying over a data bus which is not authenticated is not permitted.

If the copy status is "3h", then this represents that copying of the picture file is inhibited.

The remaining 6 bits d3 to d8 are undefined here.

If copying of data is performed for a certain picture file, then the copy status to be given to the picture file after copying is updated in such a manner as illustrated in FIG. 30B from contents of the copy status which has been given to the picture file before copying.

In particular, if the copy status of a certain picture file is "0h", before copying, then the copy status "0h" is given to the picture file also after copying. In other words, copying of the picture file is permitted any number of times. on the other hand, if the copy status is "1h" or "2h" before copying, then the copy status is changed to "3h" after copying so that later copying of the picture file is inhibited.

1-6-5-3. AUX-TOC Sector 2

FIG. 24 shows the format of the AUX-TOC sector 2. The AUX-TOC sector 2 is used as a picture information table and as a data region into which, where information (which is hereinafter referred to as picture information) is added to each picture file recorded, the information as the picture information is recorded as character information. Here, the picture information in the present embodiment may include a picture name, a recording date/time and a URL (Uniform Resource Locator) of the Internet.

Here, before the AUX-TOC sector 2 is described, a structure of a picture information file recorded in the table section of the AUX-TOC sector 2 is described with reference to FIG. 31. The picture information file here includes information of picture information corresponding to one picture file.

Figure 31:
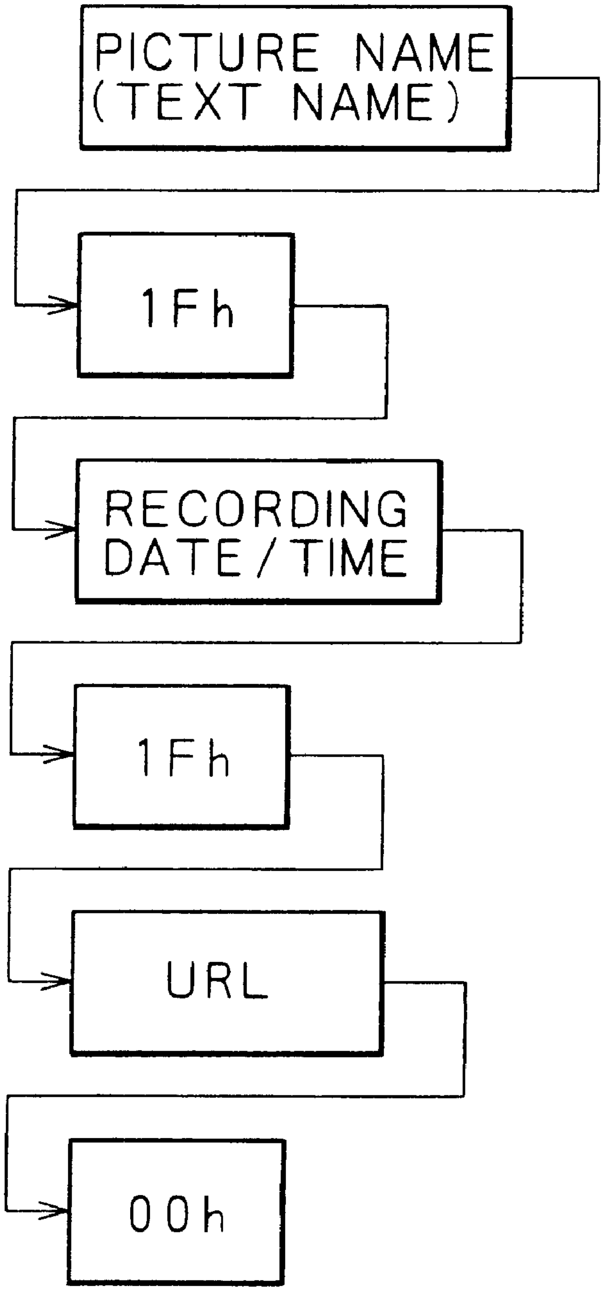
FIG. 31 is a diagrammatic view showing a data structure of a picture information file or a text information file.

As seen from FIG. 31, the picture information file has a data unit as a picture name disposed at the top thereof in the form of ASCII codes or some other character codes. The picture name is recorded in accordance with the format of character information recorded in a slot of the U-TOC sector 4 shown in FIG. 21.

Next to the data unit as a picture name, "1Fh" indicating a delimiting point between data units is disposed, and a data unit for the recording date/time is disposed next to "1Fh". The recording date/time is recorded in accordance with the format of the recording date/time recorded in a slot of the U-TOC sector 2 shown in FIG. 20 using 6 bytes as described above.

Next to the data unit of the recording date/time, "1Fh" mentioned above is disposed, and character information as a URL is disposed next to this "1Fh". The URL may be recorded as an ASCII code from the MSB (Most Significant Bit) without depending upon a character code (character.code) which will be hereinafter described. Then, "00h" is disposed at the last end of the file.

It is to be noted that, where one of the data units of the picture name, recording date/time and URL has no substantive contents, "00h" can be recorded in place of the data unit.

In regard to the URL described above, for example, where the picture file is obtained by downloading it from a home page of the Internet, the URL of the home page is applied as the URL to the picture file.

Referring back to FIG. 24, the AUX-TOC sector 2 is described.

First, in the header of the AUX-DOC sector 2, a sector address (Sector)="02h" and mode information (MODE)="02h" are recorded.

Further, in the AUX-TOC sector 2, pointers P-PIF1 to P-PIF99 are prepared in the pointer section so as to correspond to individual picture files recorded on the disc. Further, in the slot section, 256 slots "01h" to "FFh" of 8 bytes which can be designated by the pointers P-PIF1 to P-PIF99 and one slot "00h" of 8 bytes are prepared. However, the pointers P-PIF can be expanded up to P-PIF255.

In a region of 2 bytes following the maker code and the model code, pointers First PIF and Last PIF are recorded. The pointer First PIF has recorded therein the number of the first one P-PIF of used ones of the pointers P-PIF1 to P-PIF99. The pointer Last PIF has recorded therein the number of the last one P-PIF of the used ones of the pointers P-PIF1 to P-PIF99.

In the slots "00h" to "FFh", character information as picture information files is recorded in the form of ASCII codes or some other character codes. The type of characters recorded is defined by a character code (described as chara-.code in FIG. 24) recorded at a predetermined byte position on the AUX-TOC sector 2.

The character code is defined such that, for example, "00h" designates the ASCII code; "01h" designates the modified ISO (International Organization for Standardization) 8859-1 code; "02h" designates the music shifted JIS (Japan Industrial Standard) code; "03h" designates the KS C 5601-1989 code (Korean language); and "04h" designates the GB 2312-80 code (Chinese language).

The pointers P-PIF1 to P-PIF99 designate particular part tables in which picture information files of file numbers corresponding to the numbers of the individual pointers are recorded. For example, in a slot designated by the pointer P-PIF1, characters corresponding to a picture of a first picture file are recorded. It is to be noted that the slot "00h" of 8 bytes is used as an exclusive area for starting of recording of a picture information file corresponding to the cover picture and is prevented from being designated by the pointer P-PIF(x).

The slots are linked with link information so that a picture information file corresponding to one picture file may be recorded even if the size thereof is greater than 7 bytes.

The pointer P-EMPTY is used for management of non-used slots in the form of a link.

It is to be noted that different AUX-TOC sectors may be set for the picture name, recording date/time and URL such that they may be managed individually. However, where various character information applied to picture files is managed collectively with the AUX-TOC sector 2 as a picture information file as seen in FIGS. 24 and 31, the recording region of the disc is utilized effectively. This is because the amount of data (number of TOC sectors) required for management information is smaller than that where different AUX-TOC sectors are provided for the picture name, recording date/time and URL to manage them.

1-6-5-4. AUX-TOC Sector 3

The AUX-TOC sector 3 shown in FIG. 25 is used as a picture playback sequence table in which management information for outputting a picture file in synchronism with reproduction of a program such as a tune is stored.

In the header of the AUX-TOC sector 3, a sector address (Sector)="03h" and mode information (MODE)="02h" are recorded.

Further, as the pointer section corresponding to recorded picture files, pointers P-TNP1 to P-TNP99 are prepared. It should be noted that the pointers P-TNP can be expanded up to P-TNP255. The pointers P-TNP1 to P-TNP99 correspond to track numbers of audio data recorded in a unit of a track in the program area. In short, the pointers P-TNP1 to P-TNP99 correspond to the first to 99th tracks.

In the table section, 99 part tables "01h" to "63h" of 8 bytes designated by the pointers P-TNP1 to P-TNP99 and one part table "00h" of 8 bytes are prepared. Also in this instance, all 0s are recorded in the remaining part tables "64h" to "FFh" which are not used. In the pointers First TNP and Last TNP following the maker code and the model code, the number of the first one P-TNP of used ones of the pointers P-TNP1 to P-TNP99 and the number of the last one P-TNP of the used ones of the pointers P-TNP1 to P-TNP99 are recorded, respectively.

In each of the part tables designated by the pointers P-TNP1 to P-TNP99, a start address and an end address are recorded in the form of offset addresses from the address of the top position of the track. With the AUX-TOC sector 3, an address up to a unit of a sound group is designated.

In the 4th byte of each part table, a particular picture file is indicated as a pointer P-PNOj. The pointer P-PNOj has a value corresponding to a corresponding one of picture files (P-PNO1 to P-PNO99) managed with the AUX-TOC sector 1. Further, another part table can be linked with link information. In other words, it is possible to define a plurality of picture files so that they can be displayed on a same track.

For example, when reproduction of a tune of a first track is performed, if it is intended to output a picture of the first picture file at a particular timing during the reproduction, then a start address and an end address of a picture outputting period are recorded into a part table designated by the pointer P-TNP1 corresponding to the first track, and as a picture to be outputted, a particular picture file is indicated with the pointer P-PNOj. Here, a case wherein it is desired to display or output a picture of the first picture file for a period until one minute and 30 seconds pass after a point of time after one minute passes after reproduction of the first track is begun is considered. In this instance, an address point which corresponds to just one minute after the beginning of reproduction of the first track and another address which corresponds to one minute and 30 seconds are recorded as a start address and an end address in the form of offset addresses, respectively, into a part table designated with the pointer P-TNP1. Then, the pointer P-PNOj is set to the value of P-PNO1 so that it may designate the first picture file.

Where it is desired to switchably display a plurality of pictures during reproduction of one track, part tables are linked to manage the picture files to be outputted and the outputting periods.

It is to be noted that, while the part table "00h" corresponds to the cover picture, since it is prescribed that, in principle, the cover picture be not outputted in synchronism with an audio track, all 0s are recorded as the start address and the end address of the part table "00h".

By the way, if the start address and the end address of a part table corresponding to a certain track are both all 0s, then a picture of a picture file indicated by the designated pointer P-PNOj is displayed within a period within which sound of the track is outputted.

If only the end address is all 0s, then a picture file designated with the pointer P-PNOj is outputted until a start address of a picture file to be displayed subsequently is reached within a period of reproduction of the track.

If both of the start address and the end address are different from all 0s and have an equal value, then displaying and outputting of the picture file are inhibited.

Also with the AUX-TOC sector 5, non-used part tables are managed using a link from the pointer P-EMPTY.

1-6-5-5. AUX-TOC Sector 4

The AUX-TOC sectors 4 and 5 are used for management of text files.

First, the AUX-TOC sector 4 shown in FIG. 26 is a management sector as a text allocation table and is used for management of data files recorded as text files in the AUX data area.

With the AUX-TOC sector 4, management of text files is performed in a similar manner to that with the U-TOC sector 0.

If it is assumed that the AUX data area is used entirely for recording of text files, then text data for 38 clusters (×32 sectors×2,324 bytes) can be recorded there. Such text data can be managed as 255 files in the maximum with the AUX-TOC sector 4. However, it is assumed here that up to 100 files including one cover text are managed as hereinafter described.

It is to be noted that the file length of one text file is equal to the length of one sector.

One particular text file can be regarded as a text file (cover text) corresponding to the cover picture of the disc.

In the header of the AUX-TOC sector 4, a sector address (Sector)="04h" and mode information (MODE)="02h" are recorded.

As pointers P-TXNO(x) to be used for management of text files, pointers P-TXNO1 to P-TXNO99 are formed in the AUX-TOC sector 6. The pointers P-TXNO1 to P-TXNO99 correspond to the track numbers of the audio tracks. It is to be noted that the pointers P-TXNO can be expanded up to P-TXNO255. Consequently, here, 99 text files corresponding to the first to 99th audio tracks in the maximum can be managed except the cover text.

Also the pointers P-PFRA and P-EMPTY are formed in the pointer section.

Further, as part tables of 8 bytes corresponding to the individual pointers, 99 part tables "01h" to "63h" in each of which a start address, an end address and a text mode are recorded are formed in the table section. The remaining part tables "64h" to "FFh" are not used with all 0s stored therein.

It is to be noted that contents of a definition of the text mode are hereinafter described.

The part table "00h" is prevented from being designated by any pointer. Here, however, the part table "00h" is used exclusively for management of an address of a text file determined as a cover text and the text mode.

The pointers P-TXNO1 to P-TXNO99 are used for management of regions, in each of which one text file is recorded, each by designating a particular part table. For example, in a part table designated with the pointer P-TNXO1, a start address, an end address and a text mode of the first text file are recorded as a file number.

It is to be noted that, since a text file is handled in a unit of a sector as described above, the start address and the end address are each described up to a sector unit, and "0h" is placed in the data position for indicating a sound group.

Further, with the AUX-TOC sector 4, file management which is performed with part tables linked with link information is not performed. In other words, one text file is not recorded in sections physically spaced from each other.

However, non-used part tables in the AUX-TOC sector 4 are managed with link information, which is provided by the 8th byte of each part table, beginning with the pointer P-EMPTY.

In the pointer P-PFRA in the AUX-TOC sector 4, data of a text file whose amount is smaller than 1 cluster are recorded in a region of 1 cluster in the AUX data area. Further, the pointer P-PFRA serves as a pointer for management of a free area where the region in the 1 cluster in which data are not recorded is a recordable region and hence a free area. Also for the free area management, the 8th byte of each part table may be used as link information to allow the part tables to be linked to each other so that a plurality of sections spaced from each other may be managed as a free area.

Here, contents of a definition of the text mode set in each part table of the AUX-TOC sector 4 are described with reference to FIG. 32.

The text mode is a region at the position of the 4th byte in each part table and is formed from 8 bits d1 to d8 (1 byte).

Of the 8 bits d1 to d8, the 2 bits d1 and d2 indicate a copy status. The copy status is similar to the copy status (S. Pict. mode) regarding a picture file described hereinabove with reference to FIG. 30A, and therefore, overlapping description of it is omitted here.

The 2 bits d3 and d4 indicate contents of the text file. In this instance, if the 2 bits d3 and d4 are "0h", then this indicates that the text file is a sung text.

In particular, it is indicated that the text file is a text of the words of a tune of a corresponding audio track. If the bits d3 and d4 are "1h", then this indicates that the text file is a text in which artist information such as the name of the artist who plays the tune in the corresponding audio track is described.

If the bits d3 and d4 are "2h", then this indicates that the text file describes a liner note such as explanation annexed to an album, and if the bits d3 and d4 are "3h", then this indicates that the text file describes some other information.

The 1 bit of d5 indicates presence or absence of a time stamp inserted in the text file. If the bit d5 is '0', then this indicates absence of a time stamp, but if the bit d5 is '1', then this indicates presence of a time stamp. It is to be noted that a time stamp is hereinafter described with reference to FIG. 33.

The 3 bits of d6, d7 and d8 represent a character code. The character code is set such that, for example, "0h", designates the ASCII code; "1h" designates the modified ISO 8859-1 code; "2h" designates the music shifted JIS code; "3h" designates the KS C 5601-1989 code (Korean language); and "4h" designates the GB 2312-80 code (Chinese language). The character code is undefined (reserved) for "5h" and "6h". The character code "7h" designates a plain text. By defining the text file as a plain text file, it is possible to provide expandability to the character code.

1-6-5-6. AUX-TOC Sector 5

FIG. 27 shows a format of the AUX-TOC sector 5. The AUX-TOC sector 5 is used as a text information table and used as a data region into which, when information (hereinafter referred to as text information) of a text name, a recording date/time and a URL of the Internet, is applied to each text file recorded, the information as the text information is recorded as character information.

It is to be noted that a text information file recorded in the table section of the AUX-TOC sector 5 has a structure similar to that of a picture information file described hereinabove with reference to FIG. 31. More particularly, a text information file has a similar structure except that a data unit of a picture name in FIG. 31 is a data unit of a text name.

In the format of the AUX-TOC sector 5 shown in FIG. 27, a sector address (Sector)="05h" and mode information (MODE)="02h" are recorded in the header.

Further, in the AUX-TOC sector 5, pointers P-TXIF1 to P-TXIF99 are prepared in the pointer section in a corresponding relationship to text files recorded. Further, in the slot section, 255 slots "01h" to "FFh" of 8 bits which can be designated by the pointers P-TXIF1 to P-TXIF99 and one slot "00h" of 8 bytes are prepared. It is to be noted that the pointers P-TXIF can be;expanded up to P-TXIF255.

Further, in the pointer First TXIF following the maker code and the model code, the number of the first one P-TXIF of used ones of the pointers P-TXIF1 to P-TXIF99 is recorded, and in the pointer Last TXIF, the number of the last one P-TXIF of the used ones of the pointers P-TXIF1 to P-TXIF99 is recorded.

In the slots "00h" to "FFh" of the table section, character information of text information files is recorded in the form of the ASCII code or some other character code. The type of characters to be recorded is defined by a character code (chara.code) recorded at a predetermined byte position on the AUX-TOC sector 2.

Also in this instance, the character code is set similarly as in the AUX-TOC sector 2 such that, for example, "00h" designates the ASCII code; "01h" designates the modified ISO 8859-1 code; "02h" designates the music shifted JIS code; "03h" designates the KS C 5601-1989 code (Korean language); and "04h" designates the GB 2312-80 code (Chinese language).

The pointers P-TXIF1 to P-TXIF99 designate particular part tables in which text information files of file numbers corresponding to the numbers of the individual pointers are recorded. For example, in a slot designated by the pointer P-TXIF1, characters corresponding to a picture of the first text file are recorded. It is to be noted that the slot "00h" of 8 bytes is used as an area for exclusive use for starting of recording of a cover text information file corresponding to a cover text, and is prevented from being designated with the pointer P-TXIF(x).

The slots described above can be linked with link information so that a text information file corresponding to one text file can be treated even if the text information file has a size greater than 7 bytes.

Further, the pointer P-EMPTY is used for management non-used slots in the form of a link.

Also in this instance, different AUX-TOC sectors may be set for the text name, recording date/time and URL such that they may be managed individually. However, where various character information applied to picture files is managed collectively as text information files with the AUX-TOC sector 5, the number of TOC sectors, that is, the amount of data required for management information is reduced similarly as with an information file.

1-6-6. Data File 1-6-6-1. Picture File Sector

Two kinds of data files including a picture file and a text file which are AUX data files managed with the AUX-TOC sectors formed in such a manner as described above are described below.

As regards a picture file, the file length of one still picture may be an arbitrary one. The image size of a still picture is 640×480 dots, and a picture file is based on the JPEG format baseline. Since management of picture files is performed with the AUX-TOC, a bit stream of a file extends from the SOI (Start Of Image) marker to the EOI (End Of Image) marker prescribed in the JPEG standard.

Further, since the sector format is the mode 2 and the 3rd layer ECC is not used, the effective byte number as an image data capacity of one sector is 2,324 bytes. As an example, if it is assumed that a picture file of the JPEG has a size of 1 cluster (=32 sectors), then the actual data size ranges from 72,045 (=2,324×31+1) bytes to 74,368 (=2,324×32) bytes.

The format of sectors which form such picture files as described above is such as, for example, illustrated in FIG. 28.

Referring to FIG. 28, a header of 16 bytes which includes the synchronization pattern, a cluster address (Cluster H, Cluster L), a sector address (Sector) and mode information (02h) is provided at the top of the format, and the following 8 bytes are undefined (Reserved).

Then, as indicated as data DP0 to DP2323, a region as a data area in which image data of 2,324 bytes are recorded is provided.

In each of the last 4 bytes, "00h" is recorded. Alternatively, however, error detection parities may be recorded in the last 4 bytes.

1-6-6-2. Text File Sector

In a text file, text data of the ASCII, Modified ISO 8859-1, Music Shifted JIS or the like defined by the text mode of the AUX-DOC sector 4 can be recorded.

The format of a sector which forms a text file is such as, for example, shown in FIG. 29. Referring to FIG. 29, similarly as in a picture file, a header (16 bytes) and an undefined (Reserved) region (8 bytes) are provided from the top of the text file. Following them, a data area is provided in which data as text files of 2,324 bytes are recorded as indicated as data DT0 to DT2323.

In each of the last 4 bytes, "00h" is provided. Alternatively, however, error detection parities may be recorded in the last 4 bytes.

Figure 33:
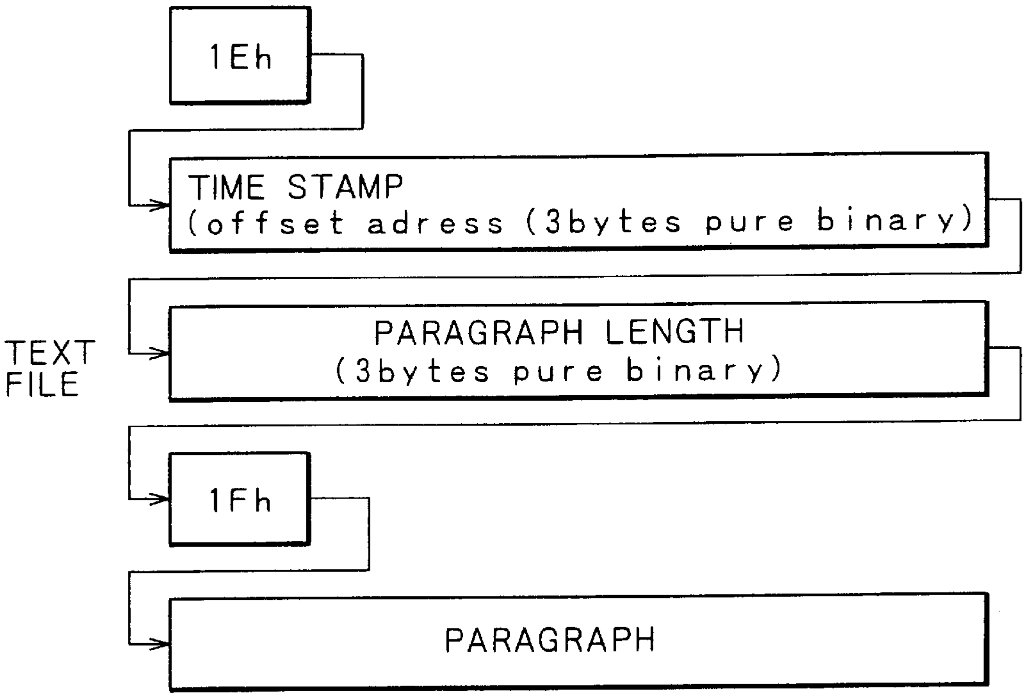
FIG. 33 is a diagrammatic view showing a data structure of a text file.

A data structure of a text file recorded in a text file sector is shown in FIG. 33. It is to be noted, however, that the text file shown has a data structure corresponding to a case wherein presence of a time stamp (d5='1') is set as the text mode of the AUX-TOC sector As seen from FIG. 33, in the text file, "1Eh" which indicates a delimiting point of each text file. is disposed, and following this, a data unit (3 bytes pure binary) indicating a time stamp is disposed.

The time stamp defines a displaying or outputting timing of a text file synchronized with reproduction of a corresponding audio track and is indicated by an offset address of the corresponding audio track.

Following the data unit indicating a time stamp, a data unit (3 bytes pure binary) of a paragraph length indicative of a data length of a data unit of a paragraph is disposed. Further, following data of "1Fh", a data unit of a paragraph (substantive character information) is disposed.

1-7. Personal Computer

Now, an internal construction of the personal computer 113 in the AV system of the present embodiment is described with reference to FIG. 34.

Figure 34:
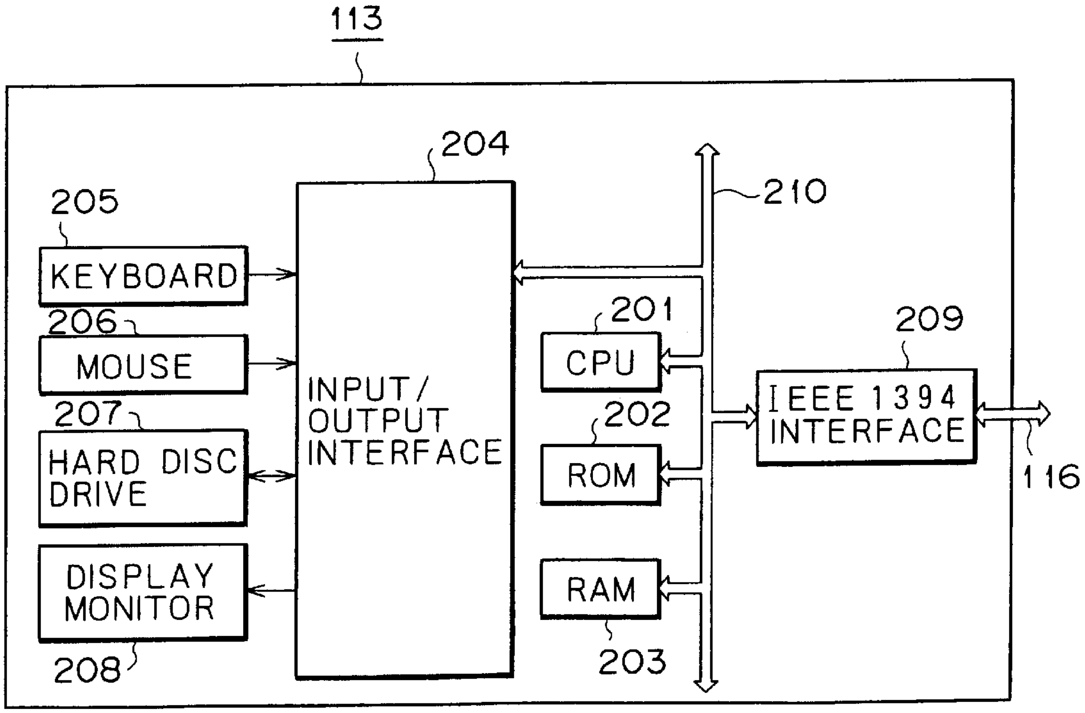
FIG. 34 is a block diagram showing a detailed construction of a personal computer to which the present invention is applied.

The personal computer 113 shown in FIG. 34 includes an IEEE 1394 interface 209 as an interface for communicating data with the outside. The IEEE 1394 interface 209 is connected to the IEEE 1394 bus 116 as an external data bus so that it allows mutual communication with an external apparatus.

The IEEE 1394 interface 209 demodulates a packet received over the IEEE 1394 bus 116, extracts data included in the demodulated packet, converts the extracted data into data of a data format adapted for internal data communication, and outputs the resulting data to a CPU 201 over an internal bus 210.

Further, the IEEE 1394 interface 209 receives data outputted under the control of the CPU 201, performs modulation processing in accordance with the IEEE 1394 format such as packetization for the received data and outputs and transmits resulting data over the IEEE 1394 bus 116 to the outside.

The CPU 201 executes various processes in accordance with a program stored, for example, in a ROM 202. In the present embodiment, in order to allow transmission/reception of various data to be performed in accordance with the IEEE 1394 standard, also a program for controlling the IEEE 1394 interface 209 is stored in the ROM 202. In other words, the personal computer 113 includes hardware and software for allowing data transmission/reception in accordance with the IEEE 1394.

Meanwhile, data, programs and so forth necessary for the CPU 201 to execute various processes are stored in a RAM 203.

A keyboard 205 and a mouse 206 are connected to an input/output interface 204 such that operation signals supplied therefrom may be outputted to the CPU 201. Further, a hard disc drive 207 including a hard disc as a storage medium is connected to the input/output interface 204. The CPU 201 can record or read out data, a program or the like onto and from the hard disc of the hard disc drive 207. Also a display monitor 208 for displaying an image thereon is connected to the input/output interface 204.

The internal bus 210 is formed from, for example, a PCI (Peripheral Component Interconnect) bus, a local bus or a like bus and interconnects various internal functioning circuit sections of the personal computer 113.

It is to be noted that the IEEE 1394 interface function of each of the IRD 112 and the MD recorder/player 1 described above has a basically substantially similar construction to that of the personal computer 113 described above.

In particular, in the IRD 112 shown in FIG. 11, a program for allowing the IEEE 1394 interface 60 to be controlled by the CPU 80 is stored in a ROM not shown in FIG. 11, but in the MD recorder/player 1, a program for allowing the IEEE 1394 interface 25 to be controlled by the system controller 11 is stored in the program ROM 28.

It is to be noted that the example of construction of the system wherein the components are interconnected by an IEEE 1394 bus line as applied to the present embodiment is not limited to the form described hereinabove but is a mere example at all.

2. Data Transmission by IEEE 1394 in the Embodiment 2-1. Outline

In the following, data transmission in accordance with the IEEE 1394 standard in the present embodiment is described.

Data transmission systems according to the IEEE 1394 are divided into an Isochronous communication system wherein communication is performed periodically and an Asynchronous communication system wherein communication is performed asynchronously irrespective of a period. Generally, the Isochronous communication system is used for transmission/reception of data while the Asynchronous communication system is used for transmission/reception of various control commands. Transmission/reception according to the two kinds of communication systems can be performed using a single cable.

As described hereinabove, the AV system of the present embodiment communicate user data including ATRAC data as audio data and AUX data such as picture files of JPEG still picture data and so forth and text files incidental to the ATRAC data between different apparatus over the IEEE 1394 bus.

Here, the ATRAC data are time series data to be outputted as an audio output in accordance with the reproduction time base, and a real time property is required for the ATRAC data. Further, the ATRAC data is greater in data amount when compared with the AUX data. On the other hand, the amount of the AUX data is not so great as that of the ATRAC data, and although the AUX data are sometimes reproduced in synchronism with reproduction of the audio data, such strict real time property as is required for the ATRAC data is not required for the AUX data.

Therefore, the transmission form by the IEEE 1394 interface in the present embodiment is generally prescribed such that, upon transmission/reception of ATRAC data and AUX data described above over the IEEE 1394 bus, the ATRAC data are transmitted/received in accordance with the Isochronous communication system and the AUX data are transmitted/received by the Asynchronous communication system. In the present embodiment, it is possible not only to transmit ATRAC data and AUX data in opportunities different from each other but also to transmit ATRAC data and AUX data apparently simultaneously by transmitting them in time division in an Isochronous cycle using the IEEE 1394 interface.

Thus, the present embodiment is described below on the assumption of the transmission form according to the IEEE 1394 standard described above.

2-2. Stack Model

Figure 35:
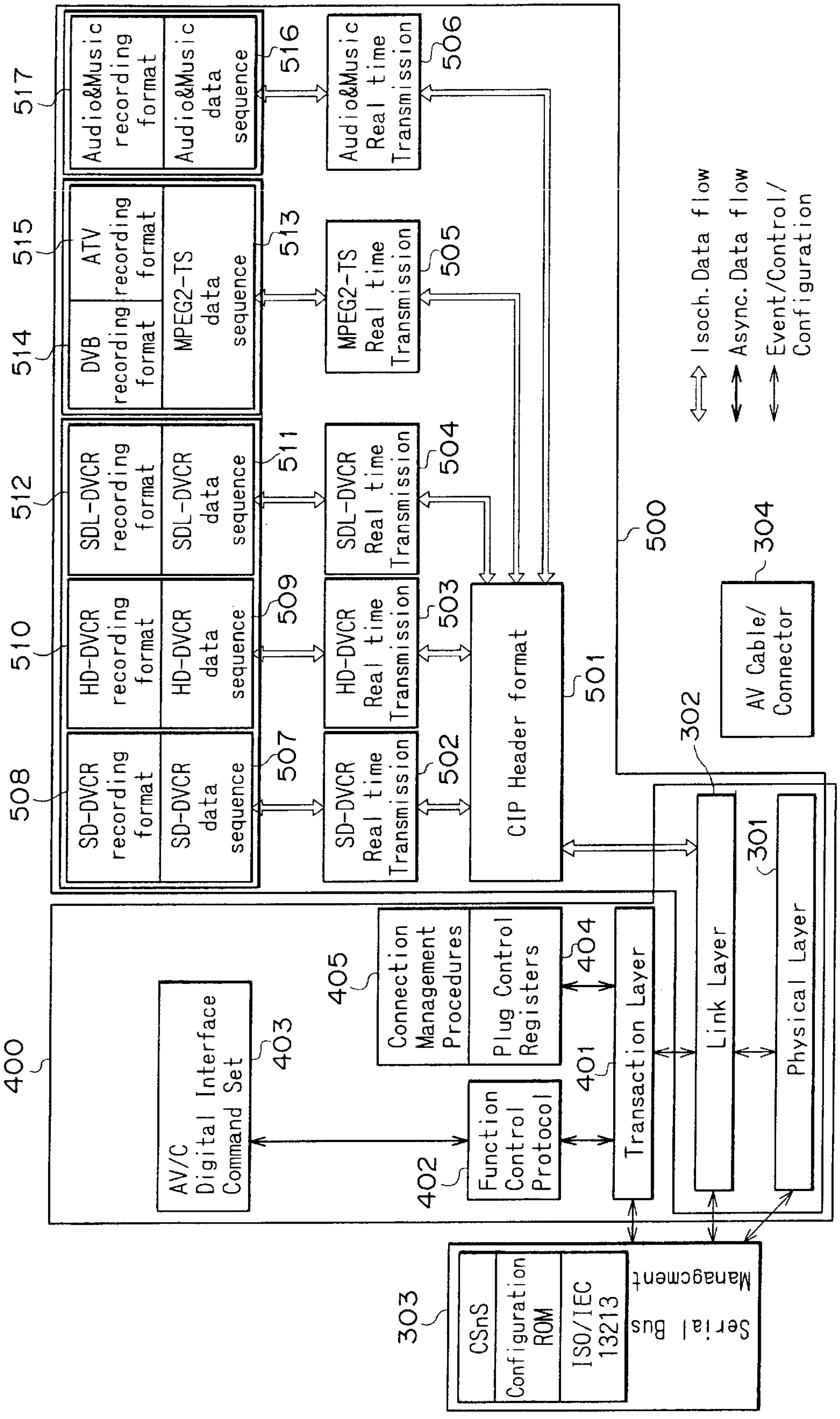
FIG. 35 is a stack model applied to the IEEE 1394.

FIG. 35 shows a stack model of the IEEE 1394 handled by the present embodiment.

In the IEEE 1394 format, the stack model is roughly divided into two systems including an Asynchronous system 400 and an Isochronous system 500.

As layers common to the Asynchronous system 400 and the Isochronous system 500, a Physical Layer 301 is provided on the lowest, and a Link Layer 302 is provided on the Physical Layer 301. The Physical Layer 301 is a layer for controlling hardware signal transmission, and the Link Layer 302 is a layer having a function for converting the IEEE 1394 bus, for example, into an internal bus prescribed for each apparatus.

The Physical Layer 301, the Link Layer 302 and a Transaction Layer 401 which is described below are linked to a Serial Bus Management 303 by a line of Event/Control/Configuration.

An AV Cable/Connector 304 indicates a physical connector and a cable for AV data transmission.

The Transaction Layer 401 is provided as an upper layer on the Link Layer 302 in the Asynchronous system 400. The Transaction Layer 401 is a layer which prescribes a data transmission protocol of the IEEE 1394. As basic Asynchronous Transactions, a Write Transaction, a Read Transaction and a Lock Transaction are prescribed. Details of them are hereinafter described.

An FCP (Function Control Protocol) 402 is prescribed as an upper layer to the Transaction Layer 401. The FCP 402 utilizes control command prescribed as an AV/C Command (AV/C Digital Interface Command Set) 403 so that it can execute command control for various AV apparatus.

As an upper layer to the Transaction Layer 401, Plug Control Registers 404 for setting a Plug indicative of a logical apparatus connection relationship of the IEEE 1394, which is hereinafter described, making use of Connection Management Procedures 405.

A CIP (Common Isochronous Packet) Header Format 501 is prescribed as an upper layer to the Link Layer 302 of the Isochronous system 500, and such transmission protocols as an SD-DVCR (Standard Density-DVCR) Real time Transmission 502, an HD-DVCR (Hi Density-DVCR) Real time Transmission 503, an SDL-DVCR (Standard Density Long-DVCR) Real time Transmission 504, an MPEG2-TS (MPEG2-Transport Strength) Real time Transmission 505 and an Audio and Music Real time Transmission 506 are prescribed in such a form that they are managed by the CIP Header Format 501.

The SD-DVCR Real time Transmission 502, HD-DVCR Real time Transmission 503 and SDL-DVCR Real time Transmission 504 are data transmission protocols for a digital VTR (Video Tape Recorder).

Data handled by the SD-DVCR Real time Transmission 502 are an SD-DVCR data sequence 507 which is a data sequence obtained in accordance with prescriptions of an SD-DVCR recording format 508.

The data handled by the HD-DVCR Real time Transmission 503 are an HD-DVCR data sequence 509 which is a data sequence obtained in accordance with prescriptions of an HD-DVCR recording format 510.

The data handled by the SDL-DVCR Real time Transmission 504 are an SDL-DVCR data sequence 511 which is a data sequence obtained in accordance with. prescriptions of an SDL-DVCR recording format 512.

The MPEG2-TS Real time Transmission 505 is a transmission protocol for a tuner, for example, for digital direct broadcasting and so forth, and the data handled by the MPEG2-TS Real time Transmission 505 is an MPEG2-TS data sequence 513 which is obtained in accordance with prescriptions of a DVB (Digital Video Broadcast) recording format 514 or an ATV recording format 515.

The Audio and Music Real time Transmission 506 is a transmission protocol for general digital audio apparatus including an MD system, for example, of the present embodiment, and the data handled by the Audio and Music Real time Transmission 506 is an Audio and Music data sequence 516 which is obtained in accordance with prescriptions of an Audio and Music recording format 517.

2-3. Signal Transmission Form

Figure 36:
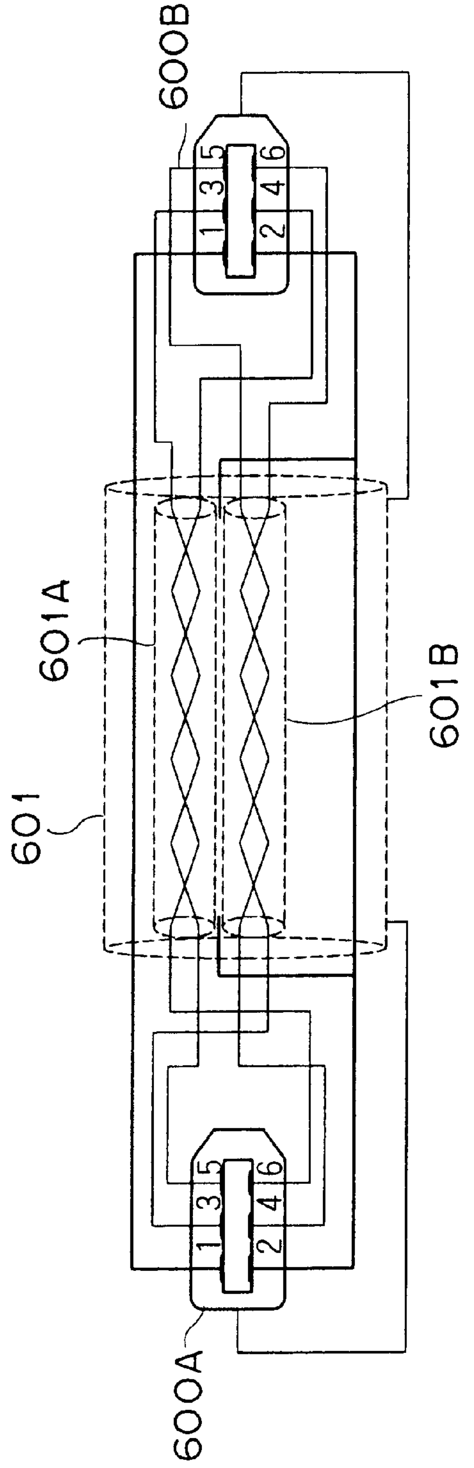
FIG. 36 is a schematic view showing a cable structure of an IEEE 1394 bus.

FIG. 36 shows an example of a structure of a cable used actually as an IEEE 1394 bus.

Referring to FIG. 36, there is shown a structure wherein a pair of connectors 600A and 600B are connected to each other by a cable 601 and 6 pins having pin numbers 1 to 6 are used as pin terminals of the connectors 600A and 600B.

The pin terminals provided on the connectors 600A and 600B are allocated such that the pin number 1 is for the power supply (VP); the pin number 2 is for the ground (VG); the pin number 3 is for TPB1; the pin number 4 is for TPB2; the pin number 5 is for TPA1; and the pin number 6 is for TPA2.

The connection scheme of the pins between the connectors 600A and 600B is:

Pin number 1 (VP)—pin number 1 (VP)

Pin number 2 (VG)—pin number 2 (VG)

Pin number 3 (TPB1)—pin number 5 (TPA1)

Pin number 4 (TPB2)—pin number 6 (TPA2)

Pin number 5 (TPA1)—pin number 3 (TPB1)

Pin number 6 (TPA2)—pin number 4 (TPB2)

From among the pin connection sets above, the two pin connection sets of twisted lines of Pin number 3 (TPB1)—pin number 5 (TPA1)

Pin number 4 (TPB2)—pin number 6 (TPA2) form a signal line 601A for differentially transmitting a signal between the connectors 600A and 600B, and the two pin connection sets of twisted lines of Pin number 5 (TPA1)—pin number 3 (TPB1)

Pin number 6 (TPA2)—pin number 4 (TPB2) form a signal line 601B for differentially transmitting a signal between the connectors 600A and 600B.

Figure 37:
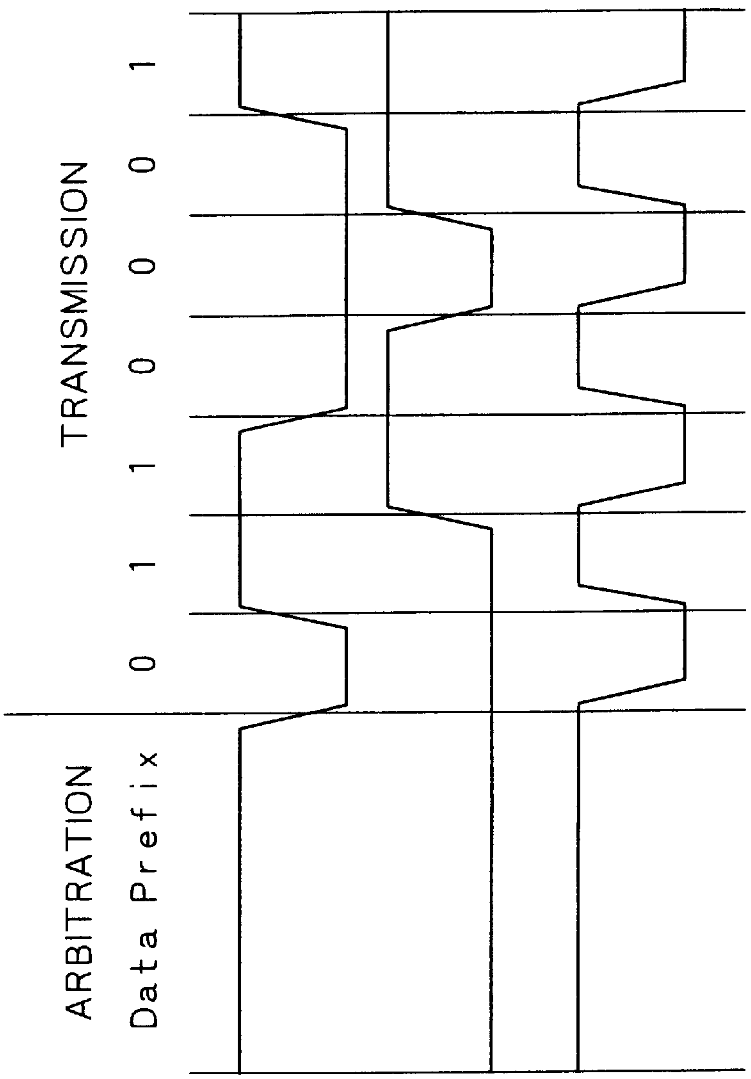
FIG. 37A is a timing chart of a data signal transmitted by the cable shown in FIG. 36.
FIG. 37B is a timing chart of a strobe signal transmitted by the cable shown in FIG. 36.
FIG. 37C is a timing chart of a clock signal transmitted by the cable shown in FIG. 36.

A data signal (Data) illustrated in FIG. 37A and a strobe signal (Strobe) illustrated in FIG. 37B are transmitted over the two signal lines 601A and 601B, respectively.

The data signal illustrated in FIG. 37A is outputted from the pins TPB1 and TPB2 and inputted to the pins TPA1 and TPA2 using one of the signal lines 601A and 601B.

The strobe signal illustrated in FIG. 37B is obtained by performing predetermined logical operation for a data signal and a transmission clock signal synchronized with the data signal and has a frequency lower than an actual transmission clock signal. The strobe signal is outputted from the pins TPA1 and TPA2 to the pins TPB1 and TPB2 using that one of the signal lines 601A and 601B which is not used for transmission of the data signal.

For example, if the data signal and the strobe signal illustrated in FIGS. 37A and 37B are inputted to a certain apparatus which matches with the IEEE 1394, then the apparatus performs predetermined logical operation for the data signal and the strobe signal inputted thereto to produce such a transmission clock signal (Clock) as illustrated in FIG. 37C and utilizes the transmission clock signal for required input data signal processing.

In the IEEE 1394 format, such a hardware data transmission form as described above is adopted to eliminate the necessity for transmission of a transmission clock signal of a high frequency between apparatus by means of a cable to assure a high degree of reliability in signal transmission.

It is to be noted that, while the foregoing description relates to the specification for 6 pins, the IEEE 1394 format allows another specification for 4 pins which eliminates the power supply (VP) and the ground (VG) but includes only the signal lines 601A and 601B as two twisted lines. For example, the MD recorder/player 1 of the present embodiment is constructed taking it into consideration that a simple and easy system to a user can actually be provided by using a cable of the 4-pin specification.

2-4. Bus Connection Between Apparatus

Figure 38:
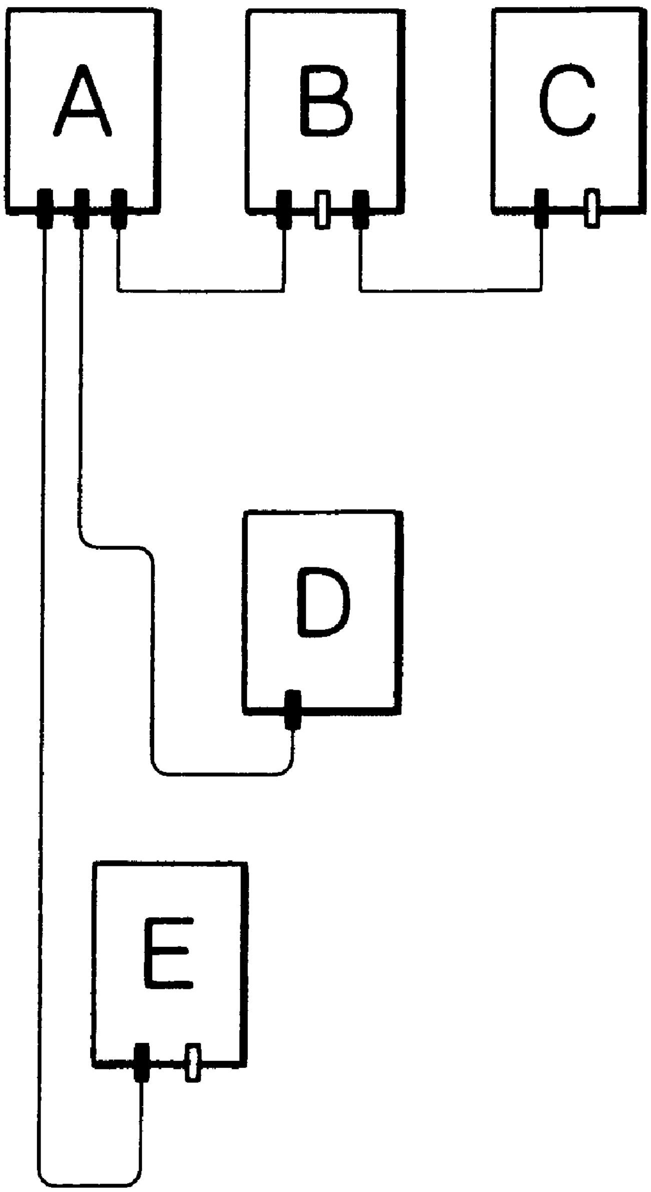
FIG. 38 is a diagrammatic view showing a manner of connection among several apparatus using an IEEE 1394 bus.

FIG. 38 schematically shows an example of a connection among several apparatus by means of the IEEE 1394 bus. In FIG. 38, a system is shown wherein nodes of five apparatus A, B, C, D and E are connected for mutual communication by means of the IEEE 1394 bus.

The IEEE 1394 interface allows so-called "daisy chain connection" wherein apparatus are connected in series like the apparatus A, B and C by means of the IEEE 1394 bus. Further, the IEEE 1394 interface allows a so-called "branch connection" wherein a certain apparatus is connected in parallel to a plurality of apparatus like the connection between the apparatus A and the;apparatus B, D and E in the system shown in FIG. 38.

The IEEE 1394 interface allows connection of 63 apparatus in the maximum in the entire system by making use of the branch connection and the daisy chain connection. However, where only the daisy chain connection is used, connection of up to 16 apparatus in the maximum is allowed. Further, a terminator required by the SCSI is not required by the IEEE 1394 interface.

Further, the IEEE 1394 interface allows mutual communication among apparatus which are connected by the daisy chain connection and/or the branch connection in such a manner as described above. In the system shown in FIG. 38, mutual communication between arbitrary ones of the apparatus A, B, C, D and E is allowed.

In a system wherein a plurality of apparatus are interconnected by means of the IEEE 1394 bus (such a system is hereinafter referred to as IEEE 1394 system), processing for setting a Node ID to be given to each apparatus is performed actually. This processing is schematically illustrated in FIG. 39.

Figure 39:
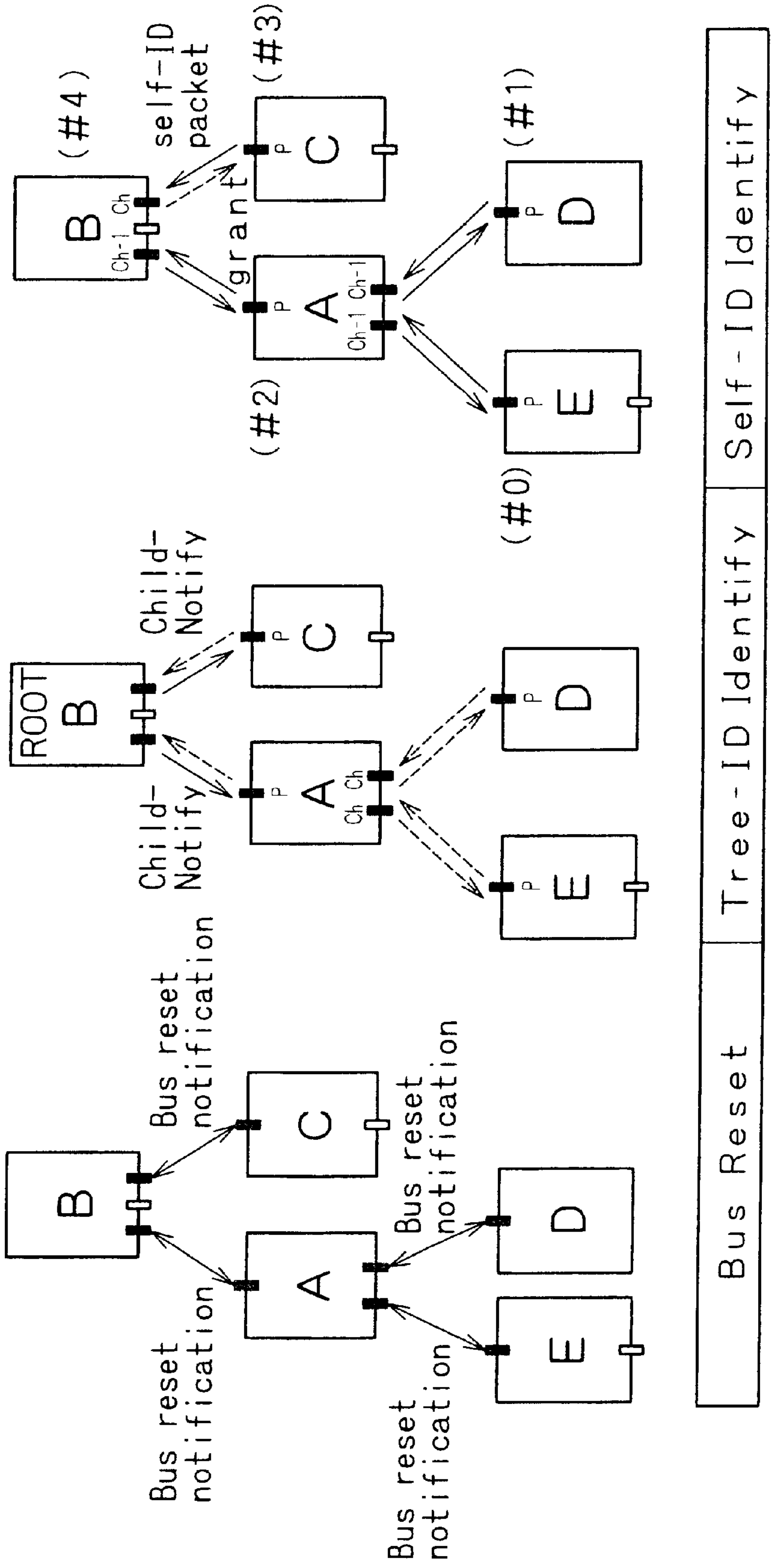
FIG. 39 is a diagrammatic view illustrating a communication condition between different apparatus in an initial state.

If, in an IEEE 1394 system having such a connection scheme as shown in FIG. 39, connection or disconnection of a cable, an on/off operation of the power supply to a certain apparatus in the system, a spontaneous generation process in a PHY (Physical Layer Protocol) or the like occurs, then a bus reset occurs in the IEEE 1394 system. In response to the bus reset, processing for notifying all apparatus of the bus reset is executed over the IEEE 1394 bus among the apparatus A, B, C, D and E.

As a result of the bus reset notification, a parentage is defined between each adjacent apparatus terminals by performing communication (Child-Notify) between them as seen from FIG. 39. In other words, a Tree structure among the apparatus in the IEEE 1394 system is constructed. Then, an apparatus as a root is defined in accordance with a result of the construction of the Tree structure. The root is an apparatus whose terminals are all defined as children (Ch; Child). In the system shown in FIG. 39, the apparatus B is defined as the root. Conversely speaking, for example, a terminal of the apparatus A which is connected to the apparatus B serving as the root is defined as a parent (P; Parent).

After the Tree structure and the root in the IEEE 1394 system are defined in such a manner as described above, each apparatus outputs a Self-ID packet as a declaration of a Node-ID of the apparatus itself shown in FIG. 39. Then, the root successively approves (grants) the Node-IDs to determine the addresses, that is, the Node IDs, of the apparatus in the IEEE 1394 system.

2-5. Packet

Figure 40:
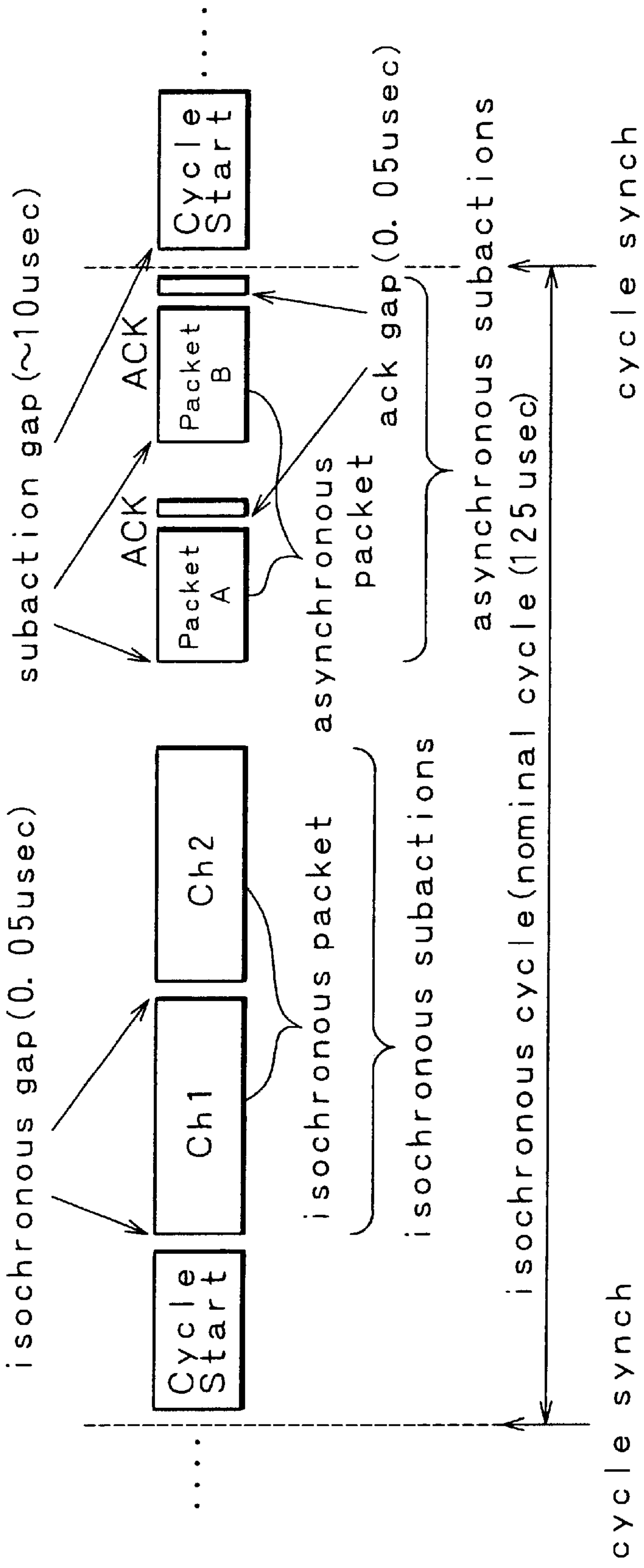
FIG. 40 is a timing chart showing a data structure for a cycle.

According to the IEEE 1394 format, transmission is performed by repeating an Isochronous cycle (nominal cycle) in such a manner as seen in FIG. 40. In this instance, one Isochronous cycle has a time of 125 μsec which corresponds to a frequency band of 100 MHz. It is to be noted that the period of the Isochronous cycle is prescribed such that it may have any other value than 125 μsec. Data are packetized and transmitted for each Isochronous cycle.

As seen from FIG. 40, a Cycle Start Packet indicative of a start of one Isochronous cycle is placed at the top of the Isochronous cycle.

Though detailed description is omitted here, a generation timing of the Cycle Start Packet is indicated by a particular one of the apparatus in the IEEE 1394 system which is defined as Cycle Master.

Next to the Cycle Start Packet, Isochronous Packets are placed preferentially. The Isochronous Packets are produced for the different channels and transferred in a time-division fashion (Isochronous subactions) as seen in FIG. 40. In the Isochronous subactions, a rest period of, for example, 0.05 μsec called Isochronous gap is provided at a breakpoint of each packet.

In this manner, the IEEE 1394 system allows transmission and reception of Isochronous data in multiple channels using a single transmission line.

Where a case wherein the MD recorder/player of the present embodiment transmits applicable ATRAC data (compressed audio data) in accordance with the Isochronous system is considered, if the ATRAC data are transferred at an ordinary transfer rate of 1.4 Mbps, then a time series continuity (real time property) is assured if ATRAC data of at least substantially 20 and several Mbytes are transmitted as Isochronous Packets for each period of one Isochronous cycle of 125 μsec.

For example, when a certain apparatus transmits ATRAC data, although detailed description is omitted here, it requests the IRM (Isochronous Resource Manager) in the IEEE 1394 system for a size of an Isochronous packet with which real time transmission of the ATRAC data can be assured. The IRM supervises the data transmission situation at present and provides permission/nonpermission to the certain apparatus. If permission is given, then the certain apparatus can packetize the ATRAC data into an Isochronous Packet and transmit it using a designated channel. This is called band reservation of the IEEE 1394 interface.

Transmission of Asynchronous subactions, that is, transmission of Asynchronous packets, is performed using a remaining band in the band of the Isochronous cycle which is not used by the Isochronous subactions.

In FIG. 40, an example is shown wherein two Asynchronous Packets including a Packet A and a Packet B are transmitted. The Asynchronous Packets are followed by a signal called ACK (Acknowledge) across a rest period of an ack gap (0.05 μsec). The ACK is a signal outputted from the hardware of the reception side (Target) in order to notify the transmission side (Controller) that some Asynchronous data have been received in a process of an Asynchronous Transaction in such a manner as hereinafter described.

Before and after a data transmission unit which includes an Asynchronous Packet and the ACK following the Asynchronous Packet, a rest period called subaction gap of approximately 10 μsec is provided.

Here, if ATRAC data are transmitted with an Isochronous packet and an AUX data file incidental to the ATRAC data is transmitted with Asynchronous Packet, then the ATRAC data and the AUX data file can be transmitted apparently simultaneously.

2-6. Transaction Rule

A processing transition diagram of FIG. 41A illustrates a basic communication rule (transaction rule) for Asynchronous communication. The transaction rule is prescribed by the FCP.

As seen from FIG. 41A, first in step S11, the Requester (transmission side) transmits a Transaction Request to the Responder (reception side). When the Responder receives the Transaction Request (step S12), it first sends back an Acknowledge to the Requester (step S13). The transmission side receives the Acknowledge and recognizes that the Request has been received by the reception side (step S14).

Thereafter, the Responder transmits a Transaction Response as a response to the Request received formerly in step S12 to the Requester (step S15). The Requester receives the Transaction Response (step S16) and transmits an Acknowledge as a response to the Transaction Response to the Responder (step S17). The Responder receives the Acknowledge and recognizes that the Response has been received by the transmission side (step S18).

The Request Transaction which may be transmitted in FIG. 41A is roughly defined in three types of Write Request, Read Request and Lock Request as given on the left side in FIG. 41B.

The Write Request is a command for requesting for data writing; the Read Request is a command for requesting for reading out of data; and the Lock Request is a command for swap comparison or masking although detailed description is omitted herein.

The Write Request is further defined in three types in accordance with data sizes of an operand which is a command placed in an AV/C Command Packet which is an Asynchronous Packet which will be hereinafter described. The Write Request (data quadlet) is used to transmit a command only based on a header size of an Asynchronous Packet. The Write Request (data block: data length=4 bytes) and the Write Request (data block: data length≠4 bytes) are used to transmit a command with a data block added to a header of an Asynchronous Packet. They are different from each other in terms of whether or not the data size of an operand placed in the data block is equal to or greater than 4 bytes.

Also the Read Request is defined in three types in accordance with the data size of an operand placed in an Asynchronous Packet, that is, the Read Request (data quadlet), the Read Request (data block: data length=4 bytes) and the Read Request (data block: data length≠4 bytes).

A Response Transaction is illustrated on the right side in FIG. 41B.

Corresponding to the three kinds of Write Requests described above, a Write Response and a No Write Response are defined.

Corresponding to the Read Request (data quadlet), a Read Response (data quadlet) is defined; and corresponding to the Read request (data block: data length=4 bytes) or the Read Request (data block: data length ≠4 bytes), a Read Response (data block) is defined.

Corresponding to the Lock Request, a Lock Response is defined.

2-7. Addressing

Figure 42:
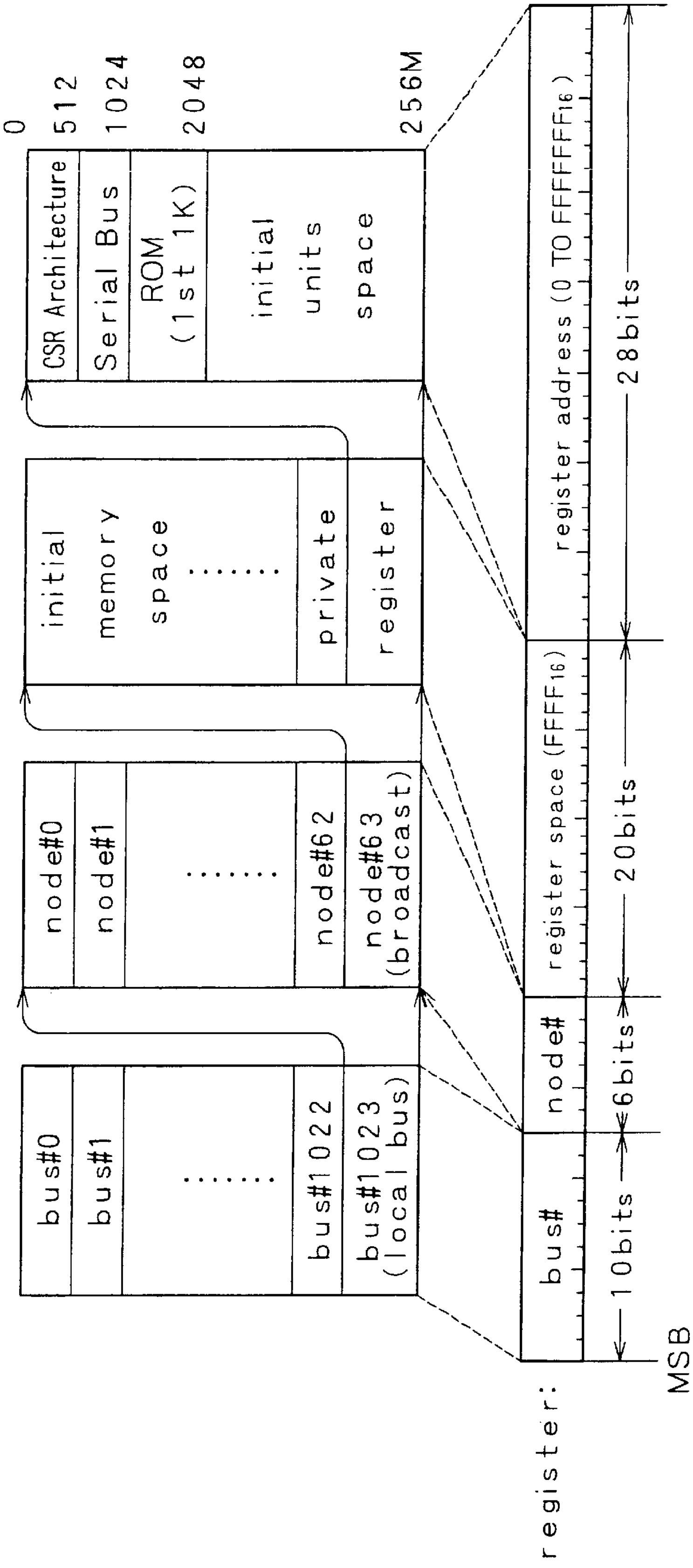
FIG. 42 is a diagrammatic view showing a data structure of a bus address in an IEEE 1394 bus.

FIG. 42 shows an addressing structure of the IEEE 1394 bus.

As seen from FIG. 42, according to the IEEE 1394 format, 64 bits are prepared for a bus address register (address space).

The area of high order 10 bits of the bus address register indicates a bus ID for identification of the IEEE 1394 bus, and allows setting of, as a bus ID, totaling 1,023 bus IDs bus#0 to bus#1022 as seen in FIG. 42. The bus ID bus#1023 is defined as a local bus.

The area of 6 bits following the bus address in FIG. 42 indicates a Node ID of an apparatus connected to each IEEE 1394 bus indicated by the bus ID. As the Node ID, 63 different Node IDs from Node #0 to Node #62 can be identified. The Node ID Node #63 is defined as a broadcast.

The area of totaling 16 bits indicating the bus ID and the Node ID corresponds to a destination ID of the header of an AV/C Command Packet which is hereinafter described, and an apparatus connected to a certain bus is specified on the IEEE 1394 system with the bus ID and the Node ID.

The area of 20 bits following the Node ID in FIG. 42 is a register space, and the area of 28 bits following the register space indicates a register address.

The register space has a value "F FF FFh" and indicates the register shown in FIG. 42, and the contents of the register are defined as seen in FIG. 42. The register address designates the address of the register shown in FIG. 42.

Describing briefly, by referring, for example, to the Serial Bus-dependent Registers beginning with the address 512, that is, "0 00 02 00h", of the register of FIG. 42, information of the cycle time of the Isochronous cycle and a free channel is obtained.

Further, if the contents of the Configuration ROM beginning with the address 1,024, that is, "0 00 04h", are referred to, then also the type of the Node and the Node Unique ID and so forth applied to the type can be identified.

2-8. CIP

FIG. 43 shows a structure of a CIP (Common Isochronous Packet). In particular, a data structure of the Isochronous Packet shown in FIG. 40 is shown.

As described hereinabove, ATRAC data which is one of recording and reproduction data which can be handled by the MD recorder/player of the present embodiment is, in IEEE 1394 communication, transmitted and received by Isochronous communication. In particular, an amount of data with which the real time property is maintained is placed in Isochronous Packets and successively transmitted for each one Isochronous cycle.

The 32 bits (1 quadlet) at the top of the CIP are used as a 1394 packet header.

The area of 16 bits from the top of the 1394 packet header is used for Data_length; the following area of 2 bits is used for tag; the following area of 6 bits is used for channel; the following area of 4 bits is used for tcode; and the following area of 4 bits is used for sy.

The area of one quadlet following the 1394 packet header is used to place header_CRC therein.

The area of 2 quadlets following the header_CRC is used for a CIP header.

The high order 2 bytes of the high order quadlet of the CIP header have '0', '0' placed therein, and the following area of 6 bits indicates an SID (transmission node number). The area of 8 bits following the SID is used for the DBS (data block size) and indicates the size of a data block (a unit data amount upon packetization). Following the DBS, the areas for FN (2 bits) and QPC (3 bits) are set. The FN indicates a number of divisions upon packetization while the QPC indicates a number of quadlets added for such division.

The SPH (1 bit) indicates a flag of the header of a source packet, and the DBC has placed herein a value of a counter for detecting a drop of a packet.

The high order 2 bytes of the low order quadlet of the CIP header have '1', '0' placed therein. Following this, areas for the FMT (6 bits) and the FDF (24 bits) are provided. The FMT indicates a signal format, and a kind of data (data format) stored in the CIP can be identified from the value indicated in the FMT. More particularly, identification among MPEG stream data, Audio stream data, digital video camera (DV) stream data and other data are allowed. Data formats which can be indicated by the FMT correspond to transmission protocols such as, for example, the SD-DVCR Real time Transmission 502, HD-DVCR Real time Transmission 503, SDL-DVCR Real time Transmission 504, MPEG2-TS Real time Transmission 505 and Audio and Music Real time Transmission 506 managed with the CIP Header Format 401 shown in FIG. 35.

The FDF is a format depending field and is an area which indicates a further fine classification of the data format classified with the FMT given above. With regard to audio data, the FDF allows identification of, for example, where it is linear audio data or MIDI data.

For example, with regard to ATRAC data in the present embodiment, the FMT first indicates that it is data which is in the criterion of Audio stream data, and the FDF, in which a particular value in accordance with prescriptions is placed, indicates that the Audio stream data is ATRAC data.

Here, for example, where the FMT indicates the MPEG, synchronous control information called TSF (time shift lag) is placed in the FDF. On the other hand, if the FMT indicates the DVCR (digital video camera), the FDF is defined as indicated at a lower portion of FIG. 43. In particular, from the higher order side, the number of fields for one second is defined by 50/60 (1 bit); it is indicated by the STYPE (5 bits) which one of SD and HD the video format is; and a time stamp for frame synchronization is indicted by the SYT.

Following the CIP header described above, data indicated by the FMT and the FDF are placed in the form of a sequence of n data blocks. Where the FMT and the FDF designate ATRAC data, ATRAC data are stored in the area of the data blocks.

Following the data blocks, data_CRC is disposed at the last.

2-9. Connection Management

In the IEEE 1394 format, a connection relationship between apparatus interconnected by an IEEE 1394 bus is prescribed by a logical connection concept called "plug".

Figure 44:
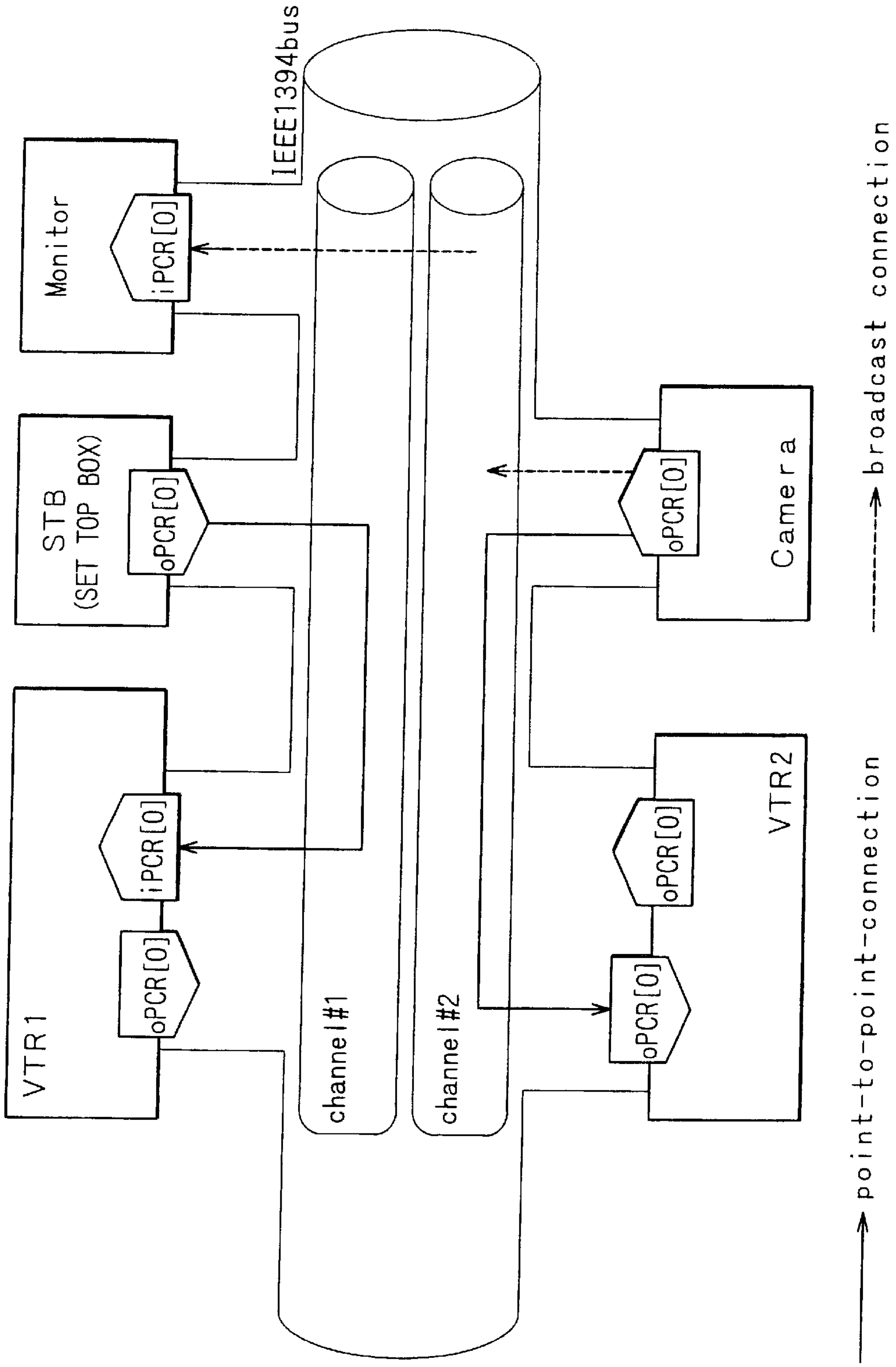
FIG. 44 is a diagrammatic view showing a connection condition prescribed for a plug.

FIG. 44 illustrates an example of a connection relationship prescribed by a plug. More particularly, FIG. 44 shows a system configuration wherein a VTR 1, a VTR 2, a set top box (STB: digital direct broadcasting tuner), a monitor apparatus (Monitor) and a digital still camera (Camera) are interconnected by an IEEE 1394 bus.

Here, as the connection form of the IEEE 1394 by a plug, two forms of point to point-connection and broadcast connection are available.

The point to point-connection is a form of connection wherein a relationship between a transmission apparatus and a reception apparatus is specified and data transmission is performed between the transmission apparatus and the reception apparatus using a particular channel.

In contrast, the broadcast connection is a form of connection wherein a transmission apparatus transmits without specifying a reception apparatus and a used channel. The receiver side receives the transmitted data without specifically identifying the transmission apparatus and performs, if necessary, required processing in accordance with contents of the received data.

FIG. 44 illustrates the point to point-connection in a state wherein the STB is set as a transmission apparatus and the VTR 1 is set as a reception apparatus such that transmission of data is performed using the channel #1 and another state wherein the digital still camera is set as a transmission apparatus and the VTR 2 is set as a reception apparatus such that transmission of data is performed using the channel #2.

FIG. 44 illustrates also a further state wherein the digital still camera is set so as to perform data transmission therefrom over the broadcast connection. Here, a case wherein the monitor apparatus receives data transmitted over the broadcast connection and performs required response processing.

Such a connection form (plug) as described above is established with a PCR (Plug Control Register) provided in an address space in each apparatus.

Figure 45A:
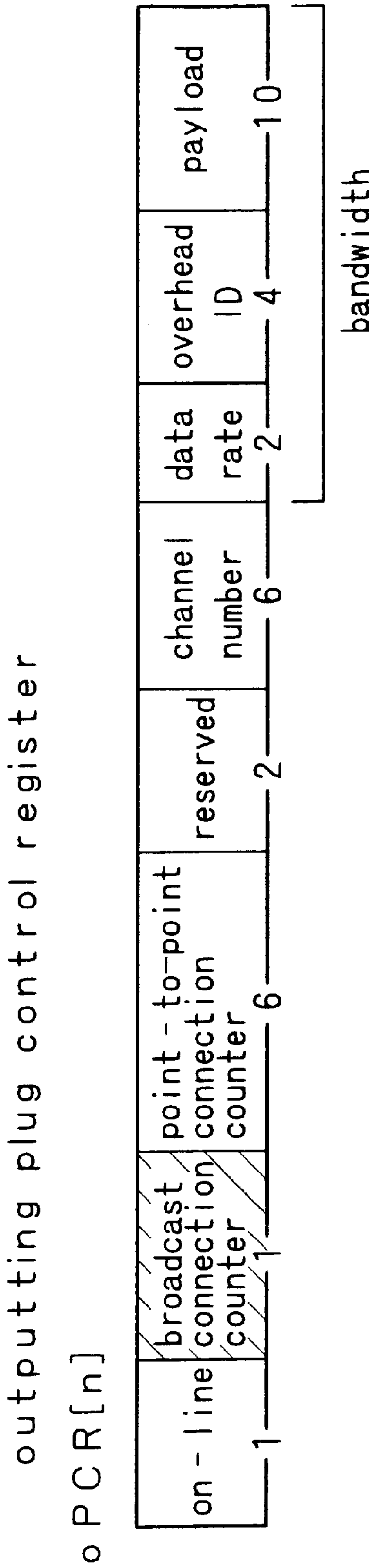
FIG. 45A is a diagrammatic view showing a structure of an outputting plug control register.
Figure 45B:
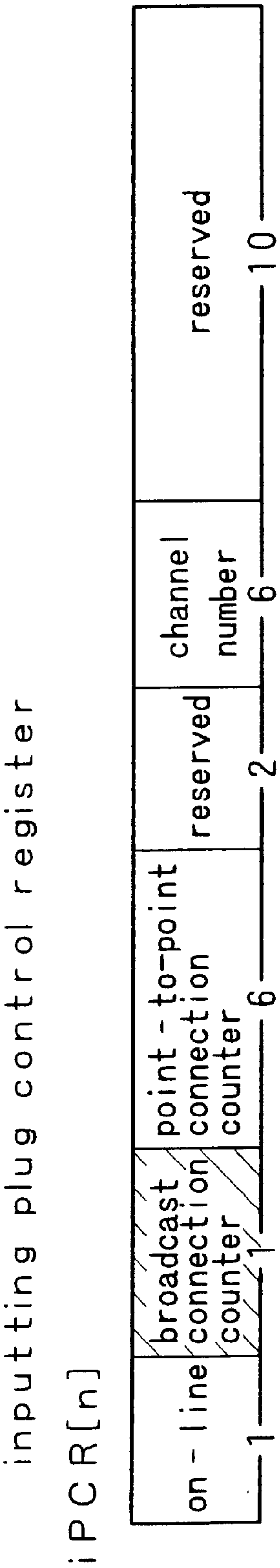
FIG. 45B is a similar view but showing a structure of an inputting plug control register.

FIG. 45A shows a structure of a plug control register oPCR[n] (outputting plug control register), and FIG. 45B shows a structure of another plug control register iPCR[n] (inputting plug control register). The sizes of the plug control registers oPCR[n] and iPCR[n] are both 32 bits.

In the plug control register oPCR of FIG. 45A, for example, where the on-line of the high order 1 bit has '1' placed therein, this indicates transmission over the broadcast connection, but where the on-line has '0' placed therein, this indicates transmission over the point to point connection using a channel indicated by the channel number in the area of 6 bits beginning with the 11th high order bit.

Also in the plug control register iPCR of FIG. 45B, for example, where the on-line of the high order 1 bit has '1' placed therein, this indicates reception over the broadcast connection, but where the on-line has '0' placed therein, this indicates transmission over the point to point connection of data transmitted in a channel indicated by the channel number in the area of 6 bits beginning with the 11th high order bit.

2-10. Command and Response in FCP

According to the IEEE 1394 format in the present embodiment, AUX data in the form of a JPEG picture file and a text file which are recording/reproduction data for the MD recorder/player are communicated by Asynchronous communication.

In the present embodiment, transmission of AUX data by Asynchronous communication is prescribed by the FCP 402 shown in FIG. 35. Here, a transaction defined by the FCP is described.

For the FCP, the Write Transaction illustrated in FIG. 41B prescribed in Asynchronous communication is used. Accordingly, also transmission of AUX data in the present embodiment is performed using the Write Transaction in Asynchronous communication prescribed by the FCP.

An apparatus which supports the FCP includes a Command/Response register and realizes a transaction by writing a Message into the Command/Response register in such a manner as described below with reference to FIG. 46.

Figure 46:
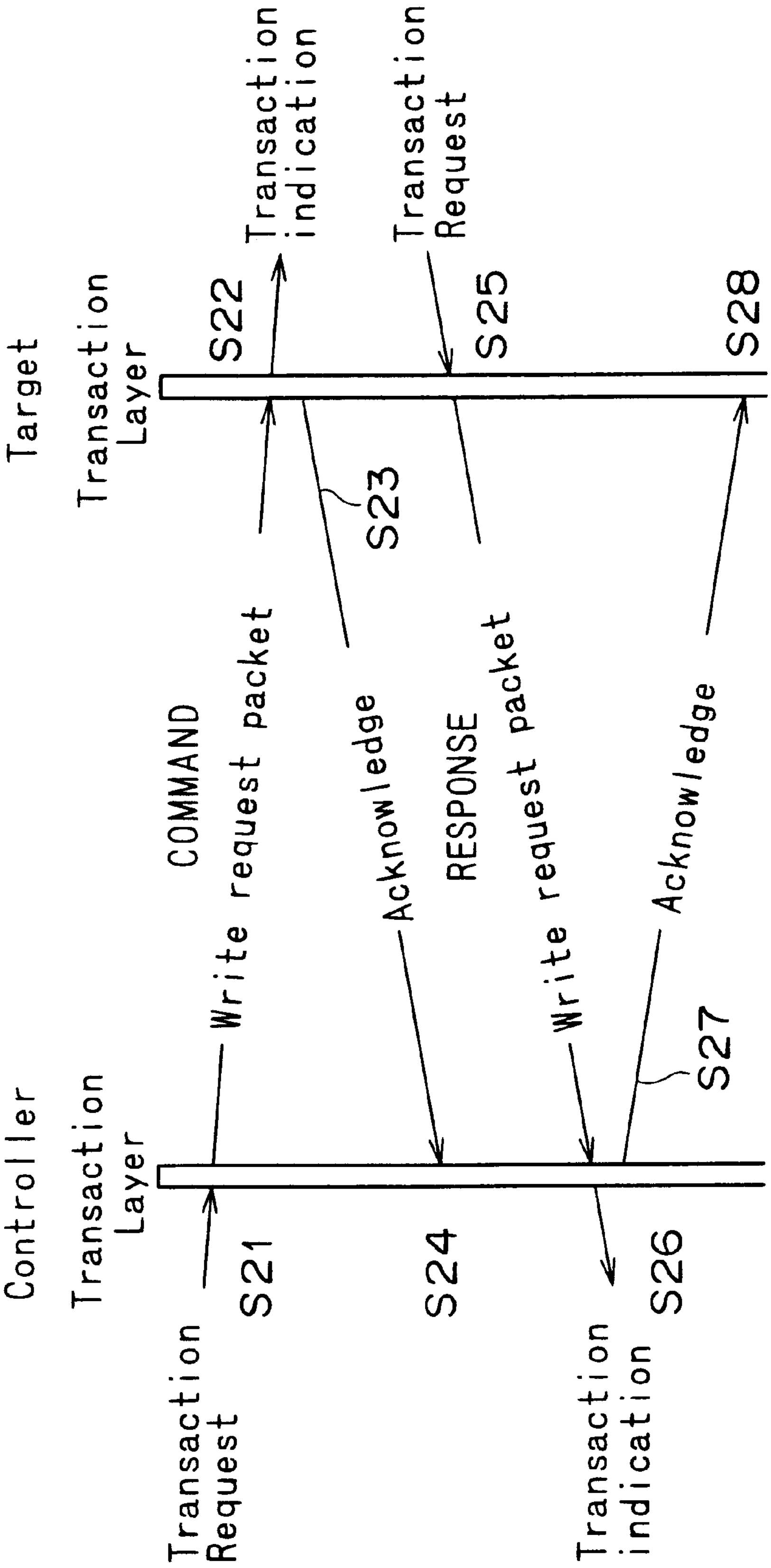
FIG. 46 is a diagram illustrating a processing transition when a message is written into a command/response register.

In a processing transition diagram of FIG. 46, first as processing for COMMAND transmission, the Controller executes processing of generating a Transaction Request and transmitting a Write Request Packet to the Target in step S21. The Target receives the Write Request Packet and performs writing of data into the Command/Response register in step 522. Thereupon, the Target further transmits an Acknowledge to the Controller, and the Controller receives the Acknowledge (steps S23 to S24). The series of processing till now is processing for transmission of the COMMAND.

Thereafter, as processing for a RESPONSE responding to the COMMAND, the Target transmits a Write Request Packet (step S25). The Controller receives this and writes data into the Command/Response register (step S26). Further, the Controller transmits an Acknowledge to the Target in response to the reception of the Write Request Packet (step S27). The Target receives the Acknowledge and thus recognizes that the Write Request Packet has been received by the Controller (step S28).

In short, COMMAND transmission processing from the Controller to the Target and RESONSE transmission processing from the Target to the Controller responding to the COMMAND transmission processing are basic data transmissions (Transactions) by the FCP.

2-11. AV/C Command Packet

As described hereinabove with reference to FIG. 35, the FCP allows communication with various AV apparatus in Asynchronous communication using an AV/C command.

As described hereinabove with reference to FIG. 41A, three kinds of transactions of Write, Read and Lock are prescribed in Asynchronous communication. Actually, Write Request/Response Packets, Read Request/Response Packets and Lock Request/Response Packets in accordance with the transactions are used. The FCP uses the Write Transaction as described hereinabove.

Figure 47:
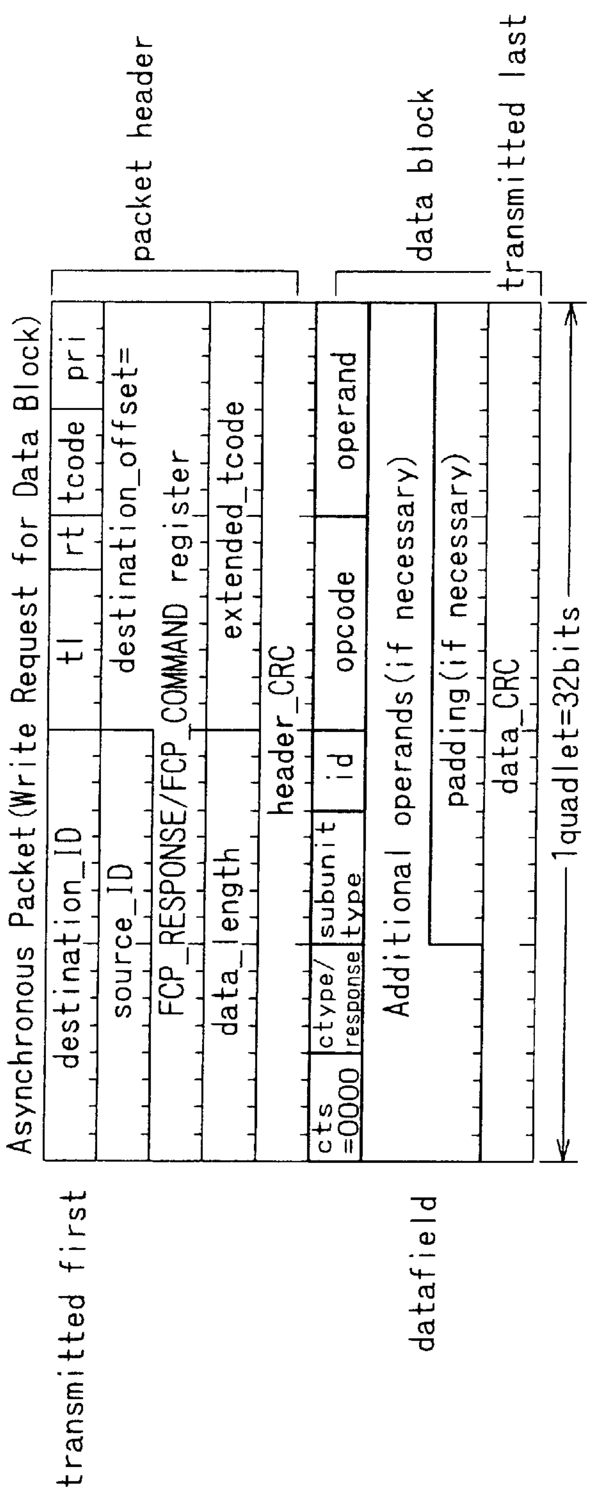
FIG. 47 is a diagrammatic view showing a data structure where a write request packet is used as an AV/C command packet.

FIG. 47 illustrates the format of the Write Request Packet (Asynchronous Packet (Write Request for Data Block))) In the present embodiment, the Write Request Packet is used as an AV/C command packet.

The high order 5 quadlets (1st to 5th quadlets) of the Write Request Packet are used for a packet header.

The area of the high order 16 bits of the 1st quadlet of the packet header is used for the destination_ID and indicates the Node ID of the transfer destination of the data. The following area of 6 bits is used for t1 (transfer label) and indicates a packet number. The following 2 bits are used for rt (retry code) and indicates whether the packet is transmitted for the first time or re-transmitted. The following area of 4 bits is used for tcode (transaction code) and indicates an instruction code. Then, the following area of 4 bits is used for pri (priority) and indicates a priority order number of the packet.

The area of high order 16 bits of the 2nd quadlet is used for source ID and indicates the Node_ID of the source of transfer of data.

The totaling 48 bits including the low order 16 bits of the 2nd quadlet and the entire 3rd quadlet are used for destination_offset and indicates addresses of the COMMAND register (FCP_COMMAND register) and the RESPONSE register (FCP_RESPONSE register).

The destination_ID and the destination_offset correspond to the address space of 64 bits prescribed in the IEEE 1394 format.

The area of the high order 16 bits of the 4th quadlet is used for data_length and indicates the data size of datafield, which is an area surrounded by a thick line in FIG. 47 and is hereinafter described.

The following area of the low order 16 bits is an area for extended_tcode and is used when the tcode is to be expanded.

The area of 32 bits of the 5th quadlet is used for header_CRC and used to store a CRC (Cyclic Redundancy Check) calculation value for a check sum of the Packet header.

A data block is disposed beginning with the 6th quadlet following the Packet header, and the datafield is formed at the top of the data block.

A CTS (Command and Transaction Set) is described in the high order 4 bytes of the 6th quadlet at the top of the datafield. The CTS indicates the ID of the command set of the Write Request Packet. For example, it is defined that, if the value of the CTS is set to "0000" as seen in FIG. 47, then the contents described in the datafield are an AV/C command. In short, the CTS indicates that the Write Request Packet is an AV/C command packet. Accordingly, in the present embodiment, since the FCP uses an AV/C command, "0000" is described in the CTS.

The area of 4 bits following the CTS describes ctype (Command type; functional classification of the command) or a response indicative of a result of processing corresponding to the command.

FIG. 48 illustrates contents of the definition of the ctype and response described above.

For the ctype (Command), "0000" to "0111" can be used, and "0000" is defined as the CONTROL; "0001" as the STATUS; "0010" as the INQUIRY; "0011" as the NOTIFY; and "0100" to "0111" are undefined (reserved) at present.

CONTROL is a command for controlling the function from the outside; STATUS is a command for inquiring for a state from the outside; INQUIRY is a command for inquiring for presence or absence of a support of a control command from the outside; and NOTIFY is a command for requesting for notification of a variation of a state to the outside.

For the response, "1000" to "1111" are used. "1000" is defined as NOT IMPLEMENTED; "1001" as ACCEPTED; "1010" as REJECTED; "1011" as IN TRANSITION; "1100" as IMPLEMENTED/STABLE; "1101" as CHANGED; "1110" as reserved; and "1111" as INTERIM.

Such responses as mentioned above are used distinctly in response to the type of a command. For example, as a response to the command CONTROL, one of the four responses of NOT IMPLEMENTED, ACCEPTED, REJECTED and INTERIM is selectively used in response to a situation of the Responder side and so forth.

Referring back to FIG. 47, in the area of 5 bits following the ctype/response, subunit-type is placed. The subunit-type indicates what apparatus the subunit of the destination of the COMMAND or the transmission source of the RESPONSE is. In the IEEE 1394 format, the apparatus itself is referred to as unit, and the type of a functional apparatus unit provided in the unit is referred to as subunit. For example, where an ordinary VTR is taken as an example, a unit as a VTR includes two subunits including a tuner which receives a ground wave or a direct broadcast and a video cassette recorder/player.

The subunit-type is defined in such a manner as illustrated in FIG. 49A. Referring to FIG. 49A, "00000" is defined as Monitor; "00001" to "00010" are reserved; "00011" is defined as Disc recorder/player; "00100" as VCR; "00101" as Tuner; "00111" as Camera; "01000" to "11110" are reserved; and "11111" is defined as a unit which is not used where no subunit is present.

Referring back again to FIG. 47, in the 3 bits following the subunit-type described above, id (Node_ID) for specifying, where a plurality of subunits of the same type are involved, any one of the subunits is placed.

In the area of 8 bits following the id (Node_ID), opcode is placed, and in the following area of 8 bits, operands are placed.

The opcode signifies the Operation Code, and information (parameters) required by the opcode is placed in the operands. An operand is defined for each subunit and has a table of a list of opcodes unique to the individual subunit. For example, if a subunit is a VCR, then various commands including PLAY (reproduction) and RECORD (recording) are defined for the opcode as seen in FIG. 49B. An operand is defined for each opcode.

Referring back to FIG. 47, for the datafield shown, 32 bits of the 6th quadlet described hereinabove are essentially required. However, if necessary, operands can be added following the 6th quadlet (Additional operands).

Following the datafield, data_CRC is disposed. It is to be noted that, if necessary, a padding can be disposed forwardly of the data_CRC.

2-12. Plug

Here, an outline of the plug in the IEEE 1394 format is described. The plug here signifies a logical connection relationship among apparatus in the IEEE 1394 format as described hereinabove with reference to FIGS. 45A and 45B.

Figure 50:
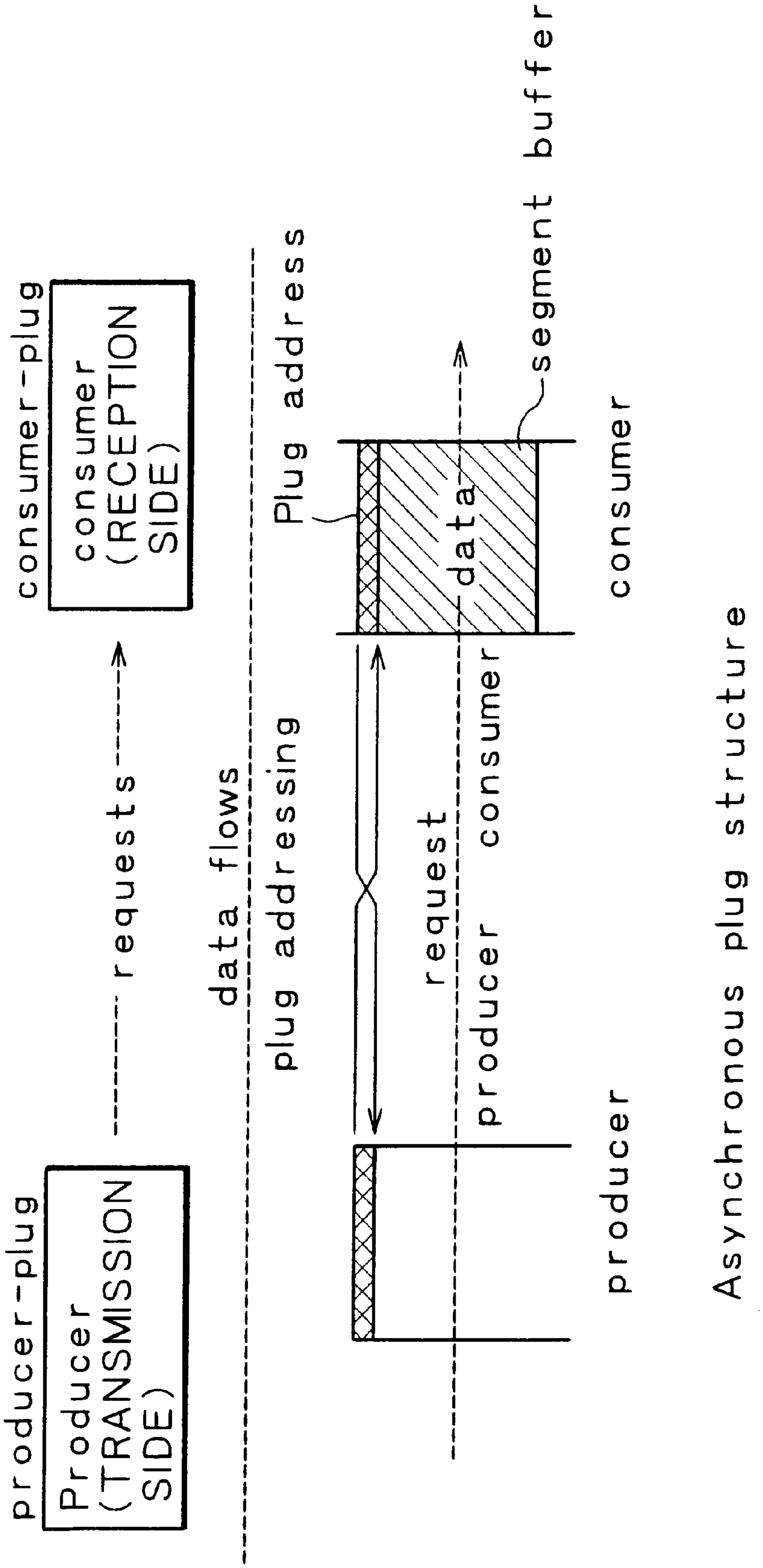
FIG. 50 is a timing chart upon data transfer in asynchronous communication.

As shown in FIG. 50, a request for a command or the like which is valid in Asynchronous communication is transmitted from a producer to a consumer. The producer and the consumer here signify apparatus which function as a transmission apparatus and a reception apparatus on the IEEE 1394 interface, respectively. The consumer includes a segment buffer indicated by slanting lines in FIG. 50, and data are written into the segment buffer from the producer.

In the IEEE 1394 system, information (Connection Management Information) for determining particular apparatus as the producer and the consumer is stored at a predetermined position in a plug address indicated by netted lines. The segment buffer is disposed following the plug address.

The address range of the segment buffer of the consumer into which data can be written is determined by a limit Count register which is managed by the consumer side in such a manner as hereinafter described.

Figures 51A, 51B, 51C:
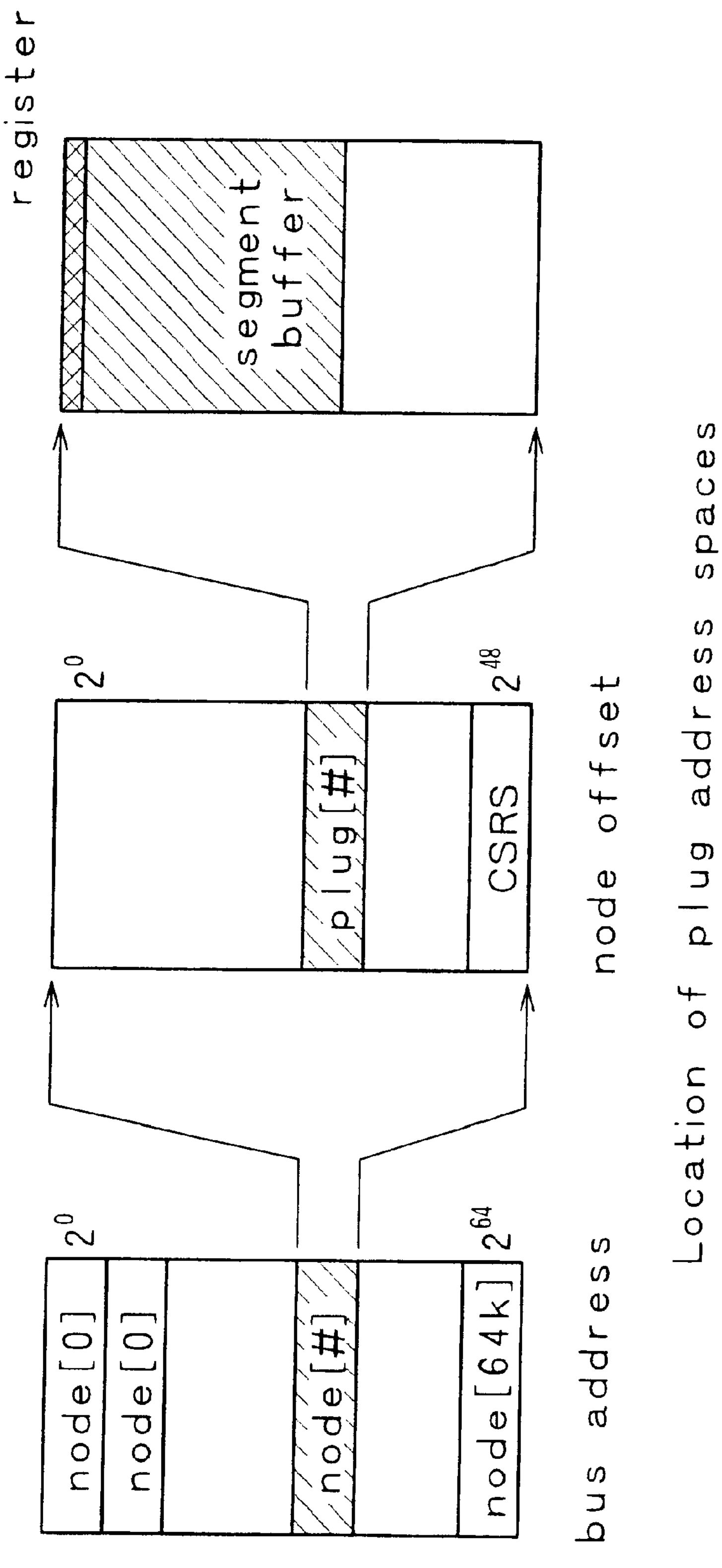
FIG. 51A is a diagrammatic view showing a data structure of a plug address space in asynchronous communication.
FIG. 51B is a diagrammatic view showing a data structure of each node where the plug address space shown in FIG. 51A is divided by nodes.
FIG. 51C is a diagrammatic view showing a data structure of a plug included in the plug address space shown in FIG. 51B.

FIGS. 51A to 51C show a structure of the address space of the plug in Asynchronous communication.

The address space of the plug of 64 bits is divided into $2^{64}$ (64 K) in such a manner as seen in FIG. 51A. Then, a plug is included in the address space of each Node as seen from FIG. 51B. Then, each plug includes a register indicated by a netted area and a segment buffer indicated by a slanting line area in FIG. 51C. Information necessary for communication management of data between the producer and the consumer as represented, for example, by a transmission data size and a receivable data size is stored in such a manner as described below in the register. The segment buffer is an area into which data transmitted from the producer to the consumer are written, and it is prescribed that the segment buffer has a size of, for example, 64 bytes in the minimum.

Figures 52A, 52B, 52C:
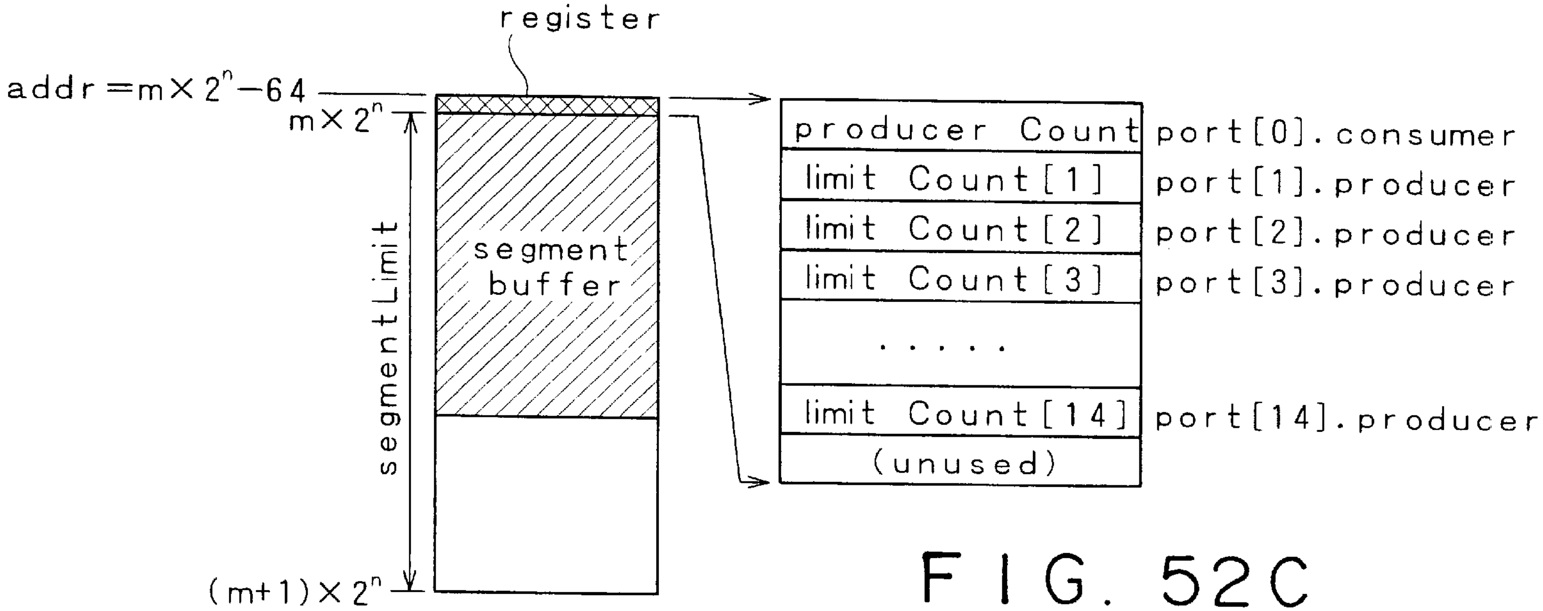
FIG. 52A is a diagrammatic view showing the data structure of the plug shown in FIG. 51B.
FIG. 52B is a diagrammatic view showing a data structure of data recorded in a register at the top of the plug address shown in FIG. 52A.
FIG. 52C is a table illustrating offset addresses used to indicate the plug address shown in FIGS. 52A and 52B.

The plug address is illustrated in FIG. 52A. In other words, the same contents as those of FIG. 51C are illustrated in FIG. 52A.

As seen from FIG. 52A, the register is disposed at the top of the plug address, and the segment buffer is disposed following the register.

Then, an internal structure of the register is shown in FIG. 52B. Referring to FIG. 52B, a producer Count register of, for example, 32 bits is disposed at the top of the register, and following the producer Count register, limit Count registers [1] to [14] of 32 bits are disposed. In other words, one producer Count register and fourteen limit Count registers are provided. It is to be noted that an unused area is provided following the limit Count register [14].

The plug structure shown in FIGS. 52A and 52B is designated with an offset address (Address offset) in such a manner as seen in FIG. 52C.

In particular, the offset address 0 designates a consumer port (producer Count register), and the offset addresses 4, 8, 12, . . . , 56, 60 designate producer ports [1] to [14], respectively. The offset address 60 is defined as reserved and thus indicates an unused area, and the offset address 64 designates the segment buffer.

Figure 53:
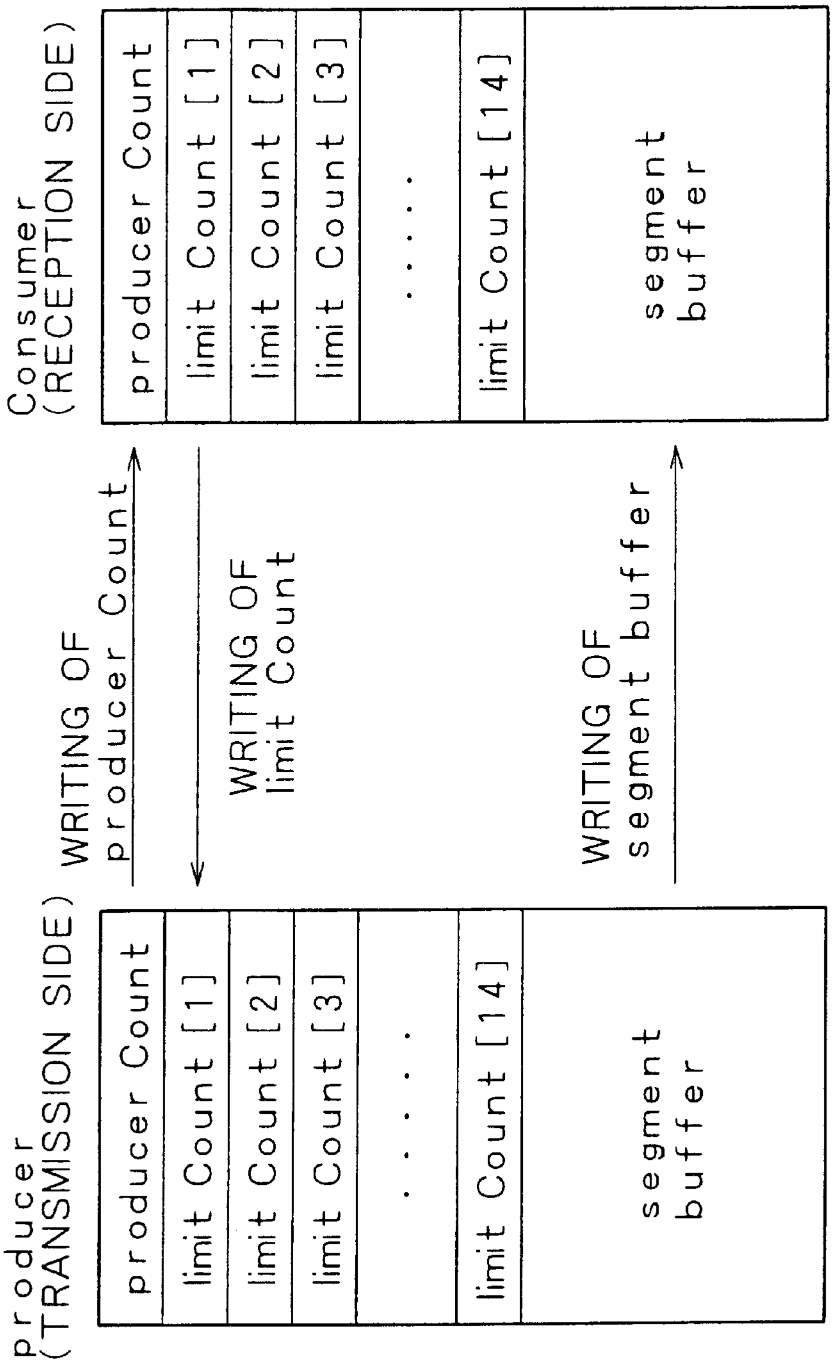
FIG. 53 is a diagrammatic view showing plug structures of plugs on the producer side and the consumer side.

FIG. 53 shows plug structures of both of the producer side and the consumer side.

In the plug structure of Asynchronous communication, writing into the producer Count register, writing into the limit Count register and writing into the segment buffer are performed in accordance with a transmission/reception procedure which is hereinafter described to realize Asynchronous communication. Such writing operations are processing as Write Transactions described hereinabove.

The producer performs writing into the producer Count register of the consumer.

The producer first writes information regarding data transmission of the producer side into the producer Count register at an address of the producer itself and then writes the contents of the producer Count register into the producer Count register of the consumer.

The producer Count register uses information of the size of data written by one writing processing operation as the size of data to be written into the segment buffer of the consumer by the producer. In other words, the producer performs processing of notifying the consumer of a size of data to be written into the segment buffer of the consumer by performing writing into the producer Count register.

In contrast, writing into the limit Count register of the producer is performed by the consumer.

The consumer side writes the capacity of the segment buffer thereof into one of the limit Count registers [1] to [14] thereof designated corresponding to that of the producer and writes the contents of the limit Count register [n] into the limit Count register [n] of the producer.

The producer side determines an amount of data to be written by one writing operation in response to the contents having been written into the limit Count register [n] in such a manner as described above and performs writing, for example, into the segment buffer of the producer itself. Then, the contents written in the segment buffer are written into the consumer. This writing into the segment buffer corresponds to data transmission in Asynchronous communication.

2-13. Asynchronous Connection Transmission Procedure

Subsequently, a basic transmission/reception procedure of an Asynchronous connection is described with reference to a processing transition diagram of FIG. 54 on the assumption of the structure between the plugs (producer-consumer) described above with reference to FIG.

Figure 54:
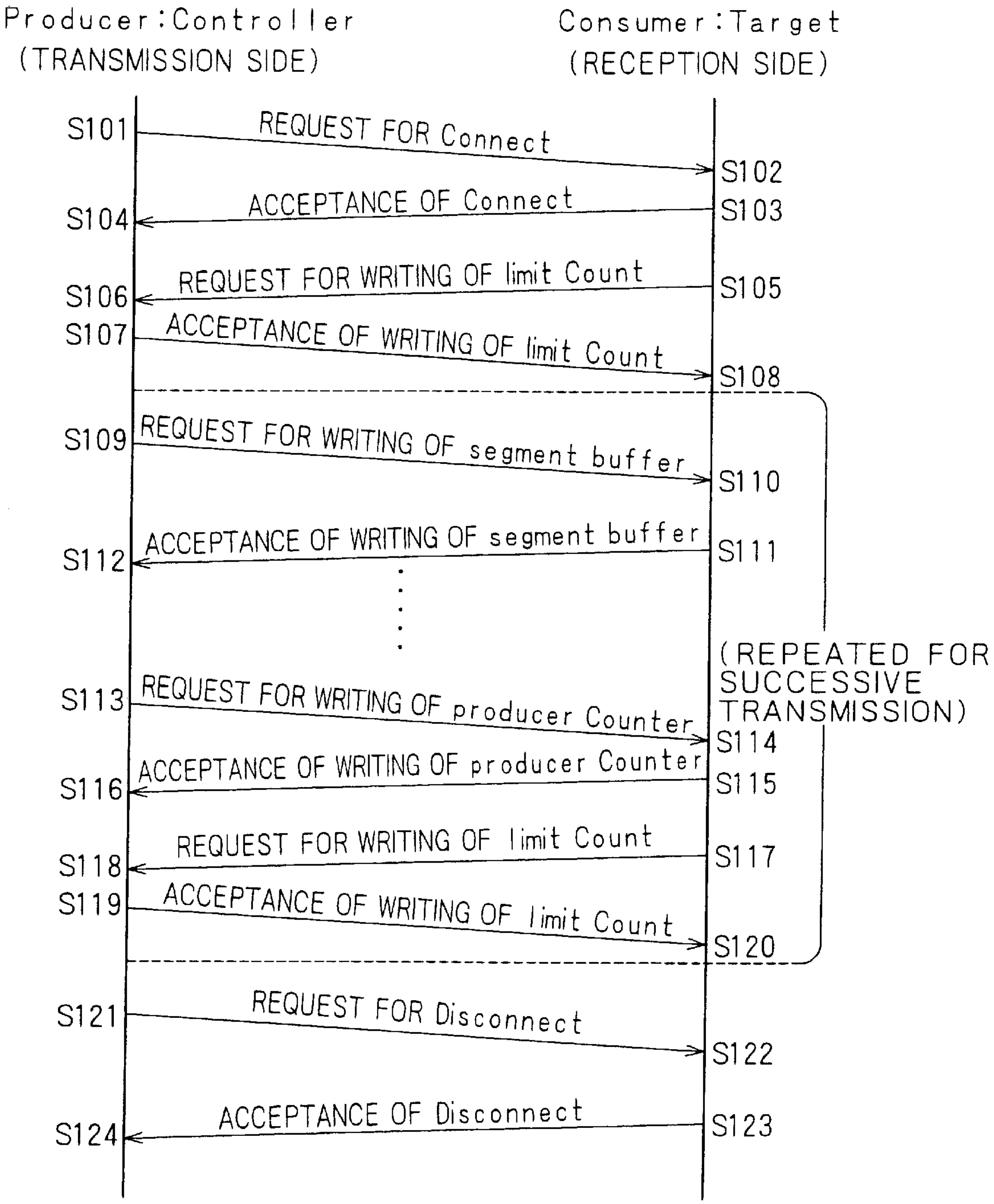
FIG. 54 is a timing chart illustrating a transmission-reception procedure in Asynchronous communication.

The procedure of transmission/reception processing illustrated in FIG. 54 is executed using an AV/C command (Write Request Packet) in environment prescribed by the FCP as Asynchronous communication. Also AUX data handled in the present embodiment are transmitted and received in the IEEE 1394 system using the transmission/reception procedure. However, the processing illustrated in FIG. 53 indicates communication operation of the Asynchronous connection at all, and communication processing corresponding to recording and reproduction of AUX data is hereinafter described.

It is to be noted that, although, in an actual Asynchronous connection, transmission/reception of the Acknowledge is executed as described hereinabove with reference to FIG. 46 in response to transmission of a command, such transmission/reception processing of the Acknowledge is omitted in FIG. 54.

Further, the IEEE 1394 interface includes, as a connection relationship between plugs, a relationship prescribed as a controller-target in addition to the relationship of producer-consumer described above. In the IEEE 1394 system, apparatus with which the relationship of producer-consumer is prescribed and apparatus with which the relationship of controller-target is prescribed do not necessarily coincide with each other. In other words, the IEEE 1394 system may possibly include an apparatus prescribed as a producer as well as an apparatus prescribed as an apparatus having a function of a controller. Here, however, a case wherein a relationship of producer-consumer and a relationship of controller-target coincide with each other is described as an example.

In the transmission procedure illustrated in FIG. 54, a Connect request is transmitted from the producer to the consumer in step S101. The Connect request. is a command with which the producer requests the consumer for connection and transmits the address of the register of the producer to the consumer.

The Connect request is received by the consumer in step S102, and the consumer side thus recognizes the address of the register of the producer. Then in step S103, the consumer transmits a Connect acceptance as a response to the producer. Then in step S104, the producer receives the Connect acceptance. Consequently, a connection between the producer and the consumer for later data transmission/reception is established.

After the connection is established in such a manner as described above, the consumer requests the producer for writing into the limit Count register (hereinafter referred to simply as "limit Count") in step S105. The producer receives the write request in step S106 and transmits a limit Count write acceptance to the consumer in step S107. Then, in step S108, the consumer receives the limit Count write acceptance. By the sequence of processes of the limit Count write. request/write acceptance, the segment buffer capacity which is a later data write size into the segment buffer is determined.

Then in step S109, the producer transmits a segment buffer write request to the consumer. Then in step S110, the segment buffer write request is received by the consumer, and in response to the segment buffer write request, the consumer transmits a segment buffer write acceptance to the producer in step S111. The producer receives the segment buffer write acceptance in step S112.

By execution of the processing in steps S109 to S112, one writing processing operation of data from the segment buffer of the producer to the segment buffer of the consumer is completed.

Here, the data to be written by the processing in steps S109 to S112 described above are written through one transmission operation with an Asynchronous Packet described hereinabove with reference to FIG. 40. Accordingly, if the size of the data transmitted with the Asynchronous Packet is smaller than the data size designated by the limit Count described above and necessary data transmission is not completed by the one transmission operation with the Asynchronous Packet, then the processing in steps S109 to S112 is repeated within a range within which the segment buffer is fully occupied.

Then, after the writing processing into the segment buffer in steps S109 to S112 described above is completed, the producer transmits a producer Count register (hereinafter referred to simply as producer Count) write request to the consumer in step S113. The consumer receives the producer Count write request and writes it into the producer Count register thereof in step S114, and then transmits a producer Count write acceptance to the producer in step S115. The producer receives the producer Count write acceptance in step S116.

By the processing just described, the consumer is notified of the data size transferred from the producer to the segment buffer of the consumer by the processing in steps S109 to S112 described above.

Then in step S117, a sequence of processes for writing into the limit Count in response to the producer Count writing processing in steps S113 to S116 described above is executed. In particular, transmission of a limit count write request from the consumer to the producer and transmission of a limit Count write acceptance from the producer to the consumer responsive to the transmission of the limit Count write request are performed in such a manner as in steps S117 to S120.

The processing in steps S109 to S120 provides a set of procedure of the data transmission processing in the Asynchronous Connection. Here, for example, if the size of data to be transmitted is larger than the capacity of the segment buffer and transfer of data cannot be completed by one processing operation in steps S109 to S120, then the processing in steps S109 to S120 can be repetitively executed until the transfer of the data is completed.

After the transfer of the data is completed, the producer transmits a Disconnect request to the consumer in step S121. The consumer receives the Disconnect request in step S122 and transmits a Disconnect acceptance in step S123. Then, in step S124, the producer receives the Disconnect acceptance, thereby completing the data transmission/reception by the Asynchronous Connection.

2-14. Concept of Plug in AUX Data Transmission

Figure 55:
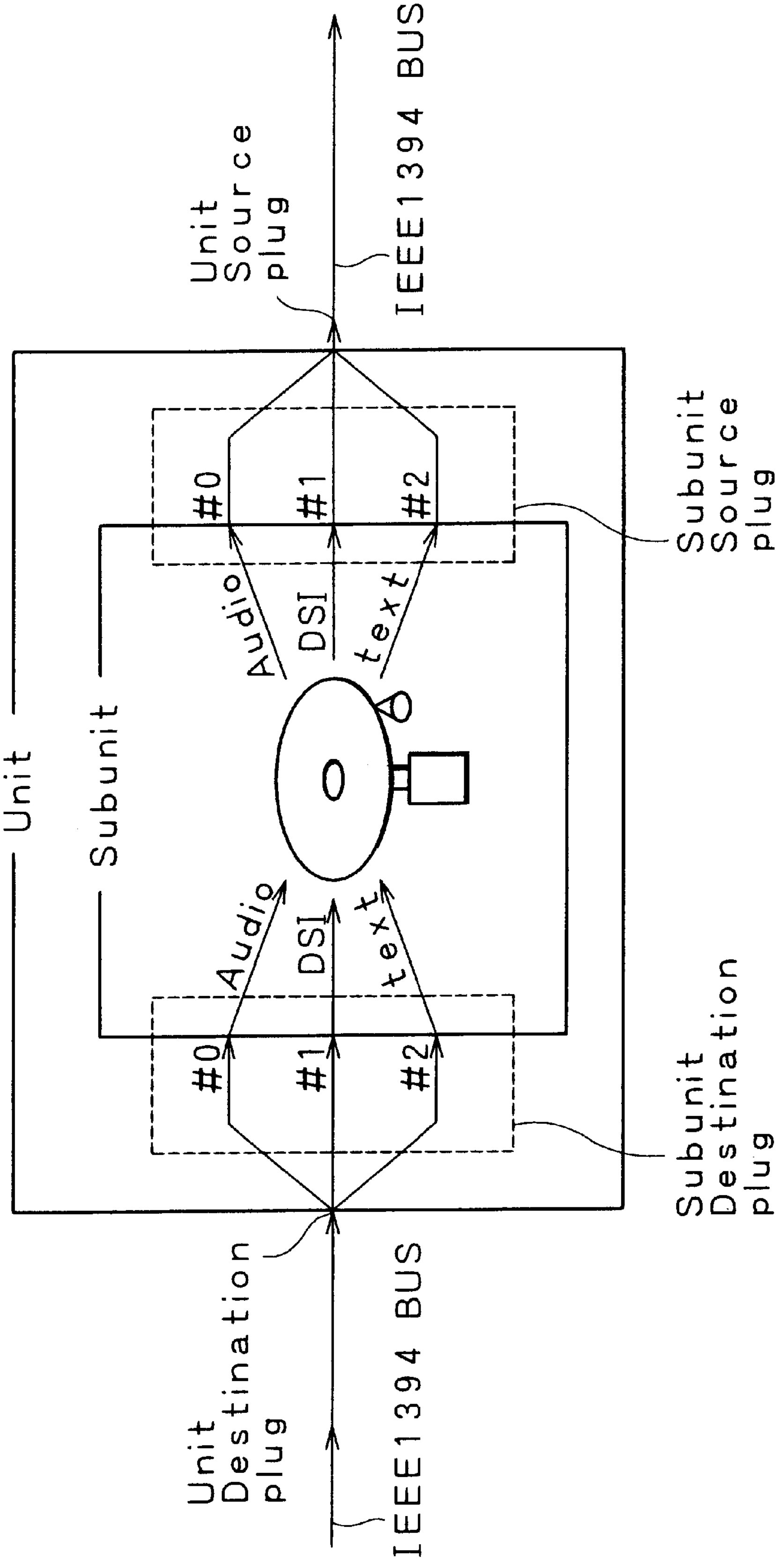
FIG. 55 is a diagrammatic view illustrating a concept of a plug according to the present invention.

FIG. 55 illustrates a concept of a plug upon transmission/reception of ATRAC data and AUX data (a JPEG picture file and a text file) as data to be recorded and reproduced by the MD recorder/player of the present embodiment. It is to be noted that ATRAC data and AUX data (a JPEG picture file and a text file) which are data to be recorded and reproduced by the MD recorder/player of the present embodiment are hereinafter referred to collectively as "MD matching data".

Referring to FIG. 55, the MD recorder/player is shown as a unit. Further, a Disc recorder/player for recording and playing back of a mini disc is shown as a subunit in the unit as the MD recorder/player. The subunit is defined as sub_ unit type by "00011" described hereinabove with reference to FIG. 49.

The plug address to be used to input data to the unit on the IEEE 1394 bus is prescribed as Unit Destination plug. In contrast, the plug address to be used to output data from the unit is prescribed as Unit Source plug. Over the IEEE 1394 interface, MD matching data are inputted and outputted through the Unit Destination plug and the Unit Source plug.

Further, as an input to the subunit, a subunit Destination plug is prescribed under the layer of the Unit Destination plug. In the present embodiment, three subunit Destination plugs including Audio, DSI (Digital Still Image) and text are prescribed for MD matching data. The Audio is a plug for inputting ATRAC data, and the DSI is a plug to be used to input a JPEG picture file. The text is a plug to be used to input a text file.

Similarly, as an output from the subunit, a sub unit Source plug is prescribed under the layer of the Unit Source plug, and three subunit Source plugs including Audio, DSI (Digital Still Image) and text are prescribed for MD matching data. The Audio is a plug for outputting ATRAC data, and the DSI is a plug to be used to output a JPEG picture file. The text is a plug to be used to output a text file.

2-15. Example of Object List

In order to allow MD matching data inputted over the IEEE 1394 bus to be recorded by the MD recorder/player of the present embodiment or to allow data reproduced by the MD recorder/player to be outputted to another apparatus such as, for example, a personal computer or a monitor over the IEEE 1394 bus, it is necessary to construct information to be used for management of MD matching data recorded on a disc loaded in the MD recorder/player so that the MD matching data can be recognized by the IEEE 1394 interface.

As described hereinabove, the MD recorder/player utilizes the U-TOC and the AUX-TOC as information to be used for management of MD matching data. However, information of the U-TOC and the AUX-TOC is information which closes in the system of the MD recorder/player at all, and such information does not directly conform to the IEEE 1394 interface.

Therefore, the MD recorder/player of the present embodiment makes use of information of the U-TOC and the AUX-TOC to produce, for example, such an "object list" as described below as management information for MD matching data conforming to the IEEE 1394 format.

Figures 56A, 56B, 56C, 56D, 56E, 56F:
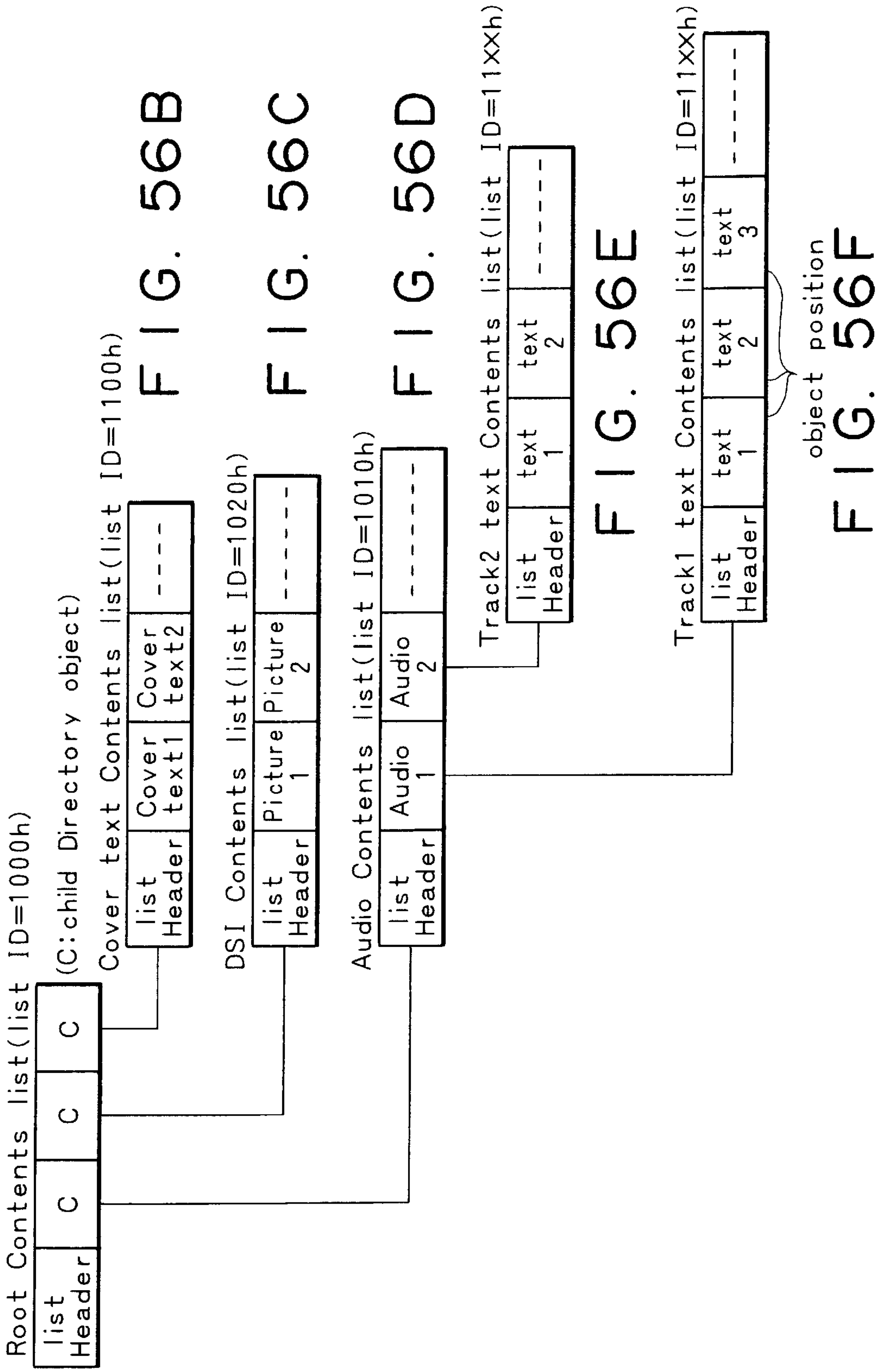
FIG. 56A is a diagrammatic view showing a data structure of a root contents list.
FIG. 56B is a diagrammatic view showing a data structure of a cover contents list indicated by a child directory object in the data structure of the root contents list of FIG. 56A.
FIG. 56C is a diagrammatic view showing a data structure of a DSI contents list indicated by a child directory object in the data structure of the root contents list of FIG. 56A.
FIG. 56D is a diagrammatic view showing a data structure of an audio contents list indicated by a child directory object in the data structure of the root contents list of FIG. 56A.
FIG. 56E is a diagrammatic view showing a data structure of a track 2 text contents list indicated by an Audio 2 in the data structure of the audio contents list of FIG. 56D.
FIG. 56F is a diagrammatic view showing a data structure of a track 1 text contents list indicated by an Audio 1 in the data structure of the audio contents list of FIG. 56D.

The object list is formed, for example, with such a hierarchical structure as illustrated in FIGS. 56A to 56F. First, a Root contents list (list ID="1000"h) is placed in such a manner as seen in FIG. 56A.

It is to be noted that the list ID is represented with 16 bits (2 bytes) and has a value which is different among different lists as hereinafter described. The list ID is used as an operand of a Record object Command and an Object Number Select Command (AV/C command) which are hereinafter described.

In the Root Contents list, a list Header is placed at the top, and following this, a child Directory object is placed. The list ID of a list designated as a child is placed in the child Directory object.

In the present embodiment, it is prescribed that the child Directory object having the list ID="1010"h described therein designates the Audio Contents list; the child Directory object having the list ID="1020"h described therein designates the DSI Contents List; and the child Directory object having the list ID="1100"h described therein designates the Cover text Contents list.

The Audio Contents list includes a list Header and list areas Audio1, Audio2, . . . disposed following the list header and arranged in the order of track numbers of tracks (programs) recorded on the disc. In the list areas Audio1, Audio2, . . . , list IDs of text Contents lists corresponding to the track #1, track #2, . . . are placed. The list IDs of the text Contents lists corresponding to the individual track numbers are prescribed as "11xx"h and set such that the value of "xx"h corresponding to 1 byte of the low order corresponds to a track number.

As seen from FIG. 56F, as such text Contents lists, a Track1 text Contents list (text Contents list corresponding to the track #1) and a Track2 text Contents list (text Contents list corresponding to the track #2) are illustrated.

Each text Contents list has list areas sectioned like text 1, text 2, text 3, . . . The list areas correspond, for example, to the order of reproduction of text files managed so as to be reproduced in synchronism with a track, and each list area has information of the recorded position (address: directory) of the text file placed therein. The recorded position information corresponds to object_position of an operand of the Record object Command and the Object Number Select Command (AV/C commands) which are hereinafter described.

The DSI Contents list shown in FIG. 56C manages picture files recorded on the disc. The DSI Contents list includes a list Header and list areas Picture 1, Picture 2, . . . disposed following the list Header in accordance with the order of file numbers recorded in the disk. Each list area has object_position of the picture file placed therein.

The Cover text Contents list shown in FIG. 56B manages those of text files recorded on the disc which are designated as cover texts. The Cover text Contents list includes a list Header and list areas Cover text 1, Cover text 2, . . . disposed following the list Head in accordance with the order of file numbers recorded on the disc. Each list area has object_position for specification of the text file placed therein.

It is to be noted that such object lists as described above are produced by the system controller 11 of the MD recorder/player 1 in a required opportunity such as, for example, upon loading of a disc or upon starting of data communication in accordance with the IEEE 1394 using a set corresponding to the IEEE 1394.

2-16. Record Object Command

Now, the Record object Command which is an AV/C command packet defined for performing recording of an AUX data file (a JPEG picture file or a text file) on the IEEE 1394 format is described. The Record object Command is used as a recording command which is transmitted from an external apparatus as a controller such as, for example, a personal computer to the MD recorder/player as a target, for example, in order to record an AUX data file by means of the MD recorder/player.

FIG. 57 shows a structure of the Record object Command. Specifically, FIG. 57 shows contents of the opcode and operands picked up from the datafield described hereinabove with reference to FIG. 47.

The Record object Command is prescribed such that, when the opcode (1 byte) of an AV/C command is C"2"h, the AV/C command packet is the Record object Command.

In this instance, the operand1 (1 byte) is defined as subfunction1. The subfunction1 indicates the number of objects to be recorded where one of "01"h to "FE"h is described therein as seen in FIG. 58. Where the subfunction1 is "FF"h, it is defined that there is no designation of an object number.

The operand2 (1 byte) is defined as subfunction2. In this instance, "00"h is described fixedly in the operand2.

The operand3 (1 byte) is an area for a plug type and specifies a plug of a destination of transmission of recording data. The plug type designates the Source plug where it is "00"h, but designates the Destination plug where it is "01"h as seen from FIG. 58. For the Source plug and the Destination plug, refer to FIG. 55.

Since the Record object Command is a recording command, "01"h representing that the plug type is the Destination plug is described in the plug type.

The operand4 (1 byte) is an area for the plug ID and designates a plug on the subunit level of the plug indicated by the plug type of the operand3. Accordingly, in this instance, the subunit Destination plug illustrated in FIG. 55 is designated.

The plug ID is defined such that it represents the DSI where it is "01"h, but represents the text where it is "02"h as seen in FIG. 58. For example, while it is illustrated in FIG.

55 that the subunit Destination plug represents the Audio when it is "00"h, in the present embodiment, since ATRAC data which are Audio data are transmitted by Isochronous communication, "00"h, that is, the Audio, is not used here.

For example, a system apparatus side represented by the MD recorder/player has a database called descriptor, and information of contents of the definition of the plug ID shown in FIG. 58 is placed in the descriptor. Consequently, the system apparatus can discriminate whether data to be transmitted for recording are the DSI or the text by referring to contents of the plug ID of the operand4.

The operand5 (2 bytes) is an area for a new object position number.

The Record object Command is transmitted with "FFFF"h described in the new object position number. Thus, the target places the value of the object position, which is a recorded position on the disc, into the area for the new object position number of the RESPONSE (ACCEPTED) and returns the RESPONSE to the controller.

The operand6 (2 bytes) is an area for the destination list ID. The destination list ID corresponds also to contents of the object list of FIG. 56 and designates a Contents list (that is, a type) in which recording data are to be managed. In particular, as seen from FIG. 58, the destination list ID is defined such that it is "1020"h for the DSI, "11xx"h for the text and "1100"h for the Cover text. It is to be noted that "1010"h representing the Audio is not used also here.

2-17. Object Number Select Command

Subsequently, an Object Number Select Command (ONS Command) which is an AV/C command packet defined for reproducing an AUX data file on the IEEE 1394 format is described. The ONS Command is used as a reproduction command which is transmitted, for example, to the MD player/recorder as a target from an apparatus as a controller in order that an AUX data file may be reproduced by the MD player/recorder.

FIG. 59 shows a structure of the ONS command. Also in FIG. 59, contents of the opcode and operands of the datafield described hereinabove with reference to FIG. 47 are shown.

Where the opcode (1 byte) of an AV/C command packet is "00"h, it is prescribed that the AV/C command packet is the ONS command.

The operand0 (1 byte) is an area which indicates the source plug (subunit Source plug shown in FIG. 56). In particular, the operand0 designates one of Audio (ATRAC data), DSI (a picture file) and a text as MD matching data. Also here, the Source plug is defined such that it designates the DSI when it is "01"h but designates the text when it is "02"h as seen from FIG. 60 ("00"h designating the Audio is not used).

The operandi (1 byte) is defined as subfunction. In the ONS Command, only "D3"h (NEW) is accepted as the operand1.

The operand2 (1 byte) is defined as status and is transmitted with "FF"h described therein. Then, if the target receives this, then the target places "00"h (Selected) into the area of the operand2 (status) and sends back the ONS command to the controller.

The operand3 (1 byte) is an area for the number of ONS selection and indicates the number of contents (objects) to be reproduced by one command.

The operand4 (2 bytes) is an area for the Root_list_ID. In the present embodiment, "1000"h is placed as the list_ID indicative of the Root Contents list of FIG. 56 in the operand4.

The operand5 (1 byte) is defined as selection_indicator.

The selection_indicator designates, when it is "00"h as seen in FIG. 60, that the AV/C command packet is the ONS command which designates a particular file from within the entire object list (refer to FIG. 56) (designation of the entire object).

Where the selection_indicator is "01"h, it indicates that the AV/C command packet is the ONS Command which designates a file directly from within a layer of a child.

The operand6 is defined as target_depth.. Here, "FF"h is placed in the operand6.

The operand7 (2 bytes) represents list_ID. The list_ID corresponds to the list_ID of the Contents list indicated by the child Directory object of the Root Contents list shown in FIG. 56. In short, the value described in the list_ID of the operand7 designates a type of the Contents list in which a file to be designated for reproduction is present.

The list_ID here is defined such that, when it is "1020"h, it designates the DSI; when it is "11xx"h, it designates the text; and when it is "1100"h, it designates a Cover text. The list_ID here corresponds to the list_ID of the Contents list of the object list described hereinabove with reference to FIG. 56 ("1010"h designating the Audio is not used).

The operand8 (2 bytes) is defined as target object_ position, and the value of the object_position of that one of objects (contents) of the Contents list designated by the list_ID of the operand7 described above which is designated as a file to be reproduced is described in the operand8.

As an example, if the ONS command designates, for example, the text1 of the Track1 text Contents list of FIG. 56F in the object list shown in FIGS. 56A to 56F as a file to be reproduced, then "1000"h is placed in the Root_list ID of the operand4 and the value "11xx"h of the list_ID actually applied to the Track1 text Contents list is described in the list_ID of the operand7. Further, the value of the object_position actually applied to the text1 is described in the target object_position of the operand8. A directory (object_position) of an AUX data file to be reproduced is designated in the ONS command in this manner.

2-18. Stop Command

FIG. 61 shows a structure of the Stop Command for controlling stopping of recording or reproduction as an AV/C command packet. It is to be noted that FIG. 61 illustrates contents of the opcode and operands of the datafield described hereinabove with reference to FIG. 47.

Where the opcode (1 byte) of an AV/C command packet is "C5"h, the AV/C command is defined as the Stop Command.

The areas of the operand1 and the operand2 are defined as subfunction1 and subfunction2, respectively. It is prescribed that, in the Stop Command, "00"h is described in both of the operand1 and the operand2.

The operand3 (1 byte) is used for a plug type and indicates a plug type for controlling stopping of recording or reproduction. The operand3 is defined such that, when it is "00"h, it designates the Source plug, but when it is "01"h, it designates the Destination plug. For recording stopping control, "01"h representing the Destination plug is described in the plug type, but for reproduction stopping control, "00"h representing the source plug is described in the plug type.

The plug ID of the operand4 (1 byte) designates a subunit plug in a plug designated by the plug type whose recording or reproduction is to be stopped. Accordingly, the plug ID is defined such that it designates the DSI with "01"h, but designates the text with "02"h ("00"h representing the Audio is not used).

2-19. AUX Data Recording Processing

Figure 63:
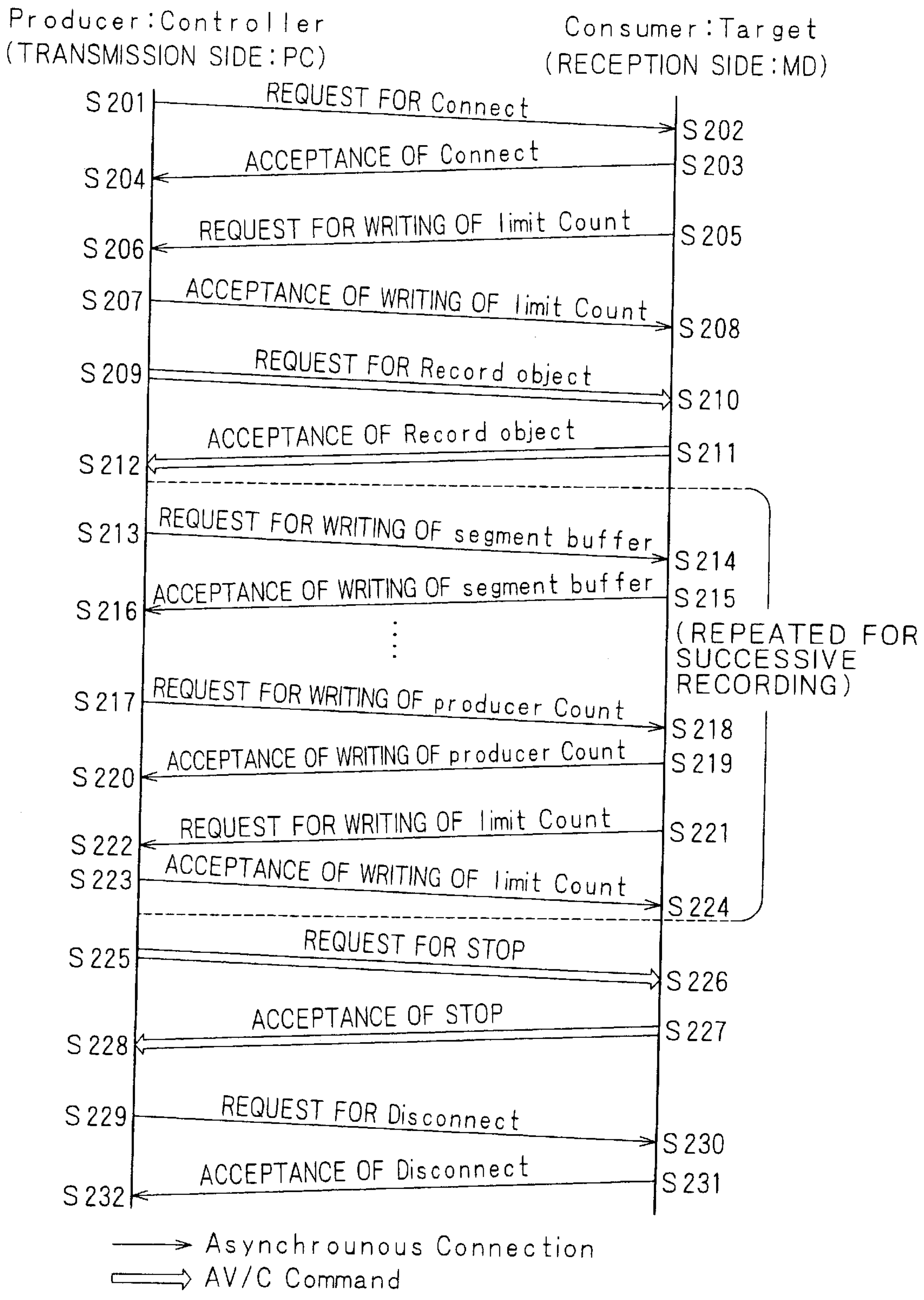
FIG. 63 is a timing chart illustrating a processing procedure when AUX data are recorded over an IEEE 1394 bus.

Now, recording processing of AUX data over the IEEE 1394 bus is described based on the foregoing description with reference to a processing transition diagram of FIG. 63.

As an example of AUX data recording of an IEEE 1394 system, AUX data recording of the AV system 103 described hereinabove with reference to FIG. 1 is described. For example, AUX data stored on a hard disc of the personal computer 113 may be transmitted to the MD recorder/player 1 so that they may be recorded onto a hard disk of the MD recorder/player 1. When this is applied to the case illustrated in FIG. 63, a plug relationship is prescribed such that the producer (controller) in FIG. 63 is the personal computer 113, and the consumer (target) is the MD recorder/player 1.

It is to be noted that a process indicated by a solid line arrow mark in FIG. 63 described below is a process as the Asynchronous Connection described hereinabove with reference to FIG. 54, and a process indicated by a hollowed arrow mark is a communication process in which an AV/C command packet for AUX data recording or stopping control described hereinabove with reference to FIGS. 57, 58, 61 and 62 is used. Also in FIG. 63, transmission/reception processing regarding the Acknowledge which is performed actually is omitted for simplified illustration and description.

Upon recording of AUX data, the processing is started from transmission of a Content request by the producer first in step S201. It is to be noted that processing in steps S201 to S208 is similar to the processing in steps S102 to S108 described hereinabove with reference to FIG. 54, and therefore, overlapping description of it is omitted here to avoid redundancy.

After plug connection and confirmation of a limit Count are completed by the processing in steps S201 to display monitor 208, the producer sends a Record object request in step S209. In particular, the producer transmits a Record object Command having operands of contents corresponding to data to be recorded in accordance with the format described hereinabove with reference to FIGS. 57 and 58. Then, the consumer receives the Record object Command in step S210 and transmits acceptance of the Record object Command to the producer in step S211. In particular, the consumer rewrites the operands of the received Record object Command: in accordance with the necessity and sends back the resulting Record object Command to the producer. Then in step S212, the producer receives the Record object acceptance. Through the operations, the subject Destination plug described hereinabove with reference to FIG. 55 is set to establish a condition wherein transmission/reception of AUX data (a picture file or a text file) is enabled.

Next to the processing in step S212 described above, processing of transmission of a segment buffer write request from the producer to the consumer and succeeding reception of a segment buffer write acceptance: from the consumer to the producer is performed in steps S213 to S216 to transmit an AUX data file as recording data from the producer to the consumer.

Also here, if transmission of AUX data as recording data is not completed by one processing operation in steps S213 to S216, then the processing in steps S213 to S216 is repetitively performed within a range until the segment buffer is fully occupied.

After data writing into the segment buffer is completed in this manner, a producer Count write request is transmitted from the producer to the consumer in step S217, and the consumer receives the producer Counter write request in step S218. Then in step S219, a producer Count write acceptance is transmitted from the consumer to the producer, and in step S220, the producer receives the producer Count write acceptance, thereby completing the processing for notifying the producer of the size of data having been written into the segment buffer of the consumer in steps S213 to S216 described above.

Then in the following steps S221 to S224, transmission/reception of the limit Count register is performed by a processing procedure similar to that in steps S205 to S208 described above as responding operation to the writing processing into the segment buffer before then.

The processing in steps S213 to S224 described above is one set of processing procedure, for example, for writing AUX data into the segment buffer of the MD recorder/player side serving as a consumer.

Also here, for example, if the size of an AUX data file to be transmitted is greater than the capacity of the segment buffer and transfer of the data is not completed by one processing operation in steps S213 to S224, then the processing in steps S213 to S224 is repetitively executed until transfer of the data is completed.

Then, after transfer of the data is completed, the producer sends a Stop request in step S225. In particular, the producer transmits a Stop Command having operands for performing recording stopping control for a required subunit plug in accordance with the format described hereinabove with reference to FIGS. 61 and 62. Then, the consumer receives the Stop Command in step S226 and transmits a Stop acceptance to the producer in step S227. Then in step S228, the producer receives the Stop acceptance, thereby completing the stopping control of the recording operation.

Thus, as the transmission/reception processing for a Disconnect is completed by processing in steps S229 to S232, the plug setting for AUX data recording till then is cancelled.

2-20. AUX Data Reproduction Processing

Subsequently, reproduction processing for AUX data over the IEEE 1394 bus is described with reference to a processing transition diagram of FIG. 64.

Here, a case is considered wherein, for example, the AV system 103 described hereinabove with reference to FIG. 1 transfers AUX data reproduced by the MD recorder/player 1 to the personal computer 113 so that the AUX data may be stored onto the hard disk or may be displayed or outputted. In this instance, the,personal computer 113 sends a reproduction request.

Figure 64:
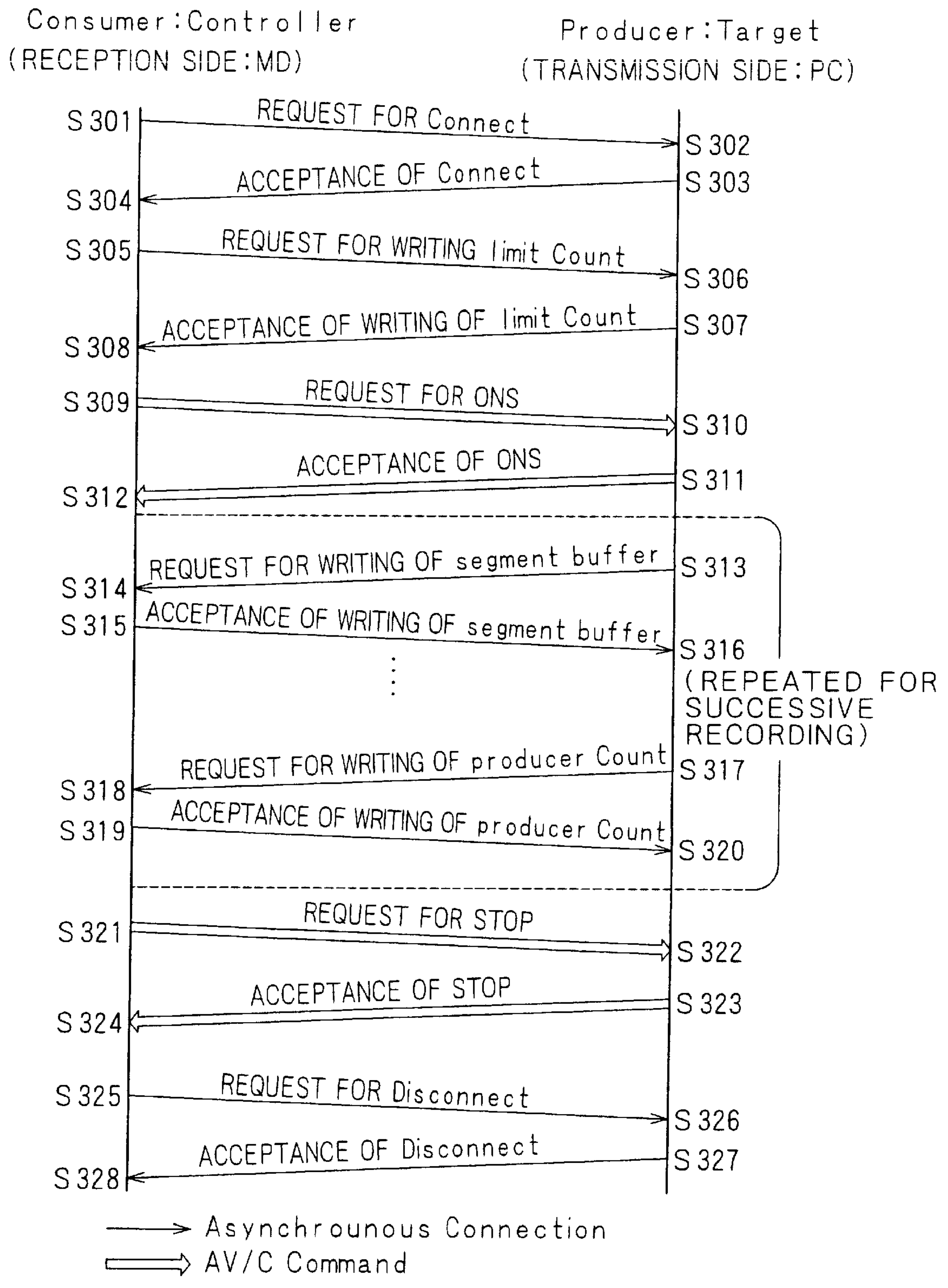
FIG. 64 is a time chart illustrating a processing procedure when AUX data are reproduced over an IEEE 1394 bus.

If this is applied to FIG. 64, a plug relationship is prescribed such that the consumer (target) is the personal computer 113, and the producer (controller) is the MD recorder/player 1. In other words, the relationship between the producer and the consumer is opposite to that upon recording processing described above with reference to FIG. 63.

It is to be noted that, also in FIG. 64, a process indicated by a solid line arrow mark represents a process as an Asynchronous Connection described hereinabove with reference to FIG. 54, and a process indicated by a hollowed arrow mark indicates a communication process which uses an AV/C command packet for AUX data reproduction and stopping control described hereinabove with reference to FIGS. 59 to 62. Also in FIG. 64, transmission/reception processes regarding the Acknowledge are omitted for simplified illustration and description.

Upon reproduction of AUX data, processing is started from transmission of a Connect request from the consumer to the producer in step S301. Processing in steps S301 to S308 is similar to that in steps S102 to S108 described hereinabove with reference to FIG. 54, and overlapping description of it is omitted here to avoid redundancy.

After plug connection and confirmation of a limit Count are completed by the processing in steps S302 to S308, the consumer transmits an ONS request in step S309. In particular, the consumer transmits an ONS command having operands of contents corresponding to a data file to be reproduced in accordance with the format described hereinabove with reference to FIGS. 59 and 60. Then, the producer receives the ONS command in step S310 and transmits an ONS acceptance to the producer in step S311. In particular, also here, the producer executes processing of rewriting the operands in accordance with a reception situation and so forth in response to the received ONS command and sending back the resulting ONS command to the consumer. Then in step S312, the consumer receives the ONS acceptance. Consequently, for example, the MD recorder/player 1 serving as the producer specifies an AUX data file to be reproduced from within the object list (refer to FIG. 56), reads out the AUX data file from the disc and reproduces or outputs it.

Then, in order to transmit the AUX data file read out from the disc in such a manner as described above to the consumer, processing of transmission of a segment buffer write request from the producer to the consumer and transmission of a segment buffer write acceptance from the consumer to the producer responsive to the segment buffer write request is executed in steps S313 to S316. By the single processing operation in steps S313 to S316, the AUX data file reproduced from the disc is transferred in a unit of an Asynchronous Packet to the segment buffer of the consumer.

Also here, if transfer of the AUX data to be transferred to the consumer is not completed by the one processing operation in steps S313 to S316 (one transmission operation of an Asynchronous Packet), then the processing in steps S313 to S316 is repetitively performed within a range until the segment buffer is occupied fully.

After data writing into the segment buffer is completed in this manner, processing of transmission of a producer Count write request from the producer to the consumer and transmission of a producer Count write acceptance from the consumer to the producer is executed in steps S317 to S320, thereby completing the processing for notifying the producer of a size of data written in the segment buffer of the consumer by the processing in preceding steps S313 to S316.

It is to be noted that, upon AUX data reproduction processing, transmission/reception of the limit Count register is not performed after the producer Count write request/write acceptance processing in steps S317 to S320.

Also in this instance, the processing in. steps S313 to S320 described above is one set of processing procedure, for example, for writing AUX data reproduced by the MD recorder/player serving as a producer into the segment buffer of the personal computer device serving as a consumer. Also here, for example, if the size of an AUX data file to be transmitted is greater than the capacity of the segment buffer and transfer of the data is not completed by the single processing operation in steps S313 to S320, the processing in steps S313 to S320 is repetitively executed until transfer of the data is completed.

Then, after transfer of the data is completed, processing in steps S321 to S328 is executed. It is to be noted that the processing in steps S321 to S328 is similar to that in steps S225 to S232 described hereinabove with reference to FIG. 63, and therefore, overlapping description of it is omitted to avoid redundancy.

It is to be noted that, while the processing operation described above presumes a case wherein AUX data are communicated between the MD recorder/player 1 and the personal computer 113 in the AV system 103 shown in FIG. 1, for example, as far as transfer of an AUX data file is concerned, similar processing is applied even if, for example, the MD recorder/player 1 and the IRD 112 are connected by a plug connection to each other. Further, also transfer of an AUX data file between the IRD 112 and the personal computer 113 is possible depending upon a similar processing concept. In particular, in the present embodiment, various system configurations are possible as far as transfer of an AUX data file in the IEEE 1394 is performed by Asynchronous communication as in the description above.

Further, the present invention can be applied not only to the IEEE 1394 format, but also to any communication format in which a communication mode wherein data are transmitted periodically and another communication mode wherein data are communicated asynchronously are used.

It is to be noted that, in the embodiment described above, AUX data reproduced by the MD recorder/player 1 are transferred to the personal computer 113 in response to a reproduction request from the personal computer 113, and during such transfer, reproduction of audio data from the MD recorder/player 1 is inhibited.

However, since so-called intermittent reproduction wherein the MD recorder/player 1 reproduces audio data from a disc and, when the audio data are fully stored into the memory, stops the reproduction is performed, also AUX data which are sub data can be transferred while reproducing (transferring) audio data by repeating feeding, during such intermittent reproduction, of the optical pickup from the audio data recording area to the AUX data recording area to reproduce the AUX data and then returning the optical pickup to the audio data recording area. upon the transfer described above, audio data (ATRAC data) which are main data are transferred in accordance with the Isochronous communication system while still pictures or text data which are sub data are transferred in accordance with the Asynchronous communication system.

The personal computer 113 on the reception side discriminates audio data (ATRAC data), which are main data, and still pictures or text data, which are sub data, transmitted over the IEEE 1394 bus from each other based on the Plug ID or the destination list-ID to extract the main data and the sub data.

For example, in the IEEE 1394 format, an Isochronous communication system (first communication system) wherein data are transmitted periodically and an Asynchronous communication system (second communication system) wherein data are transmitted asynchronously are performed. Usually, data are handled by the Isochronous communication system, and transmission/reception of commands is performed by the Asynchronous communication system.

In the present invention, it is prescribed that, when audio data (main data) and AUX data files (including a picture file and a text file and called sub data) which can be recorded or reproduced, for example, by means of a recording or reproduction apparatus as a mini disc system are transmitted and received over the IEEE 1394 bus, the audio data are transmitted and received by the Isochronous communication system and the AUX data files are transmitted and received by the Asynchronous communication system.

In short, upon recording, the mini disc recording and reproduction apparatus receives audio data by the Isochronous communication system and receives AUX data files by the Asynchronous communication system over the IEEE 1394 bus, and records the received data onto a disc.

On the other hand, upon reproduction, the mini disc recording and reproduction apparatus transmits, from within audio data and AUX data files reproduced from a disc, the audio data by the Isochronous communication system and transmits the AUX data files by the Asynchronous communication system.

Since the construction described above is employed, the following advantages can be achieved by the present invention.

For example, while audio data have a large data size and a time series continuity (real time property) is required for the audio data, where audio data are transmitted and received by the Isochronous communication system as in the present invention, as far as audio data are transmitted using a bandwidth obtained by band reservation in the Isochronous communication system, the time series continuity of the audio data can be assured.

Meanwhile, AUX data files are, for example, still picture data or text data, and such a real time property as is required for audio data is not required for the AUX data files. Also the data size of AUX data files is small. Therefore, it is not preferable in terms of the transmission efficiency to transmit AUX data,files by the Isochronous communication system because the band is occupied by data even if the amount of the data is small. Therefore, where AUX data files are transmitted and received by the Asynchronous communication system, which is originally used for transmission and reception of commands, as in the present embodiment, AUX data are transmitted making use of a free band obtained within a period for transmission of 1 packet without reserving a band for transmission. In other words, it is possible to effectively utilize a finite band to transmit and receive AUX data together with audio data.

Further, while Isochronous communication requires a PLL circuit and so forth to establish synchronization between the transmission side and the reception side, Asynchronous communication does not require any component for establishing such synchronization. Therefore, as regards transmission of AUX data files, there is no necessity for provision of PLL circuits for establishing synchronization, and consequently, the configuration of hardware of the IEEE 1394 interface can be simplified as much. Particularly, even an apparatus such as a personal computer which is rather inferior in synchronized communication function from its configuration can perform transmission/reception of AUX data readily.

Further, in the present invention, as a command to be transmitted, for example, from a mini disc recording and reproduction apparatus to an external apparatus (controller), a recording command (AV/C command) for requesting for recording by Asynchronous communication is defined, and a notification of the type of AUX data to be recorded is transmitted by transmission of the recording command. Consequently, the mini disc recording and reproduction apparatus can execute a recording operation suitable for the type of AUX data to be recorded. In short, upon recording of data inputted over the IEEE 1394 bus, recording managed with the level of a type unit of AUX data can be performed.

On the other hand, upon reproduction, a recording command (AV/C command) for requesting for reproduction by Asynchronous communication is defined, and an AUX data file to be reproduced is designated by transmitting the recording command. Then, the mini disc recording and reproduction apparatus can reproduce and output a designated AUX data file in response to the command. In short, upon reproduction or outputting of an AUX data file, required data reproduction can be performed in a unit of an AUX data file to output the data to the bus.

While a preferred embodiment of the present invention has been described using specific terms, such description is for illustrative purposes only, and it is to be understood that changes and variations may be made without departing from the spirit or scope of the following claims.

What is claimed is:

1. An information transmission apparatus which can communicate data with another apparatus over a single data bus in accordance with a first communication system wherein data can be transmitted periodically and a second communication system wherein data can be transmitted asynchronously, comprising:

discrimination means for discriminating whether data to be transmitted are main data to be outputted successively in time or sub data relating to the main data; and transmission means for transmitting, when said discrimination means discriminates that the data to be transmitted are main data to be outputted successively in time, the data in accordance with the first communication system but transmitting, when said discrimination means discriminates that the data are sub data relating to the main data, the data in accordance with the second communication system.

2. An information transmission apparatus according to claim 1, wherein the first communication system is an Isochronous communication system.

3. An information transmission apparatus according to claim 1, wherein the second communication system is an Asynchronous communication system.

4. An information transmission apparatus according to claim 1, wherein the first and second communication systems conform to the IEEE 1394 standard.

5. An information transmission apparatus according to claim 1, wherein said transmission means transmits command data to be transmitted to the apparatus which is a destination of the transfer in accordance with the second communication system.

6. An information transmission apparatus according to claim 1, wherein the main data to be outputted successively in time are audio data.

7. An information transmission apparatus according to claim 1, wherein the main data to be outputted successively in time are video data.

8. An information transmission apparatus according to claim 1, wherein the sub data relating to the main data are video data.

9. An information transmission apparatus according to claim 1, wherein the sub data relating to the main data are text data.

10. A recording apparatus which communicates data over a single data bus in accordance with a first communication system wherein data can be received periodically and a second communication system wherein data can be received asynchronously and records the received data onto a recording medium, comprising:

discrimination means for discriminating whether data received are main data transmitted thereto in accordance with the first communication system and to be outputted successively in time or sub data transmitted in accordance with the second communication system and relating to the main data; and recording means for recording, when said discrimination means discriminates that the received data are main data to be outputted successively in time, the received main data into a first area of the recording medium but recording, when said discrimination means discriminates that the received data are sub data relating to the main data, the received sub data into a second area of the recording medium.

11. A recording apparatus according to claim 10, wherein the first communication system is an Isochronous communication system.

12. A recording apparatus according to claim 10, wherein the second communication system is an Asynchronous communication system.

13. A recording apparatus according to claim 10, wherein the first and second communication systems conform to the IEEE 1394 standard.

14. A recording apparatus according to claim 10 wherein said reception means further receives command data in accordance with the second communication system.

15. A recording apparatus according to claim 10, wherein the main data to be outputted successively in time are audio data.

16. A recording apparatus according to claim 10, wherein the main data to be outputted successively in time are video data.

17. A recording apparatus according to claim 10, wherein the sub data relating to the main data are video data.

18. A recording apparatus according to claim 10, wherein the sub data relating to the main data are text data.

19. A transmission and reception system, comprising:

first reception means for receiving main data to be outputted successively in time and sub data relating to the main data;

transmission means for transmitting the main data received by said first reception means and to be outputted successively in time in accordance with a first communication system wherein data can be transmitted periodically and transmitting the sub data relating to the main data in accordance with a second communication system wherein data can be transmitted asynchronously;

second reception means for receiving the main data and the sub data transmitted from said transmission means over a single cable; and separation means for separating the main data transmitted in accordance with the first communication system and received by said second reception means and the sub data transmitted in accordance with the second communication system and received by said second reception means from each other.

20. An information transmission method by which data can be communicated between different apparatus over a single data bus in accordance with a first communication system wherein data can be transmitted periodically and a second communication system wherein data can be transmitted asynchronously, comprising the steps of:

discriminating whether data to be transmitted are main data to be outputted successively in time or sub data relating to the main data; and transmitting, when it is discriminated by the discriminating step that the data to be transmitted are main data to be outputted successively in time, the data in accordance with the first communication system but transmitting, when it is discriminated by the discriminating step that the data are sub data relating to the main data, the data in accordance with the second communication system.

21. A recording method by which data are communicated over a single data bus in accordance with a first communication system wherein data can be received periodically and a second communication system wherein data can be received asynchronously and the received data are recorded onto a recording medium, comprising the steps of:

discriminating whether data received are main data transmitted thereto in accordance with the first communication system and to be outputted successively in time or sub data transmitted in accordance with the second communication system and relating to the main data; and recording, when it is discriminated by the discriminating step that the received data are main data to be outputted successively in time, the received main data into a first area of the recording medium but recording, when it is discriminated by the discriminating step that the received data are sub data relating to the main data, the received sub data into a second area of the recording medium.

22. A transmission and reception method, comprising:

a first receiving step of receiving main data to be outputted successively in time and sub data relating to the main data;

a transmitting step of transmitting the received main data to be outputted successively in time in accordance with a first communication system wherein data can be transmitted periodically and transmitting the sub data relating to the main data in accordance with a second communication system wherein data can be transmitted asynchronously;

a second receiving step of receiving the main data and the sub data transmitted in the transmitting step over a single cable; and a separating step of separating the received main data transmitted in accordance with the first communication system and the received sub data transmitted in accordance with the second communication system from each other.

* * * * *